(12) United States Patent
Liu et al.

(10) Patent No.: US 6,272,095 B1
(45) Date of Patent: Aug. 7, 2001

(54) APPARATUS AND METHOD FOR STORING AND/OR READING DATA ON AN OPTICAL DISK

(75) Inventors: Tsuen-Hsi Liu, Calabasas; Demetri Psaltis, Pasadena; Fai H. Mok, Torrance; Gan Zhou, Pasadena, all of CA (US)

(73) Assignees: California Institute of Technology; Holoplex, both of Pasadena, CA (US)

( * ) Notice: Subject to any disclaimer, the term of this patent is extended or adjusted under 35 U.S.C. 154(b) by 0 days.

(21) Appl. No.: 08/427,721

(22) Filed: Apr. 21, 1995

Related U.S. Application Data

(63) Continuation-in-part of application No. 08/279,492, filed on Jul. 22, 1994, now abandoned.

(51) Int. Cl.$^7$ .................................................. G11B 7/00
(52) U.S. Cl. .................. 369/103; 369/112.01; 369/275.3
(58) Field of Search ............................ 369/100, 109, 369/103, 112, 275.3, 275.4, 59, 44.11, 43, 109.01, 109.02, 112.01, 112.11, 112.13, 112.15, 112.23, 112.24, 112.29, 117, 118, 119, 121, 59.11, 275.1

(56) References Cited

U.S. PATENT DOCUMENTS

| | | | |
|---|---|---|---|
| 4,021,606 | * 5/1977 | Takeda et al. | 369/103 X |
| 4,458,345 | * 7/1984 | Bjorklund et al. | 369/103 |
| 4,761,775 | * 8/1988 | Murakami | 369/275.3 X |
| 4,958,338 | * 9/1990 | Miller | 369/59 |
| 5,191,574 | * 3/1993 | Henshaw et al. | 369/103 X |
| 5,322,747 | * 6/1994 | Hugle | 369/275.4 X |
| 5,339,305 | * 8/1994 | Curtis et al. | 369/103 X |
| 5,481,523 | * 1/1996 | Dewald | 369/103 |

OTHER PUBLICATIONS

Webster's Third New International Dictionary, p. 518, 1971.*

* cited by examiner

Primary Examiner—Paul W. Huber
(74) Attorney, Agent, or Firm—Fish & Richardson P.C.

(57) ABSTRACT

An optical memory for storing and/or reading data on an optical disk. The optical disk incorporates a material in which holographic gratings can be created at plural locations within the disk. An electro-optical head which is capable of creating these holographic gratings at any one of the plural locations is employed. The head is additionally capable of detecting the presence or absence of a holographic grating at any one of these plural locations. The presence of the holographic grating could indicate a first binary state and the absence of the holographic grating indicate a second state. Alternately, the electro-optical head could be used to vary the diffraction efficiency of the holographic gratings during their creation. In that case, the head would also be capable of detecting this variation in efficiency and produce a proportional detection signal. This signal would be used as an indicator of the value of the stored data element. The material of the optical disk is further capable of having multiple holographic gratings created at each one of the plural locations. These multiple holographic gratings are created via a beam of light from the electro-optical head which has a different wavelength or point of focus. In reading these holographic gratings, a beam of light generated by the electro-optical head is sequentially varied in wavelength or point of focus to correspond to the wavelength or point of focus and the sequence of wavelengths or points of focus employed to record each one of the data elements recorded.

137 Claims, 19 Drawing Sheets

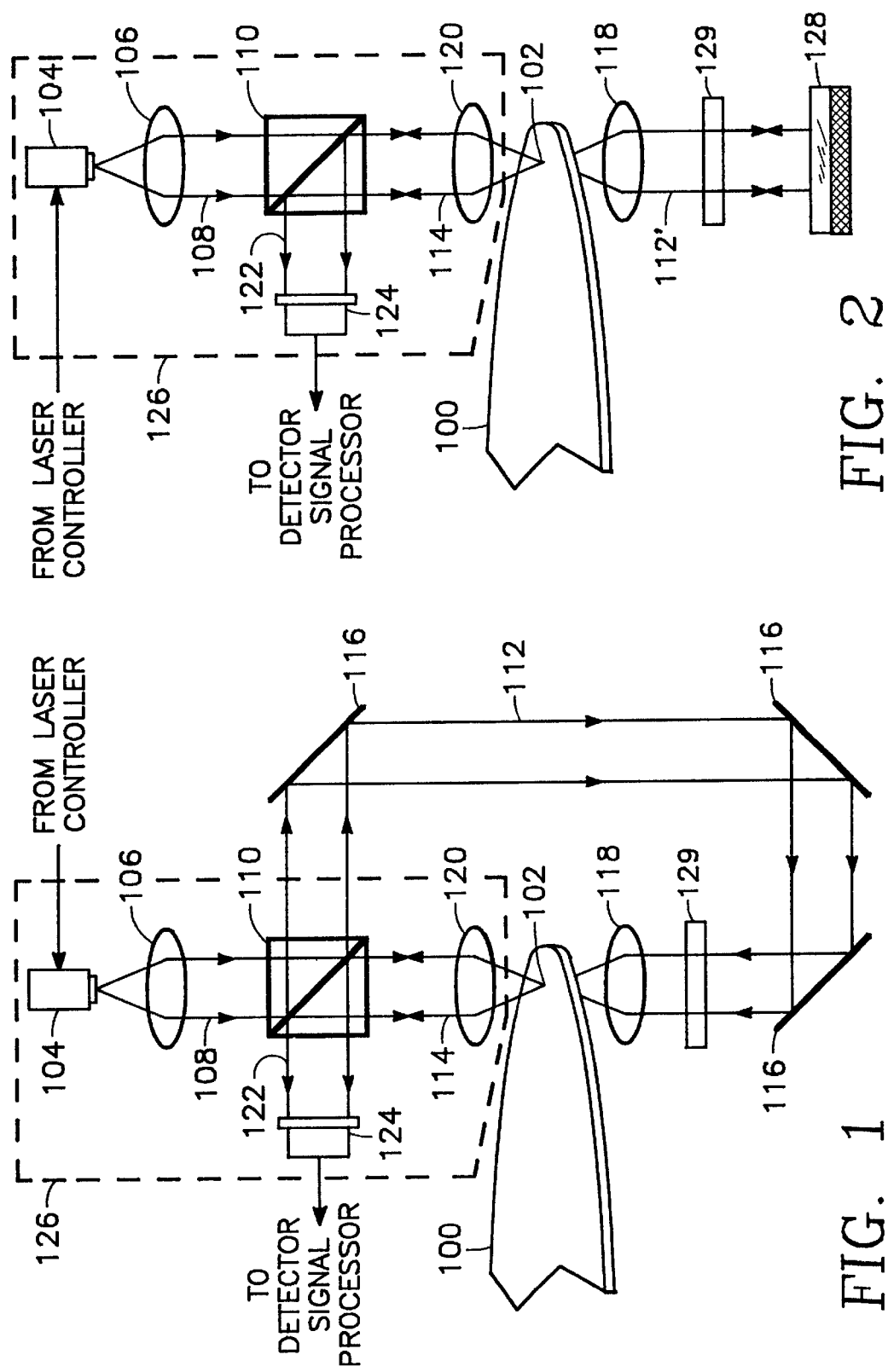

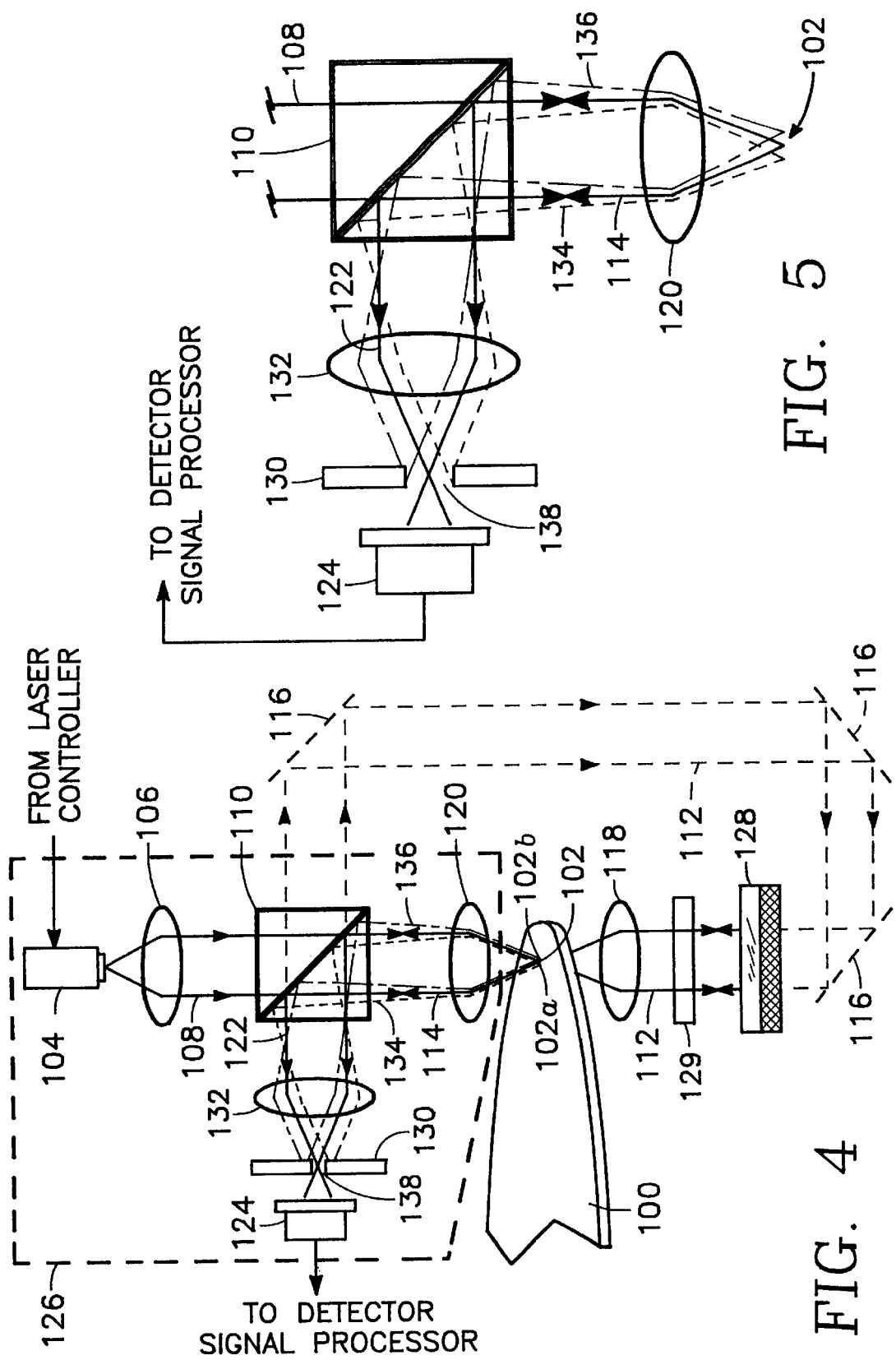

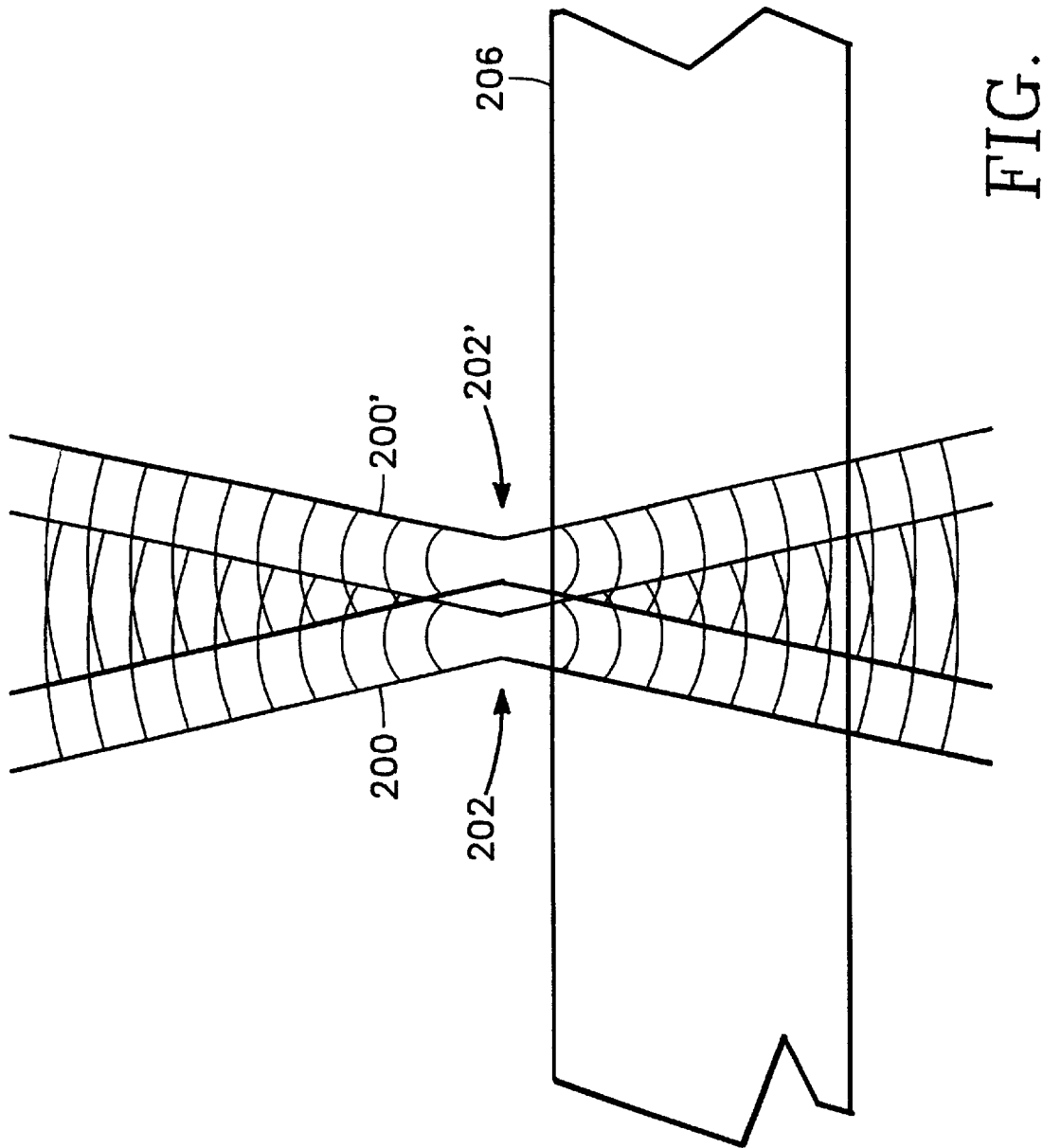

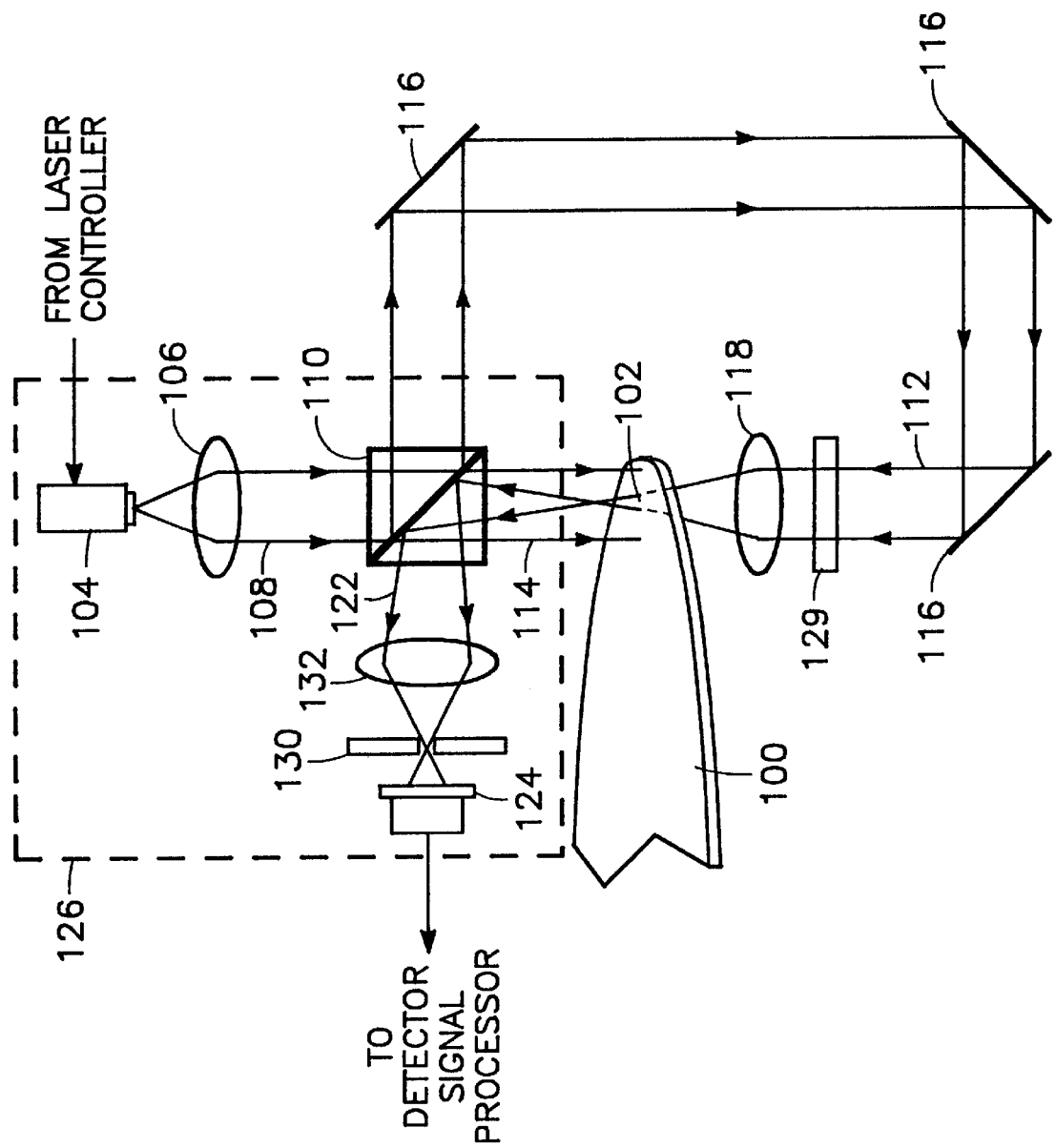

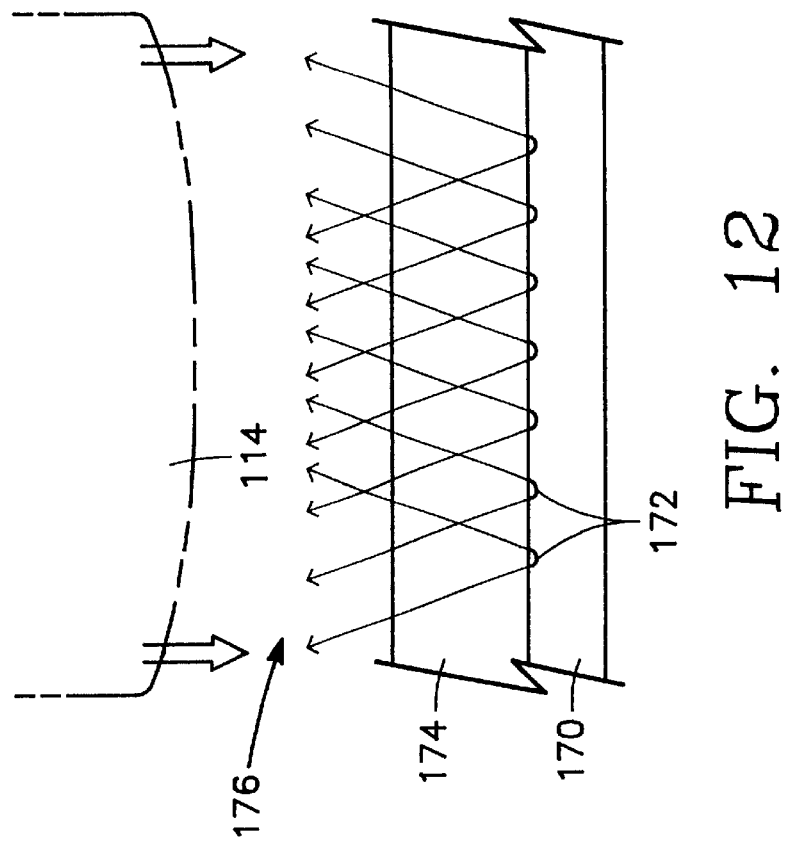
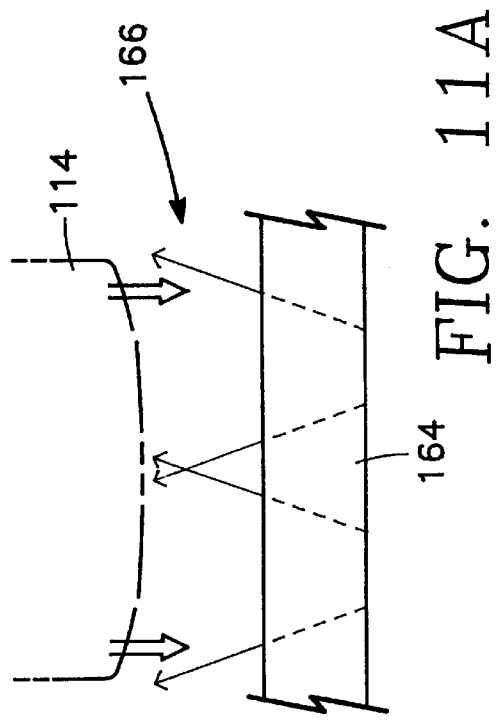
FIG. 11A
FIG. 11B

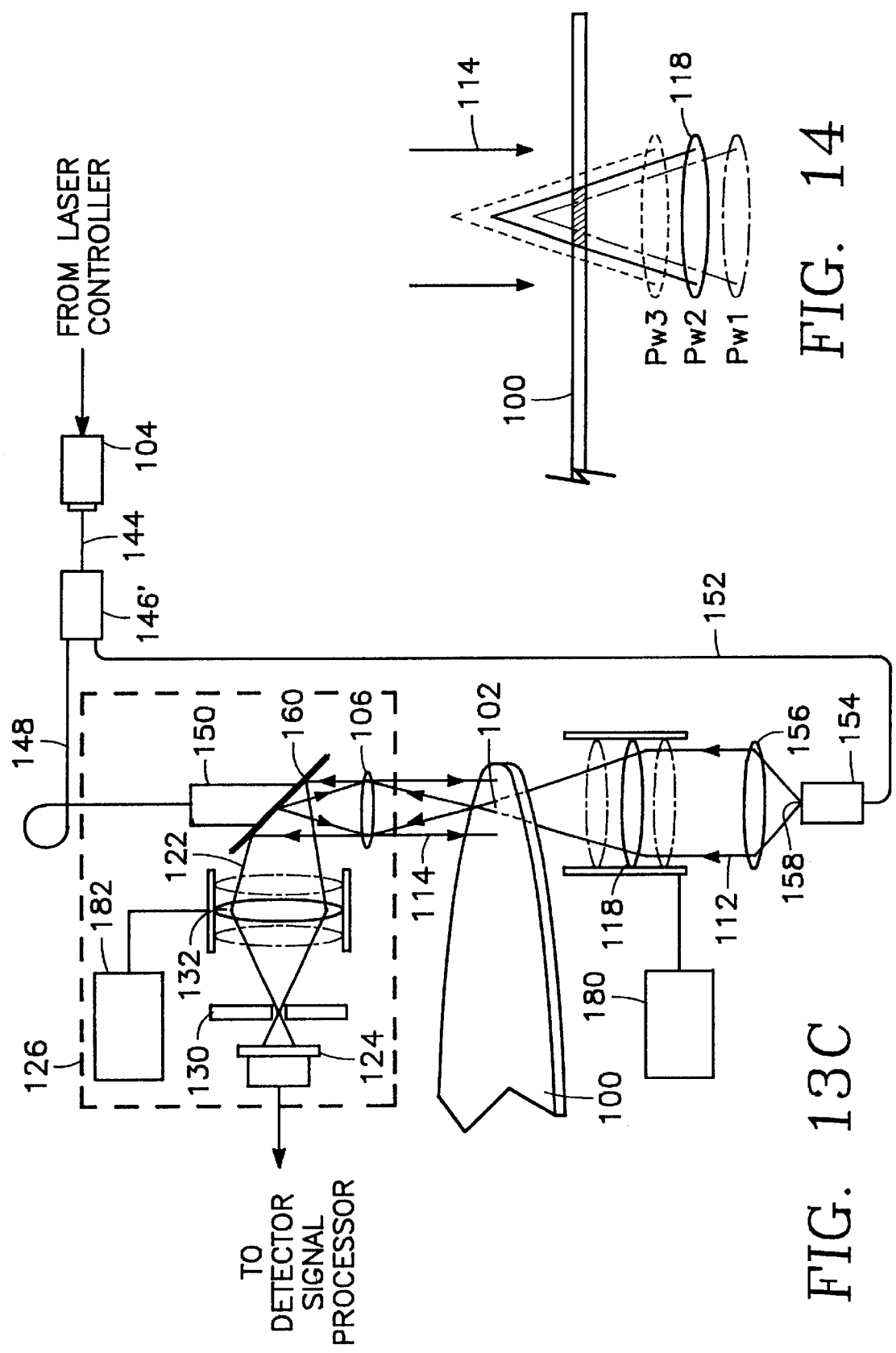

APPARATUS AND METHOD FOR STORING AND/OR READING DATA ON AN OPTICAL DISK

This is a continuation-in-part, of application Ser. No. 08/279,492, filed Jul. 22, 1994, now abandoned.

BACKGROUND

1. Technical Field

This invention relates to devices and methods of storing and/or reading data on an optical disk, and more particularly to such devices and methods employing techniques wherein the optical disk is encoded using holographic gratings. Further, the present invention relates to such devices and methods wherein more than one holographic grating can be formed in the same portion of the optical disk, thereby increasing the data storage capacity of the disk.

2. Background Art

Optical memories, such as a compact disk-read only memory (CD-ROM), are capable of a relatively large storage density, when compared to other data storage media. These high storage-density memories are revolutionizing the computer industry and have made memory-thirsty multimedia products for publishing and entertainment the hottest-selling computer hardware and software. As an example, a 5-inch CD-ROM disk can store a 30-volume encyclopedia containing not only text and pictures, but also sounds and videos. Optical memories also reduce the space needed for storing exploding data files. The space once needed to store volumes of printed material is no longer necessary. A few, small optical disks take their place. The cost of manufacturing optical disks can also be much less than equivalent paper publishing. For instance, the cost of making a conventional compact disk (CD), in quantity, is less than a dollar. Benefiting from the huge market of audio CDs, CD-ROM technology has become very mature and low cost.

Conventional CD-ROM type optical memories have high storage density, mainly because the space needed to store one bit of digital data corresponds to the size of an optical beam at its point of focus. Of course, the diameter of the optical beam at the point of focus varies with the wavelength of light employed. Typically, this diameter is about 1 $\mu$m in current CD-ROM players employing a standard wavelength of about 0.78 $\mu$m. Given this diameter, a total of about 650 MB can be stored on a CD (assuming the data is stored in the typically used area between a radius of 59 mm and a radius of 120 mm). This storage capacity is enough for some current audio and computer applications, but it is still too small for high-resolution video applications. To illustrate, the above-described CD can store about 30 minutes of compressed video, which will not hold an average movie. As a result, videos are currently distributed on larger 12-inch disks, which are not compatible with the conventional 5-inch disk CD-ROM players. In addition to video, many other data storage applications are being restricted by the data storage limitations of current CD-ROM systems. Thus, increasing the storage capacity of an optical disk beyond current CD-ROM systems would be advantageous.

One way of further increasing the storage density of an optical memory, such as a CD-ROM, is to use a shorter wavelength, thereby reducing the diameter of the optical beam at its point of focus. Thus, more data bits can be fit onto the optical disk. Much effort has been expended in the development of short wavelength laser diodes, partly for this reason. However, to date no such system has become commercially available.

Another approach to increasing the storage density of an optical memory has involved employing holographic techniques. In a conventional CD-ROM the data bits are represented by pits on a plastic disk coated with a protection layer. The length of the pit encodes the data stored. A laser beam is focused to a very tiny spot (i.e. ~1.7 $\mu$m in diameter) on the optical disk. When the focused beam hits a pit, the reflected intensity is much lower than when only a land is illuminated. An optical head is able to convert the reflections from the pits and lands to appropriate electrical pulses which are then decoded and sent to a buffer memory and finally to the host computer.

Conversely, holographic techniques involve using a hologram to store and reconstruct whole images. This hologram could be an analog image of some type, or a page of digital data. A volume holographic disk is used as the storage medium. In the analog case, the reconstructed image is focused on a detector array or a camera for further processing. In the digital case, the reconstructed bit array would be focused and mapped onto a detector array before processed by decoding circuitry. Reading out an entire page of digital data in this above-described parallel manner would have the advantage of creating a higher data throughput rate. In addition, more data could theoretically be stored per unit area than with conventional CD methods. This latter advantage could be further enhanced by multiplexing techniques which would allow the storage of multiple holograms in the same spot on the disk. However, the aforementioned holographic approach requires sophisticated optics and supporting mechanisms. For example, in the case of the storage of digital data, a precise one-to-one mapping between the elements of the bit array on the disk and the elements of the detector array in the optical head is essential. This requires highly accurate optical heads and drive mechanisms.

In addition, because of the complexity of the systems needed to record and readout a holographic image, e.g. a precisely positioned detector array, existing CD-ROM systems can not be employed. Rather, new, completely unique drives, etc. are required. Thus, the aforementioned holographic approach can not take full advantage of the mature technologies associated with current CD-ROM drives.

More recently, an approach was introduced to increase the storage capacity of conventional CD-ROM system by stacking CDs in pancake fashion. To read from the different layers in this stack CD array, the focus of the readout beam is changed by moving its associated focusing lens(es). The number of CDs that can be stacked in this manner is dependent on the insertion loss of each CD layer. To date, a system with six stacked CDs has been demonstrated. Although stacking increases storage capacity of the overall system, each of the CDs in the stack are still limited to the volume of data described above.

In view of the drawbacks associated with the above-described approaches to increasing the data storage capability of an optical memory, it is desirable that other approaches be developed which can overcome the problems of existing systems.

SUMMARY

The foregoing objective is attained by apparatuses and methods of storing and/or reading data from an optical disk in accordance with the present invention. A holographic-grating based system is employed which uses wavelength-multiplexed or confocal-multiplexed techniques. The proposed apparatuses and methods store and/or read data by creating and detecting the presence of holographic gratings in the optical disk. Multiple holographic gratings can be stored in the same location within the disk by varying the wavelength (i.e. wavelength-multiplexing) or the point of focus (i.e. confocal-multiplexing) of light beams used to create them. The aforementioned holographic grating is an interference pattern created in a holographic medium.

In one embodiment of the present invention, the presence of a holographic grating within a data storage location of the disk indicates a first binary state, whereas the absence of such a holographic grating indicates the second binary state. In other embodiments of the invention, the holographic gratings are created with varying diffraction efficiencies. The variance in diffraction efficiency allows distinguishing holographic grating associated with the same wavelength or point of focus from each other. This in turn allows the holographic gratings to represent n-ary or analog-valued data. Some embodiments of the present invention employ the use of the mature technologies already developed for the conventional CD-ROM drives. In these embodiments, the structure of the proposed system is similar to the conventional CD-ROM systems, except that the pit-encoded disk medium is replaced by the holographic grating-based disk medium according to the present invention. The storage density of the proposed optical memory can be potentially increased N-fold by wavelength or confocal multiplexing N holographic gratings in a volume holographic disk at each beam position. Additionally, as the disk spinning rate can be the same as that of a conventional CD-ROM drive in some embodiments of the present invention, the data transfer rate can be increased N times by scanning N wavelengths at each beam position. The new system can also be easily made to read existing CDs, as well as, the proposed high-density holographic optical disk. In addition to apparatuses and methods for storing and/or reading data, the invention also includes methods of replicating data on an optical disk.

An optical memory for storing and/or reading data on an optical disk in accordance with the present invention includes an optical disk partially made of a material in which holographic gratings can be created at plural locations within the disk, and an electro-optical head capable of creating the holographic gratings at any one of the plural locations within the disk. The head is also capable of detecting the presence or absence of the holographic grating at any one of the plural locations. As indicated above, the presence of the holographic grating could indicate a first binary state and the absence of the holographic grating indicate a second binary state. Alternately, the electro-optical head could include a device for varying the diffraction efficiency of the holographic gratings during their creation. In that case, the head would also be capable of detecting this variation in efficiency and producing a detection signal proportional to it. This signal would then be used as an indicator of the value of the stored data element represented by the detected holographic grating. The aforementioned material making up part of the disk is also capable of having multiple holographic gratings created at any one of the plural locations. In one embodiment of the present invention, these multiple holographic gratings are created via a beam of light generated by the electro-optical head, where the beam of light has a different wavelength for each one of the multiple holographic gratings created. The data can be written in the disk such that a sequence of data bits is encoded into each of the plural locations. The data is then retrieved by using the head to read all the data from one of the plural locations and then going to the next. Alternately, all the plural locations can be encoded with successive data bits at one wavelength. In this case, the entire disk would then be encoded again and again at different wavelengths. To retrieve data from a disk so encoded, the disk can be read at any one of the wavelengths used for recording, and then another, and so on. To accomplish the first-described approach, the electro-optical head is capable of creating multiple holographic gratings at each one of the plural locations within the disk, each holographic grating being created with at a different wavelength. To accomplish the latter approach, the electro-optical head is capable of creating holographic gratings at plural sets of the plural locations within the disk, the holographic gratings within a particular set of the plural locations being created at a same wavelength which is different from the wavelength used to create holographic gratings within other of the sets of plural locations. Although not required, a set of plural locations preferably includes the maximum number of data storage areas that the can fit in the disk.

Specifically, the electro-optic head includes a device for generating a beam of substantially coherent light, the wavelength of said beam of light being capable of being varied. In addition, there is a collimating device for collimating the beam of light, a device for producing a first and second collimated beam of light from the collimated beam of light, and a device for directing the first collimated beam towards the disk. A device for routing the second collimated beam to a focusing device is used to create a focused beam. The focused beam is directed at a one of the plural locations within the disk. This occurs during the data recording process. It is noted that the focused beam can be directed at one of the plural locations either in a direction opposite from the first collimated beam, or in the same direction as this beam.

A device for detecting reconstruction beams emanating from a holographic grating created within a one of the plural locations within the disk can also be included for use during a reading process. If so, a device for blocking the second collimated beam from reaching the one of the plural locations during the data reading process can also be included. This feature prevents the second collimated beam from interfering with the aforementioned reading process. The detecting device mentioned above includes a light detector, a second directing device for directing light beams reconstructed from the disk during the reading step towards the light detector, and a masking device for blocking light beams reconstructed from holographic gratings created in adjacent ones of the plural location and for allowing light reconstructed from a holographic grating created in the one of the plural locations being read to reach the light detector.

The just described device uses a plane-wave beam, i.e. the first collimated beam, as one of the two counter propagating or co-propagating beams which create the holographic grating in the disk. However, a second focusing device could also be used to focus the first collimated beam prior to reaching the disk, so as to create a second focused beam directed at the aforementioned one of the plural locations within the disk. In this case, the masking device could be eliminated, although it is preferred that it remains.

The optical memory can also include a device for fixing holographic gratings created within the disk. This fixing prevents light impinging on the disk from creating new holographic gratings or affecting holographic gratings already existing in the disk.

The aforementioned device for generating a beam of substantially coherent light can include a tunable laser diode capable of producing light at a plurality of different wavelengths, or it can have a plurality of single-wavelength laser diodes each capable of producing light at a different wavelength.

In the embodiment of the invention employing a plane-wave beam and a focused beam to write holographic gratings, the focusing device can be made to bring the second collimated beam to a point of focus anywhere in relation to the holographic disk material. For instance, near the center of the layer of holographic disk material. However, in some cases it is preferable that the focusing device causes the focused beam to come to a focus at a point outside the material in which a holographic grating is created. Similarly, the focusing devices associated with the embodiment of the invention employing two counter propagating or co-propagating focused beams to write the holographic gratings can bring the beams to a common point of focus anywhere in relation to the holographic material of the disk, including in the center or outside.

The electro-optic head described above can be modified by eliminating the devices used to create and route the second collimated beam to the second focusing means. It is preferred that this modified device include the aforementioned focusing device used to focus the first collimated beam prior to reaching the disk, and that only counter propagating beams be employed to create the holographic gratings in the disk. Instead of the eliminated devices, a collimating and focusing device is included for collimating the first focused beam (i.e. the focused first collimated beam) subsequent to exiting the disk to produce a second collimated beam. A reflecting device is subsequently used to reflect the second collimated beam back toward the collimating and focusing device which focuses it to create a second focused beam directed at the one of the plural locations within the disk in a direction opposite from the first focused beam, during the recording process. Other than the above-described differences, the modified embodiment is the same as the originally described version of the invention.

In another modification of the electro-optic head, a device is included to split the beam of light produced by the generating device into first and second beams before being collimated, rather than employing the aforementioned device to split the already collimated beam. In this modified head a device is included to route the first beam to a collimating device, and another device is used to route the second beam to a second collimating device. Preferably the routing devices are fiber optic lines. Other than these changes, the modified head is the same as the first described embodiment.

It was stated above that the described embodiments of the invention used a beam of light varied in wavelength to create multiple holographic gratings in the disk. However, multiple holographic gratings can also be written in the same location within the holographic material of the disk by varying the point of focus of the beams used in their creation. This is accomplished in much the same way as described above, except the structure of the confocal-multiplexed embodiment of the present invention includes additional devices for changing the point of focus of the focused beams, and only needs a generating device capable of producing one wavelength of light. It is preferred that only the versions of the invention which create the holographic gratings using a plane-wave beam be employed, and not the versions using two focused beams. Specifically, a device associated with the device for focusing the second collimated beam is added to vary the point of focus of the resulting focused beam. This device changes the position of the focusing device in relation to the disk. The detecting device of the confocal-multiplexed embodiments includes a light detector and second directing device for directing the light from the disk during the reading step towards the light detector, just as in previous versions. However, there is also a second focusing device for focusing the directed light to create a focused directed beam. This focused directed beam is made up of reconstructions of focused beams used to create holographic gratings within the disk in an area illuminated by the first collimated beam, including the point of focus of each of the focused beams. The masking device in the confocal-multiplexed version of the invention is used to substantially block light beams reconstructed from holographic gratings created within the disk in the area illuminated by the first collimated beam which have a point of focus not coinciding with the portion of the masking device which allows the reconstructed light beam to pass through to the light detector. Thus, both reconstruction beams from holographic gratings in adjacent disk locations, and reconstruction beams from holographic gratings in the same disk location with different points of focus are blocked. A device for changing the location of the second focusing device is also included. This device is used to position the second focusing device in relation to the mask such that the light beam reconstructed from a holographic grating having a desired point of focus and created at the one of the plural locations being read, has a point of focus coinciding with the portion of the masking device which allows the reconstructed light beam to pass through to the light detector. Thus, only the reconstruction beams from holographic gratings written with a focused beam having a point of focus corresponding to the desired data is read.

The method for storing data on an optical disk in accordance with the present invention generally includes recording data elements by creating holographic gratings at selected ones of the plural disk locations. If the approach is used where a wavelength or point of focus is selected and data is written into and read from all the data location on the disk in sequence, the recording step involves recording data elements at sets of the plural locations within the disk wherein each holographic grating recorded within a particular set of the plural locations via the beam of light generated by the electro-optical head has the same wavelength which is different from the wavelength used to create holographic gratings within other of the plural sets of plural locations, or has a particular point of focus which is different from the point of focus used to create holographic gratings within other of the sets of plural locations. In the case of wavelength-multiplexing, the following method for recording the data is used:

(a) recording data elements within a selected set of the plural locations, said recording comprising the steps of,
 (a1) placing the optical head adjacent to one of the plural location in the particular set of plural locations,
 (a2) generating a beam of substantially coherent light at a selected wavelength whenever it is desired to create a holographic grating at the one of the plural locations within the disk, the selected wavelength of said beam of light being capable of being varied,
 (a3) collimating the beam of light whenever present,
 (a4) producing a first and second collimated beam form the collimated beam of light,
 (a5) directing the first collimated beam towards the disk,
 (a6) routing and focusing the second collimated beam to create a focused beam, the focused beam being directed at the one of the plural locations within the disk,
 (a7) moving the optical head to a position adjacent to a next one of the plural locations in the selected set of plural locations, and, (a8) repeating steps (a2) through (a7) for each one of the plural locations in the selected set of plural locations;

(b) varying the selected wavelength of the beam of substantially coherent light; and, (c) repeating steps (a) and (b) until a predetermined number of newly selected wavelengths have been employed.

However, in the case of confocal-multiplexing, another method is employed, i.e.:

(a) recording data elements within a selected set of the plural locations, said recording comprising the steps of, (a1) placing the optical head adjacent to one of the plural location in the particular set of plural locations, (a2) adjusting the position of a means for focusing such that a focused beam created by the focusing means has a selected point of focus, (a3) generating a beam of substantially coherent light whenever it is desired to create a holographic grating at the one of the plural locations within the disk, (a4) collimating the beam of light whenever present, (a5) producing a first and second collimated beam form the collimated beam of light, (a6) directing the first collimated beam towards the disk, (a7) routing the second collimated beam to the focusing means, (a8) focusing the second collimated beam to create the focused beam, said focused beam being directed at the one of the plural locations within the disk, (a9) moving the optical head to a position adjacent to a next one of the plural locations in the selected set of plural locations, and, (a10) repeating steps (a3) through (a9) for each one of the plural locations in the selected set of plural locations;

(b) varying the selected point of focus of the focused beam; and, (c) repeating steps (a) and (b) until a predetermined number of newly selected points of focus have been employed.

Alternately, if the approach used is one where multiple data bits are sequentially written into and read from each disk location before going to the next location, the recording step involves recording multiple data elements at each one of the plural locations, wherein the beam of light used to create any holographic gratings has a different wavelength or point of focus for each such holographic grating. Specifically, the method for recording data at each data location using wavelength-multiplexing includes:

(a) generating a beam of substantially coherent light at a selected wavelength whenever it is desired to create a holographic grating at the one of the plural locations within the disk, the selected wavelength of said beam of light being capable of being varied;

(b) collimating the beam of light whenever present;

(c) producing a first and second collimated beam form the collimated beam of light;

(d) directing the first collimated beam towards the disk;

(e) routing and focusing the second collimated beam to create a focused beam, the focused beam being directed at a one of the plural locations within the disk;

(f) varying the selected wavelength of the beam of substantially coherent light;

(g) generating a beam of substantially coherent light at a newly selected wavelength whenever it is desired to create another holographic grating at the one of the plural locations within the disk; and, (h) repeating steps (b) through (g) until a predetermined number of newly selected wavelengths have been employed.

In the case of confocal-multiplexing, the following method is used:

(a) adjusting the position of a means for focusing such that a focused beam created by the focusing means has a selected point of focus, (b) generating a beam of substantially coherent light whenever it is desired to create a holographic grating at a one of the plural locations within the disk, (c) collimating the beam of light whenever present;

(d) producing a first and second collimated beam from the collimated beam of light;

(e) directing the first collimated beam towards the disk;

(f) routing and focusing the second collimated beam to create a focused beam, the focused beam being directed at a one of the plural locations within the disk;

(g) varying the selected point of focus of the focused beam;

(h) repeating steps (b) through (g) until a predetermined number of newly selected points of focus have been employed.

The focused beam described above can be directed oppositely from the first collimated beam. In that case, the beams would be counter propagating and a reconstruction beam produced from the grating would also be directed oppositely from the collimated beam used during the reading process. Alternately, the focused beam could be directed in the same direction as the first collimated beam. In this latter case, the beams would be co-propagating and the reconstruction beam would be produced in the same direction as the collimated beam used during the reading process.

Regardless of which data recording approach is used, additional method steps can also be taken. For example, the step of fixing holographic gratings created within the disk can be included. After fixing, light impinging on the disk does not create new holographic gratings and does not affect holographic gratings already existing in the disk. Another additional step involves focusing the first collimated beam prior to reaching the disk to create a second focused beam directed at a one of the plural locations within the disk. As this focusing step would complicate the confocal-multiplexed versions of the invention because of the need to coordinate the two counter propagating or co-propagating focused beams, it is preferred that it only be employed in the wavelength-multiplexed versions. In addition to these additional steps, there are some preferred ways to accomplish the existing steps. For instance, the step of focusing the second collimated beam to create a focused beam can include causing the second collimated beam to come to a focus at a point outside the material in which a holographic grating can be created. In the case where both the first and second collimated beams are focused, the second focused beam is caused to come to a focus at a point outside the material in which the holographic grating is created, and the first focused beam is caused to come to focus at the same point as the second focused beam. Additionally, the step of varying the selected wavelength of the beam of substantially coherent light can include causing a tunable laser diode, which is capable of producing light at a plurality of different wavelengths, to change the wavelength of light emitted.

Alternately, this step can include selecting one of a plurality of single-wavelength laser diodes, each capable of producing light at a wavelength different from the others, to emit the beam of coherent light.

The above-described method is also applicable to the aforementioned embodiments incorporating the reflection device, and a routing device (e.g. fiber optic lines). In the case of the embodiment incorporating the reflection device, it will be remembered that this embodiment incorporated the concept of using counter propagating focused beams to create holographic gratings. Since, this focus beam concept is preferably used only in the wavelength multiplexed embodiments, the embodiment including the reflective device also employs only wavelength multiplexing. Specifically, the method for recording data in embodiments of the invention employing the approach where a wavelength is selected and data bits are written into and read from all the data location on the disk in sequence, is the same as described above except steps (a3) through (a6) are replaced with the following steps:

(a3) collimating the beam of light generated by the generating means whenever present to produce a first collimated beam, (a4) focusing the first collimated beam to create a first focused beam directed at a one of the plural locations within the disk, (a5) collimating the first focused beam subsequent to exiting the disk to produce a second collimated beam, (a6) reflecting the second collimated beam back toward the disk, (a7) focusing the second collimated beam to create a second focused beam directed at said one of the plural locations within the disk and oppositely from the first focused beam.

In the case where multiple data bits are sequentially written into and read from each disk location before going to the next location, the method is the same as described above except steps (b) through (e) are replaced with the following steps:

(b) collimating the beam of light generated by the generating means whenever present to produce a first collimated beam;

(c) focusing the first collimated beam to create a first focused beam directed at a one of the plural locations within the disk;

(d) collimating the first focused beam subsequent to exiting the disk to produce a second collimated beam;

(e) reflecting the second collimated beam back toward the disk;

(f) focusing the second collimated beam to create a second focused beam directed at said one of the plural locations within the disk and oppositely from the first focused beam.

Embodiments incorporating the routing device can use either the wavelength or confocal-multiplex approaches. The method of recording data with the routing device embodiments is essentially the same as described above, with the exception that steps (a3) through (a7) of the wavelength-multiplexed embodiments, and (a4) through (a8) of the confocal-multiplexed embodiments, are replaced for those embodiments of the invention employing the approach where a wavelength is selected and data elements are written into and read from all the data location on the disk in sequence. The replacement steps are as follows:

(a3 or a4) producing a first and second beam of light from the beam of substantially coherent light, whenever present, (a4 or a5) routing the first beam of light to first collimating means for creating a first collimated beam, (a5 or a6) directing the first collimated beam towards the disk;

(a6 or a7) routing the second beam of light to second collimating means for creating a second collimated beam, (a7 or a8) focusing the second collimated beam to create a focused beam, the focused beam being directed at the one of the plural locations within the disk.

And, in the embodiments using the approach where multiple data elements are sequentially written into and read from each disk location before going to the next location, steps (b) through (e) of the wavelength-multiplexed embodiments and (c) through (f) of the confocal-multiplexed embodiments are replaced by the following:

(b or c) producing a first and second beam of light from the beam of substantially coherent light, whenever present;

(c or d) routing the first beam of light to first collimating means for creating a first collimated beam;

(d or e) directing the first collimated beam towards the disk;

(e or f) routing the second beam of light to second collimating means for creating a second collimated beam;

(f or g) focusing the second collimated beam to create a focused beam, the focused beam being directed at a one of the plural locations within the disk.

The method for storing data on an optical disk in accordance with the present invention also includes a reading step wherein data elements are read by detecting the presence or absence of a holographic grating at the plural data locations within the disk. It is noted that this reading step can include producing a signal indicating a first binary state whenever the presence of the holographic grating is detected and a second binary state whenever the absence of the holographic grating is detected. Alternately, each holographic grating could have a variable diffraction efficiency. In this case, the diffraction efficiency of each holographic grating would be varied during their creation in the aforementioned recording step. Then, during the reading step, a signal would be produced which is proportional to the diffraction efficiency of a detected holographic grating. This signal would be indicative of a value of the stored data element represented by the detected holographic grating. The absence of a holographic grating, which would produce no signal, would just be interpreted as another data value.

If the approach is used where a wavelength or point of focus is selected and data elements are written into and read from all the data location on the disk in sequence, the reading of data elements at each location within a particular set of the plural locations is accomplished by detecting either the presence or the absence of a holographic grating. This is done via a beam of light generated by the electro-optical head, which has a wavelength corresponding to the wavelength employed to record the holographic gratings, or a point of focus corresponding to the point of focus used to record the gratings.

In the case of wavelength-multiplexing, the following method for reading data elements at each location in a set of the plural locations within the disk is used:

(a) placing the optical head adjacent to one of the plural location in a selected set of plural locations, (b) generating a beam of substantially coherent light at a selected wavelength, the selected wavelength of said beam of light being capable of being varied;

(c) collimating the beam of light;

(d) directing the collimated beam towards the disk;

(e) detecting a reconstruction light beam emanating from a holographic grating created within a one of the plural locations within the;

(f) moving the optical head to a position adjacent to a next one of the plural locations in the selected set of plural locations;

(g) repeating steps (b) through (f) for each one of the plural locations in the selected set of plural locations;

(h) varying the selected wavelength of the beam of substantially coherent light such that a newly selected wavelength corresponds to a next one of a wavelength of light in a sequence of wavelengths employed to record each set of the plural locations within the disk;

(i) repeating steps (b) through (i) for each set of plural locations.

Further, the step of detecting light specifically includes:

(a) directing light from the disk towards a light detector; and, (c) blocking light beams reconstructed from holographic gratings created in adjacent ones of the plural location and for allowing a light beam reconstructed from a holographic grating created in the one of the plural location to reach the light detector.

However, in the case of confocal-multiplexing, another method is employed, i.e.:

(a) placing the optical head adjacent to one of the plural location in a selected set of plural locations, (b) adjusting the position of a means for focusing light from the disk such that light beams reconstructed from a holographic grating existing at the one of the plural locations in the selected set of the plural locations has a point of focus coinciding with a portion of a means for masking which allows the reflected light to pass through to a light detector;

(c) generating a beam of substantially coherent light;

(d) collimating the beam of light;

(e) directing the collimated beam towards the disk;

(f) detecting a reconstruction light beam emanating from a holographic grating created within the one of the plural locations within the disk in the selected set of the plural locations;

(g) moving the optical head to a position adjacent to a next one of the plural locations in the selected set of plural locations;

(h) repeating steps (c) through (g) for each one of the plural locations in the selected set of plural locations;

(i) selecting a new set of plural locations corresponding to a next one of the sets in a sequence of sets employed to record the data; and, (j) repeating steps (a) through (i) for each set of plural locations.

In this case the step of detecting light further includes:

(a) directing light from the disk towards the light detector;

(b) focusing the directed light to create a focused directed beam, said focused directed beam comprising reconstructions of focused beams used to create holographic gratings within the disk in an area illuminated by the collimated beam including the point of focus of each of the focused beams; and, (c) substantially blocking light beams reconstructed from holographic gratings created within the disk in the area illuminated by the first collimated beam which have a point of focus not coinciding with the portion of the masking means allowing light to pass through to the light detector.

Alternately, if the approach used is the one where multiple data bits are sequentially written into and read from each disk location before going to the next location, the reading step involves reading multiple data elements at each one of the plural locations by detecting either the presence of a holographic grating, or the absence of the holographic grating. This is done via a beam of light generated by the electro-optical head where the beam of light is sequentially varied in wavelength or point of focus to correspond to a wavelength of light and sequence of wavelengths or point of focus and sequence of points of focus employed to record each one of the multiple data elements recorded. Specifically, the method for reading multiple data elements at each one of the plural locations using wavelength-multiplexing is as follows:

(a) generating a beam of substantially coherent light at a selected wavelength, the selected wavelength of said beam of light being capable of being varied;

(b) collimating the beam of light;

(c) directing the collimated beam towards the disk;

(d) detecting a reconstruction light beam emanating from a holographic grating created within the one of the plural locations within the disk;

(e) varying the selected wavelength of the beam of substantially coherent light such that a newly selected wavelength corresponds to a next one of a wavelength of light in a sequence of wavelengths employed to record each one of the multiple data elements recorded;

(f) generating a beam of substantially coherent light at the newly selected wavelength; and, (g) repeating steps (b) through (f) until all the wavelengths in the sequence of wavelengths employed to record the multiple data elements has been selected.

Whereas, the method for reading multiple data elements at each one of the plural locations using confocal-multiplexing is as follows:

(a) adjusting the position of a means for focusing light from the disk such that light beams reconstructed from a holographic grating existing at the one of the plural locations in the plural location has a point of focus coinciding with a portion of a means for masking which allows the reflected light to pass through to a light detector;

(b) generating a beam of substantially coherent light;

(c) collimating the beam of light;

(d) directing the collimated beam towards the disk;

(e) detecting a reconstruction light beam emanating from a holographic grating created within the one of the plural locations within the disk;

(f) varying the selected point of focus such that a newly selected point of focus corresponds to a next one of a point of focus in a sequence of points of focus employed to record each one of the multiple data elements recorded;

(g) repeating steps (b) through (f) until all the points of focus in the sequence of points of focus employed to record the multiple data elements has been selected.

The specifics of the steps of detecting light are the same as described above for the wavelength-multiplexing and confocal-multiplexing embodiments, respectively.

Regardless of which data recording approach is used, additional method steps can be taken. In the embodiments where the first collimated beam was focused prior to reaching the disk, the collimated beam used in the reading step is also focused prior to reaching the disk to create a focused beam directed at the one of the plural locations within the disk. The focused beam is focused at a same point as the beams used to create the holographic gratings during a recording step.

It is also possible to retain the reading capability of the above-described apparatuses and methods, while omitting those parts that are solely required for recording. In this way a read-only optical memory can be made available at a reduce cost.

As for the aforementioned methods of transferring data to an optical disk, one such method involves transferring the data stored on an optical disk to another optical disk. This method includes placing a blank optical disk adjacent an encoded master optical disk. The blank optical disk is at least partially made of a material in which holographic gratings can be created at plural locations within the disk, but in which no holographic grating have yet been created. The encoded master optical disk is at least partially made of a similar material which has holographic gratings created therein at selected ones of the plural data locations of the disk by an interaction of a focused beam and a plane-wave beam. The presence and absence of the holographic gratings at the plural locations within the disk represents stored data. The blank and master optical disks are then illuminated with a plane-wave beam. This illumination causes reconstruction beams to be produced from the holographic gratings in the master disk, which in combination with the plane-wave beam, create corresponding holographic gratings within the blank disk at locations corresponding to the presence of the holographic gratings of the master disk, and no holographic gratings at locations corresponding to the absence of the holographic gratings of the master disk. Thus, the stored data is transferred to the blank disk.

In one embodiment, the blank disk is placed over the top of the master disk, and the plane-wave beam is directed towards an externally facing top surface of the blank disk. The blank disk is transparent to the plane-wave beam. Therefore, the plane-wave beam illuminates the holographic gratings in the master disk, which produce reconstruction beams directed oppositely from the direction of the plane-wave beam. This causes holographic gratings to be created in the blank disk by the interaction of the counterpropagating reconstruction beams and the plane-wave beam. However, in another embodiment, the master disk is placed over the top of the blank disk, and the plane-wave beam is directed towards an externally facing top surface of the master disk. In this case, the master disk is transparent to the plane-wave beam, and the holographic gratings created in the master disk are created such that the reconstruction beams produced during the illuminating step are directed in the same direction as the plane-wave beam used to illuminate the blank and master disks. This causes holographic gratings to be created in the blank disk by the interaction of the co-propagating reconstruction beams and the plane-wave beam.

It is also possible for the holographic gratings created in the master disk to have varying diffraction efficiencies, thereby producing reconstruction beams of proportionally varying intensities during the illumination step. Additionally, the blank disk material is intensity-sensitive such that a holographic grating created in the blank disk during the illuminating step will vary in diffraction efficiency in proportion to the intensity of the reconstruction beam produced from the master disk. This results in holographic gratings of the blank disk having the same relative diffraction efficiencies as holographic gratings of the master disk. Further, the blank disk material can be time-sensitive such that a holographic grating created in the blank disk during the illuminating step will vary in diffraction efficiency in proportion to a duration of the application of the plane-wave beam. This allows the plane-wave beam to be applied during the illuminating step for a time sufficient to create holographic gratings within the blank disk having a desired absolute diffraction efficiency.

An additional step of fixing the reflection gratings can be included in the method. This involves fixing holographic gratings created within the blank disk such that light impinging on the disk does not create new holographic gratings and does not affect holographic gratings already existing in the disk. The illumination step can also be done in more than one way. One preferred method is to illuminate the blank and master disks with successive plane-wave beams, each plane-wave beam having a different one of the wavelengths of light employed to create holographic gratings in the master disk. Another preferred method is to employ a plane-wave beam which comprises at least one of the wavelengths of light employed to create holographic gratings within the master disk. This plane-wave could include all the wavelengths employed when the master disk was recorded with data.

Another method of transferring data to an optical disk involves first placing a blank optical disk adjacent a mask. This mask has a plurality of light beam producing features which when illuminated produce light beams directed toward the blank disk. The light beam producing features are located so as to be adjacent locations within the blank disk where holographic gratings are desired to be created. The blank disk and mask are then illuminated with a plane-wave beam, thereby causing light beams to be produced from the light beam producing features of the mask. These light beams, in combination with the plane-wave beam, create holographic gratings within the blank disk at locations adjacent the features, and no holographic gratings at locations not adjacent the features. The presence and absence of the holographic gratings within the blank disk represents the encoded data.

As with the previously described method, this method can also include the fixing of the holographic gratings. However, the preferred methods of illumination are different. One preferred method involves placing the blank disk adjacent a series of successive masks. Each successive mask is capable of creating a separate set of data within the blank disk. The blank disk and each successive mask are illuminated with successive plane-wave beams, where each successive plane-wave beam has a different wavelength of light. Another method of illumination involves placing the blank disk adjacent a series of successive masks, where each successive mask is capable of creating a separate set of data, just as before. However, this time the distance separating the blank disk from each successive mask is varied such that the distance is different for each of the masks employed. Then, the blank disk and each successive mask are illuminated with a plane-wave beam. The first illumination method transfers wavelength-multiplexed data, whereas the latter method transfers confocal-multiplexed data.

In one embodiment of the just-described method the light beam producing features are reflective and the blank disk is transparent to the plane-wave beam. In this case, the blank disk is placed over the top of the mask with a top side of the blank disk down. The plane-wave beam is then directed towards an externally facing bottom side of the blank disk such that the plane-wave propagates through the blank disk and illuminates the reflective light beam producing features of the mask. This produces counterpropagating light beams which, in conjunction with the plane-wave beam, form holographic gratings in the blank disk. In another embodiment, the portions of the mask not comprising light beam producing features are at least partially transmissive to the plane-wave beam, and the light beam producing features whenever illuminated by the plane-wave beam produce light beams propagating in the same direction as the plane-wave beam. In this case, the blank disk is placed below the mask. The plane-wave beam is then directed towards an externally facing surface of the mask such that the plane-wave propagates through the mask and into the blank disk, while also illuminating the light beam producing features of the mask. This produces co-propagating light beams which, in conjunction with the plane-wave beam, form holographic gratings in the blank disk. In one version of this latter embodiment, the light beam producing features of the mask are areas of higher transmissibility than the areas of the mask not having these features. In another version, the light beam producing features of the mask are areas having a different index of refraction than the areas of the mask not having these features.

In another embodiment of the method of transferring data to an optical disk using a mask, each light-beam producing feature of the mask is capable of producing light beams having a predetermined intensity during the illumination step. The blank disk material is intensity-sensitive such that a holographic grating created in the blank disk during said illuminating step will vary in diffraction efficiency in proportion to the intensity of the light beam produced from the light beam producing feature of the mask. Further, it is possible that the blank disk material is time-sensitive such that a holographic grating created in the blank disk during the illuminating step will vary in diffraction efficiency in proportion to a duration of the application of the plane-wave beam. Accordingly, the plane-wave beam can be applied for a time sufficient to create holographic gratings within the blank disk having a desired diffraction efficiency.

As can be seen the stated objectives of the invention have been accomplished by the above-described embodiments of the present invention. The storage capacity of an optical memory in accordance with the present invention can exceed that of existing, commercially available systems, such as a CD-ROM. In addition, some embodiments of the invention can employ a conventional CD-ROM drive, thereby taking advantage of the mature technologies associated with these devices. These embodiments would also allow a conventional mirror-based CD-ROM disk to be read. This follows since the transmitted light beam would, at whatever wavelength employed, simply reflect off the lands and pits of a conventional disk. The reflected light would be detected by the detector. Further, some embodiments of the present invention also increase the rate at which data can be read. This is done by reading multiple data bits at each data location in the disk in the same time it took to read the single bit existing at the data location of a conventional CD-ROM system.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIG. 1 is an illustration of an apparatus for storing and reading data according to the present invention employing wavelength-multiplexed holographic-grating techniques to store and/or read data on an optical disk, and having a series of mirrors for routing a light beam to the opposite side of the disk.

FIG. 2 is an illustration of the apparatus of FIG. 1, except the series of mirror has been replaced with a single mirror disposed below the opposite side of the disk.

FIG. 4 is an illustration of the apparatus of FIG. 1 or 2, further incorporating a mask for blocking unwanted reconstruction beams from holographic gratings in adjacent data locations in the disk.

FIG. 5 is a close-up view of the mask of FIG. 4 showing that most, but not all, the light beams reconstructed from holographic gratings in adjacent data location is blocked.

FIG. 7 is a cross-sectional illustration of two adjacent holographic-grating elements in a portion of a volume holographic disk and the counterpropagating focused beams used to create them.

FIG. 8A is an illustration of the apparatus of FIG. 1, incorporating the mask of FIG. 4, wherein the focusing lens(es) used to focus the collimated light beam directed at the top surface of the disk is eliminated, thereby producing a plane-wave beam.

FIG. 11A illustrates reconstruction beams produced from an optical disk encoded in accordance with the present invention when illuminated with a plane-wave beam.

FIG. 11B illustrates the method of replicating data stored on an optical disk produced in accordance with the wavelength-multiplexed approach of the present invention into a blank optical disk.

FIG. 12 illustrates the method of replicating data encoded on masks into a blank optical disk using the wavelength-multiplexed approach.

FIG. 13C is an illustration of the apparatus of FIG. 13B, wherein the beam splitter has been replaced with an angled mirror.

FIG. 14 is an illustration of the method by which holographic gratings are written into an optical disk with the apparatuses of FIGS. 8A–D.

DETAILED DESCRIPTION OF THE PREFERRED EMBODIMENTS

Figure 3:
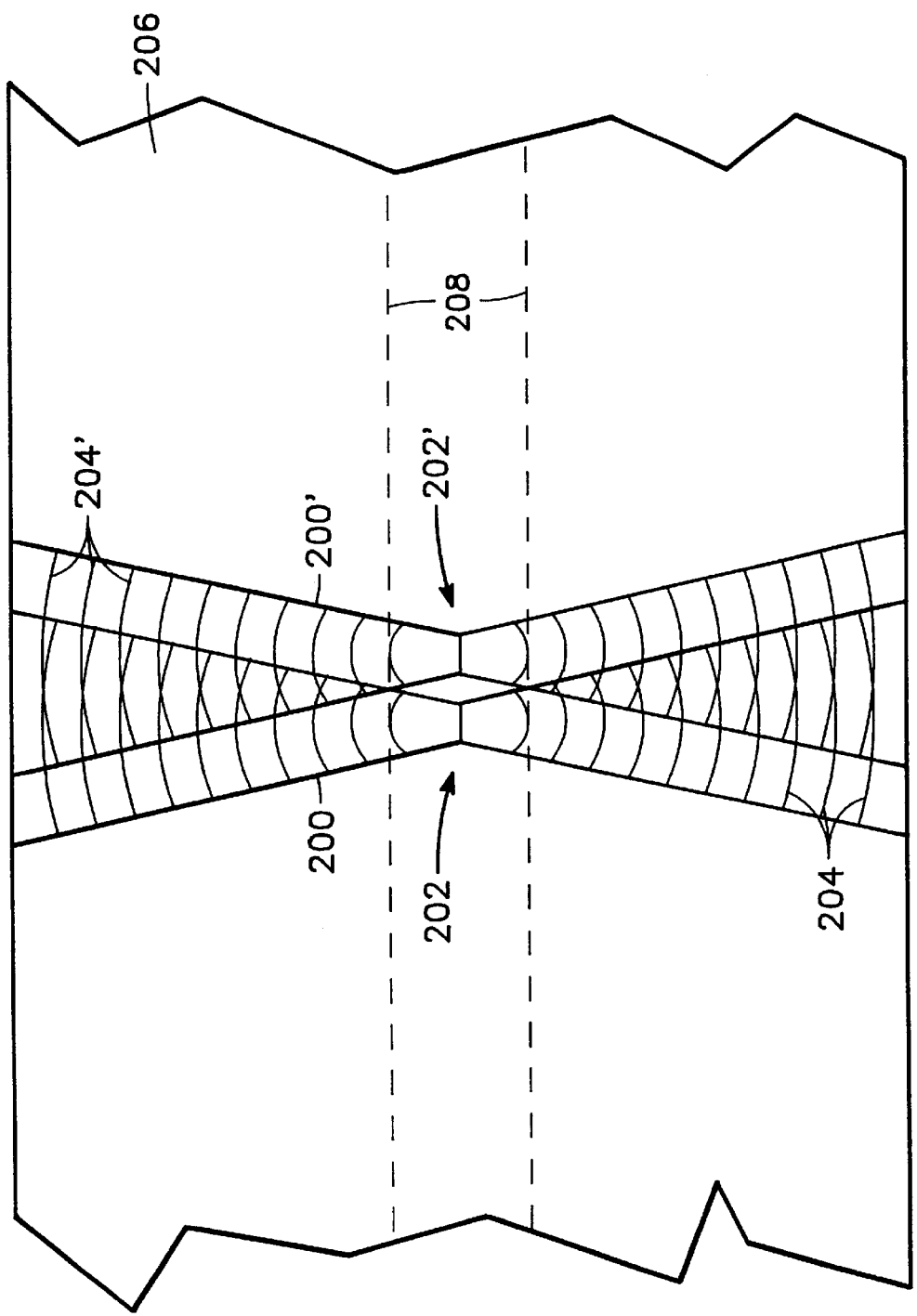
FIG. 3 is a cross-sectional illustration of two adjacent holographic-grating elements in a portion of a volume holographic disk showing an overlapping of holographic gratings.

Preferred embodiments of the present invention will now be described with reference to the drawings.

FIG. 1 depicts one embodiment of a holographic-grating based optical memory in accordance with the present invention. A volume holographic disk 100 having at least a portion thereof made of a suitable volume holographic material is employed as the data storage medium. Although this material preferably has a one-piece continuous structure, it is convenient for descriptive purposes to envision it as being made up of many separate holographic-grating elements 102. Each holographic-grating element 102 is preferably just slightly larger in size than the spot of a focused beam to be described in more detail later in this disclosure.

Suitable volume holographic materials include photorefractive crystals such as $LiNbO_3$ and $BaTiO_3$, dichromate gelatin (DCG), and Dupont's photopolymer. However, since photorefractive crystals are normally difficult to grow in large size, DCG and Dupont's photopolymer are preferred candidates because these two materials are readily available in sizes large enough to function as the storage medium in the aforementioned volume holographic disk 100. However, it is not intended that the present invention be limited to these materials. It is anticipated that the success of systems employing volume holographic disks will become a significant driving force for inventing more and better synthetic volume holographic materials. As these new materials become available, it is envisioned that they could be used in place of the aforementioned candidate materials.

In writing data onto the disk 100, a holographic grating is created at the location of one of the holographic-grating elements 102 to represent a first of the two binary states. Conversely, if the second binary state is to be represented, no holographic grating is created. To create a holographic grating, light is emitted from a tunable laser light source 104, such as an injection-current wavelength-tunable laser diode. The light is emitted at a particular wavelength and is collimated by a lens 106 (or a set of lenses, if desired). Then, this collimated beam 108 is split into two beams by a beam splitter 110. Thus, a reflected collimated beam 112 and a transmitted collimated beam 114 are created. The reflected collimated beam 112 is directed by a set of mirrors 116, and then focused into the holographic-grating element 102 by a lens 118 (or set of lenses). The transmitted collimated beam 114 is also focused onto the same spot within the holographic-grating element 102 by a lens 120 (or set of lenses). These two counterpropagating beams 112, 114 will create a holographic grating in the holographic-grating element 102. The process of creating or refraining from creating holographic gratings is then repeated for each holographic-grating element 102 in the disk 100.

An alternate version of the embodiment depicted in FIG. 1 is shown in FIG. 2. In this alternate version, the set of mirrors used to direct the reflected collimated beam 112 to the underside of the disk 100 has been eliminated. In its place a mirror 128 has been placed on the side of the lens(es) 118 opposite the underside of the disk 100. The transmitted collimated beam 114 emerges from the underside of the disk 100 after coming to a focus inside the holographic-grating element 102. The beam 114 then is collimated by the lens(es) 118 and impinges on the mirror 128. The reflection of the transmitted collimated beam 114 from the mirror becomes the reflected collimated beam 112'. This reflected beam 112' is then focused by the lens(es) 118 to the same spot within the holographic-grating element 102 at which the transmitted beam 118 is focused. Thus, the two counterpropagating beams 112', 114 will create a holographic grating in the holographic-grating element 102, just as in the original version. The mirror 128 can be a simple reflection mirror, or a phase conjugate mirror. A simple reflection mirror has the advantage of being low cost, but requires careful alignment to achieve a maximum overlap of the reflected beam 112' with the transmitted beam 114 within the holographic-grating element 102. On the other hand, a phase conjugate mirror automatically aligns the reflected beam 112' with the transmitted beam for maximum overlap. However, at a higher cost.

After the whole disk 100 has been recorded with data, a fixing process is employed to permanently store any holographic grating produced in the individual holographic grating elements 102. This prevents disruption of the holographic gratings during the reading process that will be described later. The fixing process varies depending on the type of volume holographic material used. However, as an example, Dupont's photopolymer material uses ultra-violet (UV) light to fix the holographic gratings. Although the disk could be illuminated with UV light once removed from the system, it is preferable that the fixing be accomplished in-situ. This requires the addition of a UV light source (not shown) which is capable of illuminating the disk while installed in the optical disk drive.

Once the desired data has been "written" into the holographic-grating element 102, it can be read by focusing the transmitted collimated beam 114 onto the spot in the disk 100 corresponding to that element 102. This is accomplished by emitting light from the tunable laser diode 104 at the same wavelength mentioned above in connection with the writing step. The emitted light is then collimated by the lens 106, and subsequently passed through the beam splitter 110. Lens 120 is used to focus the beam 114 onto the spot in the holographic-grating element 102 where the binary bit was written. If a holographic grating had been created in the holographic-grating element 102, a beam corresponding to the original reflected beam 112 will be reconstructed and directed back through the lens 120 and into the beam splitter 110. This recostructed beam 122 is then diverted by the beam splitter 110 toward a detector 124. The detector 124 detects the reconstructed beam 122 impinging upon it and generates an electrical signal indicating the first binary state was "read". If a holographic grating was not created in the holographic-grating element, nothing will be reconstructed upon application of the transmitted beam 114. The detector 124 will, therefore, not generate any signal and this will be "read" as the second binary state. A shutter 129 can also be included in the embodiments of the invention shown in FIGS. 1 and 2. This shutter 129 is interposed in the path of the reflected collimated beam 112, 112'. The shutter 129 allows the beam 112, 112' to pass during write operations, and blocks it during read operations. Blocking the reflected collimated beam 112, 112' during read operation prevents it from reaching the detector 124 and causing noise.

As can be seen, the focused reflected collimated beam 112, 112' is not needed for the reading step. Thus, a read-only system in accordance with the preferred embodiment of the present invention need only have an optical head 126 comprising the optical components described above in connection with the read operation (and shown within the broken-line box in FIGS. 1 and 2).

It is not intended that the present invention be limited to employing a conventional CD-ROM drive and the same number of data storage locations as a conventional CD. The speed at which the holographic disk 100 rotates, and the number of holographic-grating elements 102 per disk, can be selected to accommodate the users particular needs. However, it is convenient to compare embodiments of the invention which do employ these conventional aspects with existing CD-ROM systems, in order to show the improved storage capability and throughput rates afforded by the invention.

For the most part the drive mechanism and electronics of a conventional CD-ROM can be employed in the device embodying the present invention. The optical head of the conventional CD-ROM would be replaced with an optical head in accordance with the present invention, and a volume holographic disk 100 would be used. The storage capacity of this hybrid system exceeds a conventional CD-ROM because the storage density of the holographic disk 100 can be greatly expanded beyond that of a conventional CD. One way of accomplishing this is the use of a wavelength multiplexing technique to store multiple gratings in the same holographic-grating element 102 of the holographic disk 100. Owing to the Bragg diffraction principle, these gratings are wavelength sensitive. Thus, a holographic grating created in a holographic-grating element 102 at one wavelength (or the absence thereof can be "readout" using the beam of the same wavelength, independent of holographic gratings created at different wavelengths.

The process used to create multiple data bits in a single holographic-grating element 102 is identical to that described above, except that it is repeated several times at different wavelengths. This can be accomplished in two ways. In the first method, once a holographic grating has been created (or not), in a holographic-grating element 102 at a first wavelength, the next data bit is similarly "written" into the same element 102 at a second wavelength, and so on. Many different wavelengths can be scanned through before the optical head 126 moves to the next holographic-grating element position. Therefore, a corresponding number of data bits can be recorded in a single holographic-grating element 102. The recorded data is "readout" in similar fashion, with the tunable laser diode 104 being made to scan through the same sequence of wavelengths, in the same order, at a holographic grating element position. Thus, the recorded sequence of binary bits is detected by the detector 124.

As a result, a system in accordance with the present invention employing a conventional CD-ROM drive and the aforementioned first method of storing data, will be able to record N times more data on a single disk, where N is the number of wavelengths scanned at each holographic-grating element position. The N increase in data storage results from being able to record as many data bits a particular location on the disk 100 as there are wavelengths employed.

The second method of creating multiple data bits in a holographic-grating element 102 using a wavelength multiplexing approach is to record data over the entire disk 100 at one wavelength, and then repeat the process for each succeeding wavelength. The data is then read by scanning the entire disk 100 at each of the wavelengths in the sequence used to record the data. This second approach also allows an N increase the amount of data stored on each disk 100. However, in the second approach, it is immaterial whether each wavelength pass writes data at specific locations in the disk 100. Rather, data written in the disk 100 at one wavelength can occupy one set of disk locations, while data written at a different wavelength can occupy a completely different sets of locations.

Crosstalk can come from two sources. First, some amount of crosstalk noise can be caused by unwanted reconstructions from holographic gratings in a holographic grating element 102 created at a different wavelength. It is this type of crosstalk which is reduced by the aforementioned even distribution of holographic gratings in the disk 100 associated with the second data recording method. However, regardless whether the first or second data recording method is used, the wavelength characteristics of the emitted beam and the thickness of the holographic material in the disk 100 can be chosen to minimize this source of crosstalk, while still allowing the recording of the desired number of data bits at each holographic-grating element. These noise reduction techniques will be discussed in detail later in the specification.

A second potential source of crosstalk noise can be caused by holographic gratings existing in holographic-grating elements adjacent to the one being scanned. For example, assume a disk thickness of 2 mm, a spacing between holographic-grating elements approximately equal to that used between the pits and lands in a standard CD-ROM systems, and reflected and transmitted collimated beams 112, 114 focused to the conventional 1 μm diameter spot during the "writing" of a holographic grating in the disk 100. As shown in FIG. 3, the depth at which the counterpropagating beams focus will be such that a holographic grating 200' existing in an adjacent holographic-grating element 202' may partially overlap a holographic grating 200 resident in the element 202 being scanned, in the region outside the dashed lines 208. The overlapping regions are sources for crosstalk noise because they will produce unwanted reconstructions during readout. For example, when no holographic grating has been written in element 202, partial reconstruction from a holographic grating 200' in the adjacent element 202' may create a false signal when element 202 is read. However, as illustrated in FIG. 3, the grating lines 204, 204' take on a curved shape in the material of the disk 206 bounded by the exterior shape of the counterpropagating beams that created them. Because of the curved nature of the grating lines 204, 204', it can be seen that a beam of light focused into the holographic grating element 200 will have a central axis bisecting at the apex of the curved grating lines 204 associated with that element 202. Whereas, the central axis of the beam merely grazes the outer regions of some of the grating lines 204' of the adjacent element 202'. Since the "read" beam is not centered in respect to the gratings lines 204' in the adjacent element 202', the energy is considerably less than that coming from the centered grating lines 204 of the element 202 being scanned. Therefore, even though some crosstalk noise is generated due to the low energy reconstructed beams from these adjacent grating lines 204', most likely the noise will be insignificant given the aforementioned standard spacing used in current CD-ROM systems. It is believed the crosstalk will not exceed acceptable levels.

Even though it is believed that the crosstalk noise caused by an adjacent holographic grating will be at acceptable levels, it can be reduced by modifying the structure of the embodiments shown in FIGS. 1 and 2. As shown in FIG. 4, a mask 130 and lens 132 (or set of lens if desired) are placed between the beam splitter 110 and the detector 124. During the reading process, the reconstruction beam 122 exits the beam splitter 110 and passes through the lens(es) 132. The lens(es) 132 focuses the beam 122 towards the sensing surface of the detector 124. As can be seen, reconstruction beams from holographic gratings of adjacent holographic-grating elements 102a, 102b will focus at different spots, than the reconstruction beam from the holographic grating element 102 actually being scanned. The lens(es) 132 is aligned such that any reconstruction beam from the holographic-grating element 102 is focused along the optical axis of the lens(es) 132. The mask 130 is positioned in front of the detector 124 with an opening 138 coinciding with the optical axis of the lens(es) 132. The opening 138 is sized so that the mask 130 allows the focused light reconstructed from the holographic-grating element 102 to reach the detector (or no light in the case where a holographic grating has not been written in the element 102). Whereas, light reconstructed from the holographic gratings of adjacent holographic-grating elements 102a, 102b is focused on the solid portions of the mask 130 and blocked. In this way the aforementioned crosstalk noise caused by adjacent holographic-grating elements is mostly eliminated.

It is noted that FIG. 4 shows the set of mirrors 116 (of FIG. 1) in dashed lines and mirror 128 (of FIG. 2) in solid lines. This intended to denote that either configuration can be employed in the modification.

It is also noted that the just-described noise reduction method does not completely eliminate the crosstalk because the reconstructed light beams from adjacent holographic-grating elements 102a, 102b is not a true reconstruction of the beam 112, due to their physical offset from the readout beam 114. These distorted reconstruction beams of adjacent holographic gratings tend to focus to a large spot on the mask 130, as shown in FIG. 5. In cases where the focused spot from adjacent elements 102a, 102b is large enough to extend over the opening 138, light therefrom will impinge on the detector 124, thereby causing a small amount of crosstalk noise. As will be described later in the specification, an alternate preferred embodiment of the present invention eliminates this phenomenon, thus eliminating this type of crosstalk.

The maximum number of wavelengths N that can be employed is determined by several factors. Among these are the center wavelength and tunable range of the laser diode 104, the minimum wavelength separation between two laser diode wavelengths, the thickness and useful wavelength sensitivity of the volume holographic material employed in the disk 100 and the amount of crosstalk between holographic gratings produced by different wavelengths in the same holographic-grating element 102 which is acceptable to the user. In the 180 degree geometry associated with some embodiments of the present invention, the minimum wavelength separation Δλ which would result in an absence of crosstalk between holographic gratings in the same holographic-grating element 102 is given by:

$$\Delta\lambda = \lambda^2/2d \quad (1)$$

where λ is the center wavelength of the laser diode 104, and d is the thickness of the holographic material in the disk 100. As an example, assume N is desired to be equal to about 10 and a holographic material with the appropriate wavelength sensitivity is used in the disk 100. If an optical memory with a tunable laser diode 104 exhibiting a center wavelength of about 0.8 μm (i.e. similar to existing CD-ROM systems), a wavelength range of 2 nm and a resolution of 0.1 nm, is employed, equation (1) yields a disk thickness of 3.2 mm. This disk thickness could be even thinner if some amount of the aforementioned crosstalk noise is acceptable.

Although the above-described configuration would work well, it is desirable from a cost standpoint to reduce the thickness of the holographic material without increasing the crosstalk noise. Generally, the thinner the holographic material, the less expensive the disk is to manufacture. In addition, if it is desired to employ existing optical drives, such as those used in CD-ROM systems, an overall disk thickness of about 1 mm would be appropriate, as that is the approximate thickness of conventional optical disks. A disk having a thin layer of holographic material embedded in a 1 mm thick superstructure made of a transparent plastic would achieve both the aforementioned goals.

As can be derived from Equation (1), a decrease in the thickness of the holographic material d will result in an increase in the minimum wavelength separation Δλ. For example, assume a 50 μm thick layer of holographic material having the appropriate wavelength sensitivity and a laser diode 104 with a center frequency of 0.8 μm are employed. In accordance with Equation (1), the minimum wavelength separation Δλ which would not produce crosstalk noise is 6.4 nm. Similarly, a 20 μm thick layer of holographic material would increase the noise-free minimum wavelength separation Δλ to 16 nm. As one skilled in the art will recognize, these minimum wavelength separations Δλ are beyond the capabilities of existing tunable laser diodes. A shorter center wavelength could be employed which would also decrease the minimum wavelength separation Δλ, as evident from Equation (1). However, given center wavelengths available in current laser diodes, this decrease would not be enough to allow both the use of a tunable laser diode and the aforementioned disk configuration. For example, assume a center frequency λ of 0.65 μm. A 50 μm thick layer of holographic material would require a minimum wavelength separation Δλ of 4.2 nm, and a 20 μm thick layer would require a minimum wavelength separation Δλ of 10.6 nm. As can be seen, these minimum wavelength separations Δλ are still outside the capabilities of existing tunable laser diodes. Therefore, to achieve the aforementioned disk configuration, the embodiments of the inventions depicted in FIGS. 1 and 2 will have to be modified.

Figure 6A:
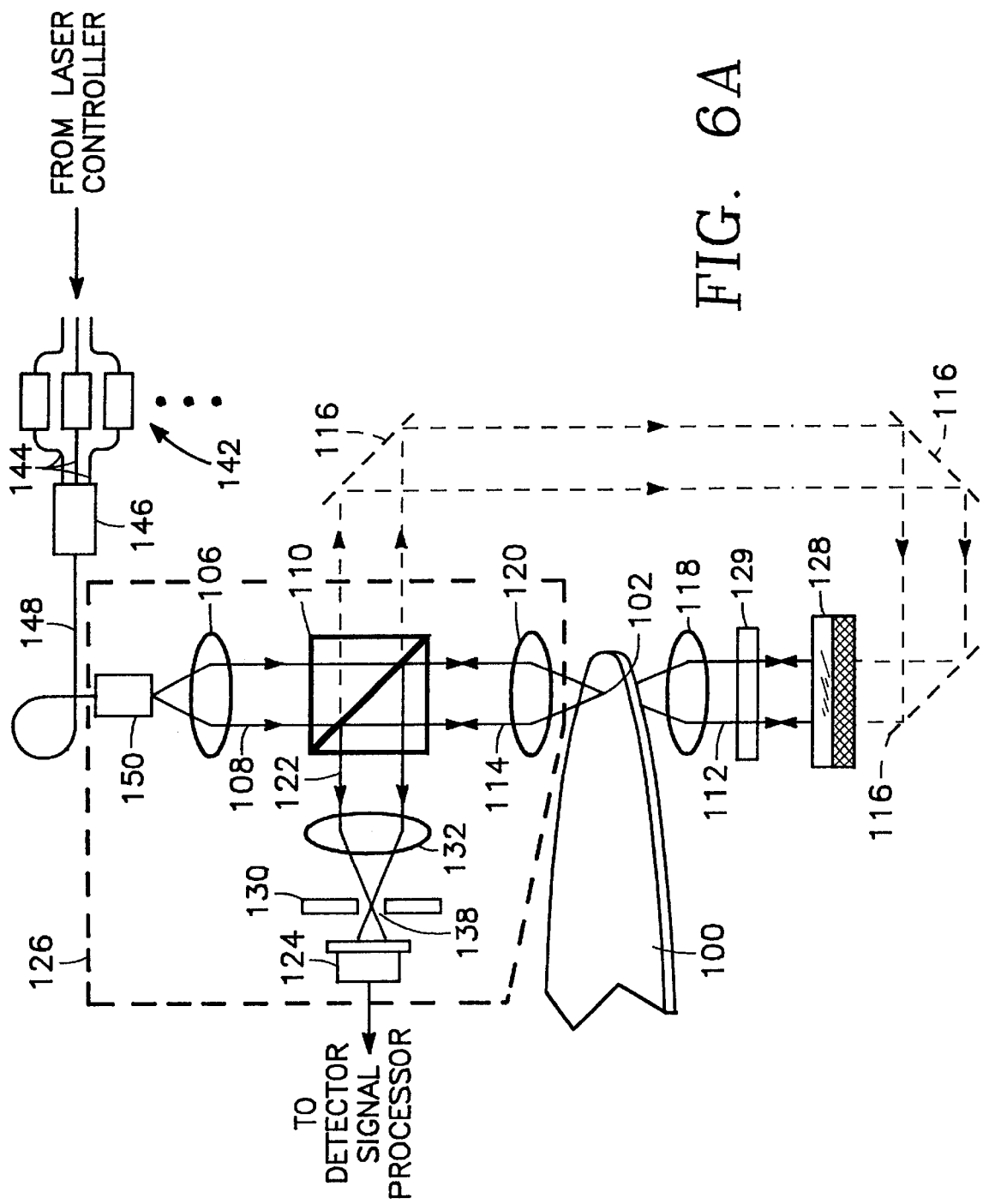
FIG. 6A is an illustration of the apparatus of FIG. 4, wherein the tunable laser diode has been replaced with multiple single-wavelength laser diodes connected to fiber optic lines used to route the light therefrom to a first collimating lens.
Figure 6B:
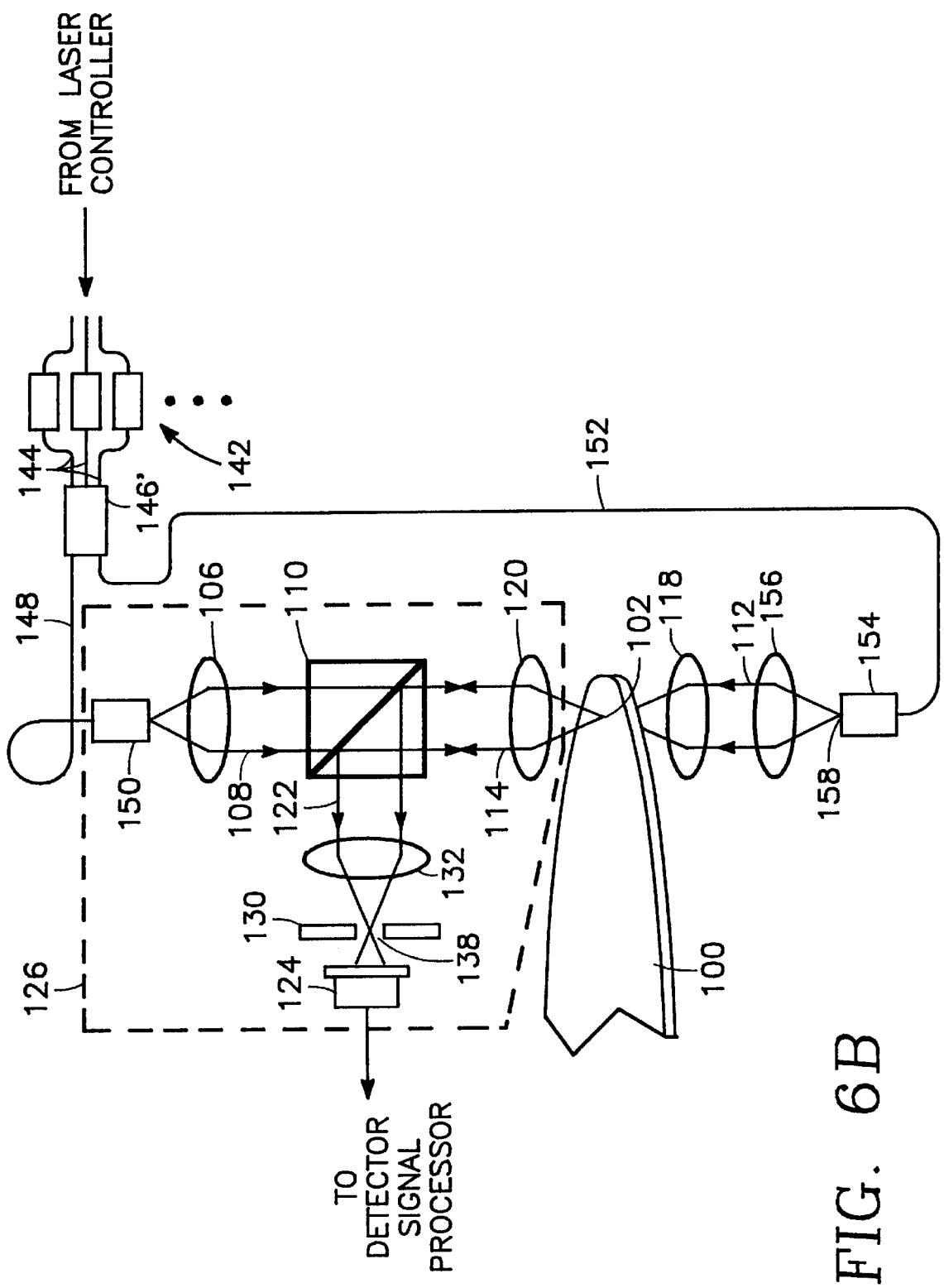
FIG. 6B is an illustration of the apparatus of FIG. 6A, wherein the set of mirrors or single mirror used to route the light from the laser diodes to the opposite side of the disk is replaced with a fiber optic line and collimating lens(es).

A way of modifying the embodiments of FIGS. 1 and 2 to eliminate the need for a tunable laser source is to replace it with a series of single-wavelength laser diodes which together exhibit the desired center wavelength λ and minimum wavelength separation Δλ. In other words, these laser diodes would be chosen such that their wavelengths are separated by the desired minimum wavelength separation Δλ, and the laser diode which corresponds to the median wavelength among the series produces the desired center wavelength λ. Given that 10 or more different wavelengths might be used, an alternate embodiment of the present invention with the aforementioned series of laser diodes would benefit from an implementation having fiber optic lines to transmit the light from these laser diodes to the disk. Embodiments having fiber optic connections are shown in FIGS. 6A–B. FIG. 6A depicts the simplest modification of the systems of FIGS. 1 and 2. The modifications entails replacing the tunable laser diode with the aforementioned discrete laser diodes 142. The laser diodes 142 are connected by optic fibers 144 to the inputs of a coupler 146. The single output of the coupler 146 is connected to one end of a similar optic fiber 148 whose other end is aligned with the optical axis of lens(es) 106 via a fiber holder 150. It is noted that FIG. 6A shows the set of mirrors 116 (of FIG. 1) in dashed lines and mirror 128 (of FIG. 2) in solid lines. This intended to denote that either configuration can be employed in the modification.

FIG. 6B shows another possible modification to the embodiment of FIG. 1. In this modification the laser diodes 142 are connected by the optic fibers 144 to the inputs of a fiber coupler/splitter 146'. The coupler/splitter 146' divides the input from a laser diodes 142 between two separate output fibers 148, 152. The first fiber 148 is connected to a fiber holder 150 which is aligned with the optical axis of lens(es) 106, as in FIG. 6A. However, in this modification, the set of mirrors 116 (of FIG. 1) or mirror 128 (of FIG. 2), are replaced with the second fiber 152, a fiber holder 154 and a collimating lens 156 (or set of lenses if desired). The second is fiber 152 is connected to the fiber holder 154 and transfers the light from the coupler/splitter 146' to the holder 154. The holder 154 aligns the end of the fiber 152 with the optical axis of lens(es) 156. The light transferred by the fiber 152 is collimated by lens(es) 156. Thereafter it is focused by lens(es) 118 and the writing process proceeds as described in connection with FIG. 1. During read operations, fiber coupler/splinter 146' transfers light only to output fiber 148, and not fiber 152. This precludes any possibility that light beam 112 would reach the detector 124 and cause noise.

It is noted that although the above-described embodiments of the present invention having fiber optic lines were driven by the use of a plurality of discrete laser diodes, similar fiber optic connections could be employed in the embodiments of the invention having a single tunable laser diode. In that case, the tunable laser diode would be connected via a single optic fiber directly into the fiber holder of FIG. 6A, or into a fiber splitter in the embodiment of 6B.

All the embodiments of the present invention discussed so far entail focusing the counterpropagating transmitted and reflected beams 112, 114 onto a spot inside the holographic material of the disk 100. This produced a holographic grating 200, 200' such as illustrated in FIG. 3. However, the beams 112, 114 could also be focus to a spot outside the holographic medium, such as shown in FIG. 7. FIG. 7 depicts two adjacent holographic-grating elements 202, 202' both having holographic gratings 200, 200' written into them. The counterpropagating beams 112, 114 used to produce the holographic gratings 200, 200' were focused to a spot above the holographic material of the disk 100. This produces a cone-shaped holographic grating, rather than the hourglass-shaped holographic grating of FIG. 3. The cone-shaped holographic gratings have advantages in some applications. The point at which the beams come to a focus has a relatively high intensity. In the hour-glass shaped grating approach, it is possible depending on the type of holographic recording medium employed, that this high intensity focused spot within the holographic material could create a complex grating region. Such a complex grating region could give rise to excessive crosstalk. However, it can also be seen by comparing FIG. 3 to FIG. 7, that the region of overlap between adjacent holographic gratings 200, 200' is larger in the case of cone-shaped holographic gratings, than in the case of hourglass-shaped holographic gratings. Therefore, the potential for crosstalk noise is also increased with a cone-shaped holographic grating. This is of some concern in the embodiments of FIGS. 1 and 2. However, with the addition of the mask 130 of FIG. 4, this concern is alleviated.

The counterpropagating transmitted and reflected beams 112, 114 described above are both focused on a spot (either within the holographic material or outside it). In the embodiments according to the present invention to be discussed next, a plane wave is used as one of the beams, instead of a focused beam.

Figure 8B:
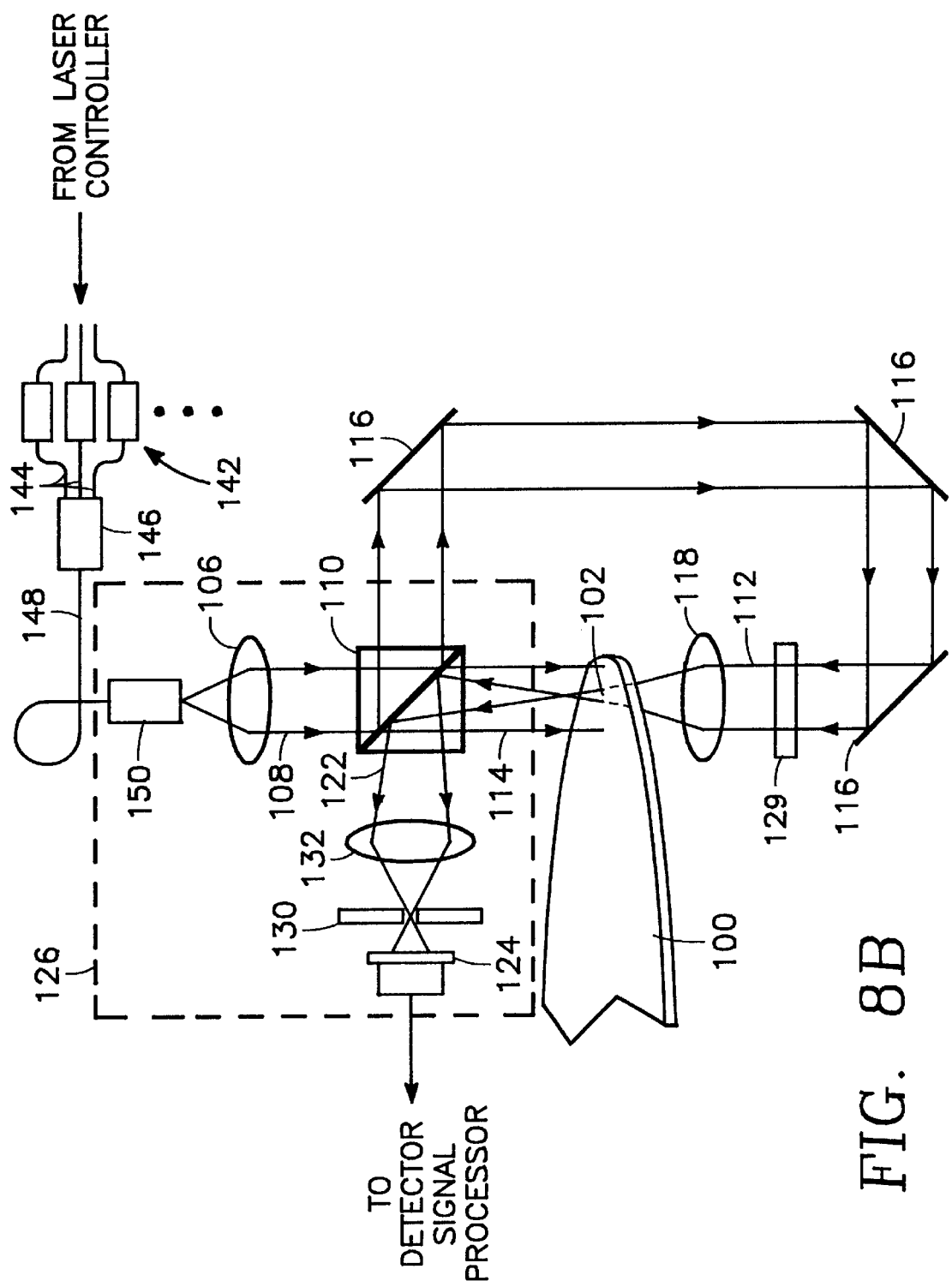
FIG. 8B is an illustration of the apparatus of FIG. 8A, wherein the tunable laser diode has been replaced with multiple single-wavelength laser diodes connected to fiber optic lines used to route the light therefrom to a first collimating lens.
Figure 8C:
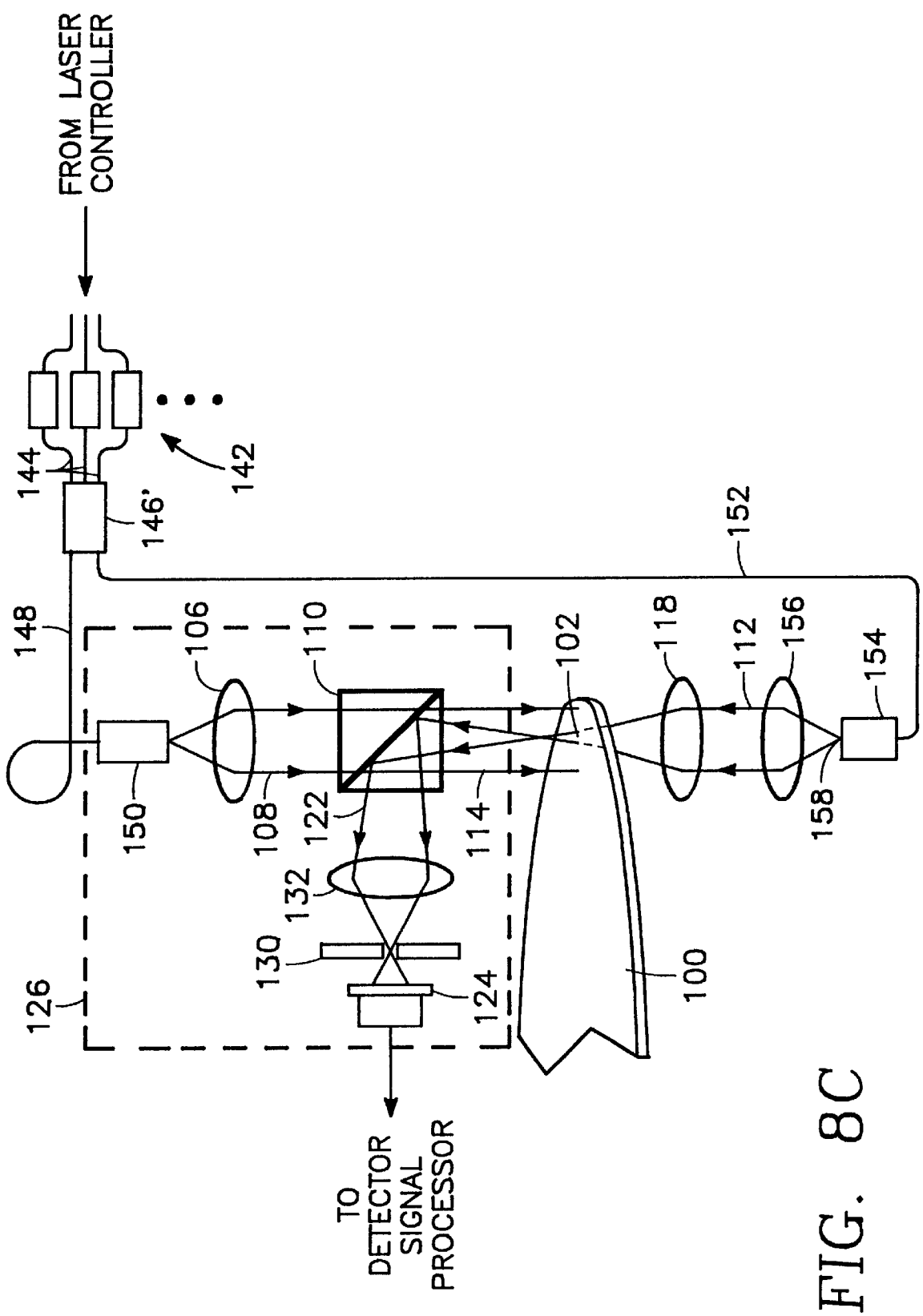
FIG. 8C is an illustration of the apparatus of FIG. 8B, wherein the set of mirrors used to route light from the laser diodes to the opposite side of the disk is replaced with a fiber optic line and collimating lens(es).
Figure 9:
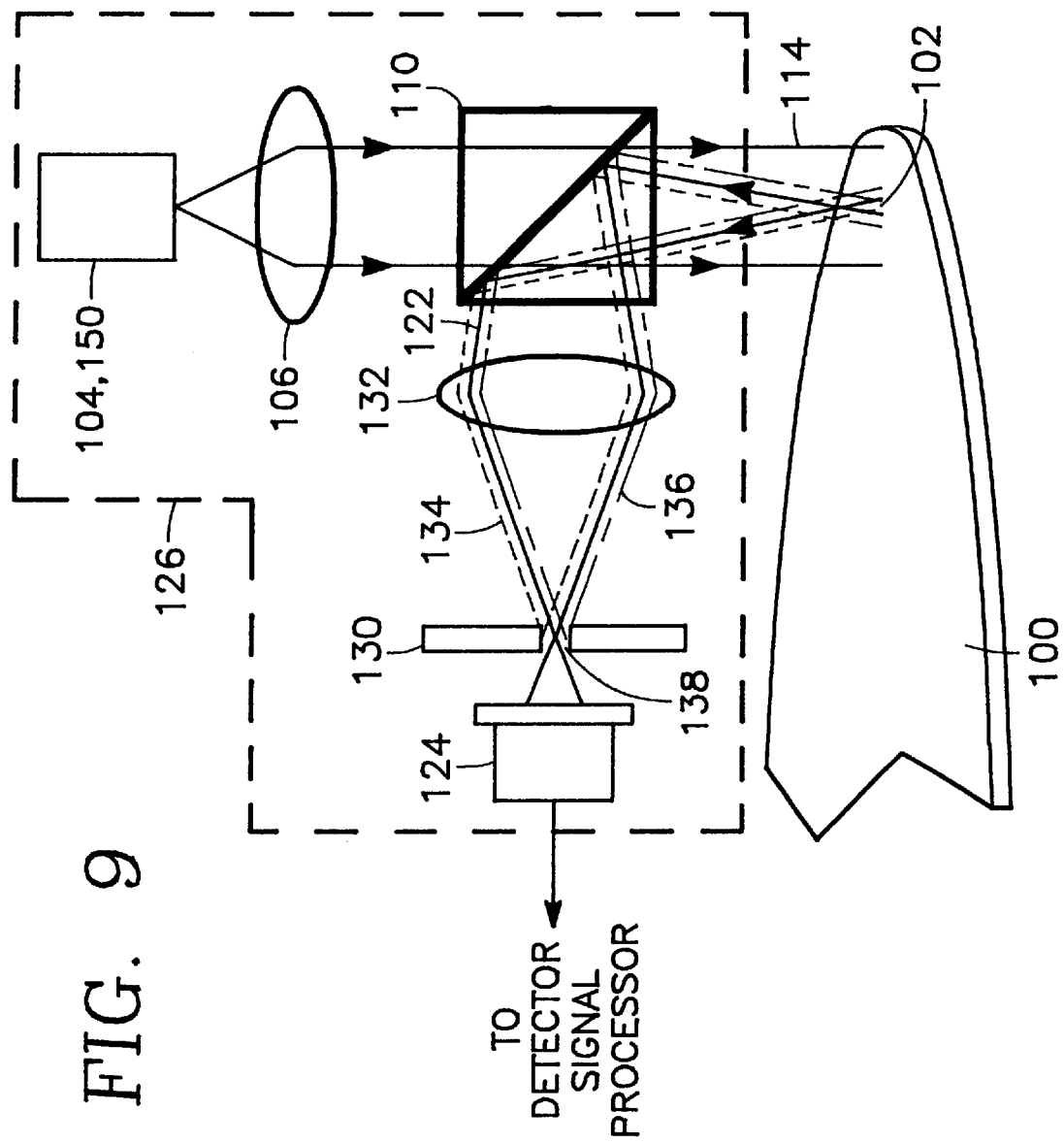
FIG. 9 is a close-up view of the portions of FIGS. 8A–C involved in the reading of an encoded disk and showing that light beams reconstructed from a holographic grating in a data location being read is allowed through the mask to the light detector, whereas light beams reconstructed from holographic gratings in adjacent data locations is blocked.

FIGS. 8A–C show the embodiments of FIG. 1 (incorporating the mask of FIG. 4) and FIGS. 6A–B, respectively, modified for the plane-wave approach. It can be seen in FIGS. 8A–C, that the plane-wave embodiments of the present invention are essentially the same as the aforementioned previous embodiments with the exception that lens(es) 120 has been eliminated. The elimination of this lens(es) results in the collimated transmitted beam 114 striking the upper surface of the disk 100 without being focused. This unfocused transmitted beam 114 is the aforementioned plane-wave beam. It is noted that the plane-wave beam actually passes through the disk. However, for clarity, the beam is shown as being truncated at the disk in FIGS. 8A–C, and all subsequent figures. The counterpropagating focused beam 112 and the plane-wave beam 114 produce a holographic grating in the holographic-grating elements 102 during the writing process, just as described with the focused beam embodiments. As shown in FIG. 9, when a holographic grating is read, a reconstruction of the focused beam 112, i.e. beam 122, is produced from the holographic-grating element towards the beam splitter 110. FIG. 9 also shows that adjacent holographic gratings would also produce reconstruction beams 134, 136. These other reconstruction beams 134, 136, along with reconstruction beam 122 are diverted by the beam splitter 110, though the focusing lens(es) 132, towards the mask 130 and detector 124. The reconstruction beam 122 is focused so as to pass through the opening 138 in the mask 130 and onto the sensing surface of the detector 124. Whereas, the other reconstruction beams 134, 136 are blocked by the mask 130. Thus, only the holographic grating (or absence thereof in the holographic-element 102 being read is sensed. It is also noted that the plane-wave beam 114, unlike the focused beam of previous embodiments, produces true reconstructions of beams from the adjacent holographic gratings. Therefore, the previously described distortion which tended to produce a large spot on the mask 130 does not exist in the plane-wave beam embodiments of the invention, except for those grating elements at the edge of the beam which are only partially reconstructed. However, as these partial reconstructions are significantly distant from element 102, they will be completely blocked by the mask 130. Accordingly, crosstalk noise from adjacent holographic gratings during readout is essentially eliminated.

In addition to the advantage of eliminating the crosstalk noise from adjacent holographic gratings, the use of a plane-wave beam has other advantages, as well. One of these advantages is simplification of the readout process. In the embodiments of FIGS. 1, 2, 6A and 6B, the alignment of the lens(es) 120 with a holographic-grating element 102 to center the focused readout beam 114 with any holographic grating written into the element 102, is critical to ensure its detection. However, the "spot" of the plane-wave beam 114 (of FIGS. 8A–D) is much larger than the top surface of a single holographic-grating element. Thus, alignment of the beam with a particular element 102 is less critical. The centerline of the beam 114 must just be closer to the holographic-grating element 102 being read, than any adjacent elements. In addition, the use of a plane-wave beam approach facilitates replication of the disk 100. This advantage will be discussed in detail later in the description.

Figure 10:
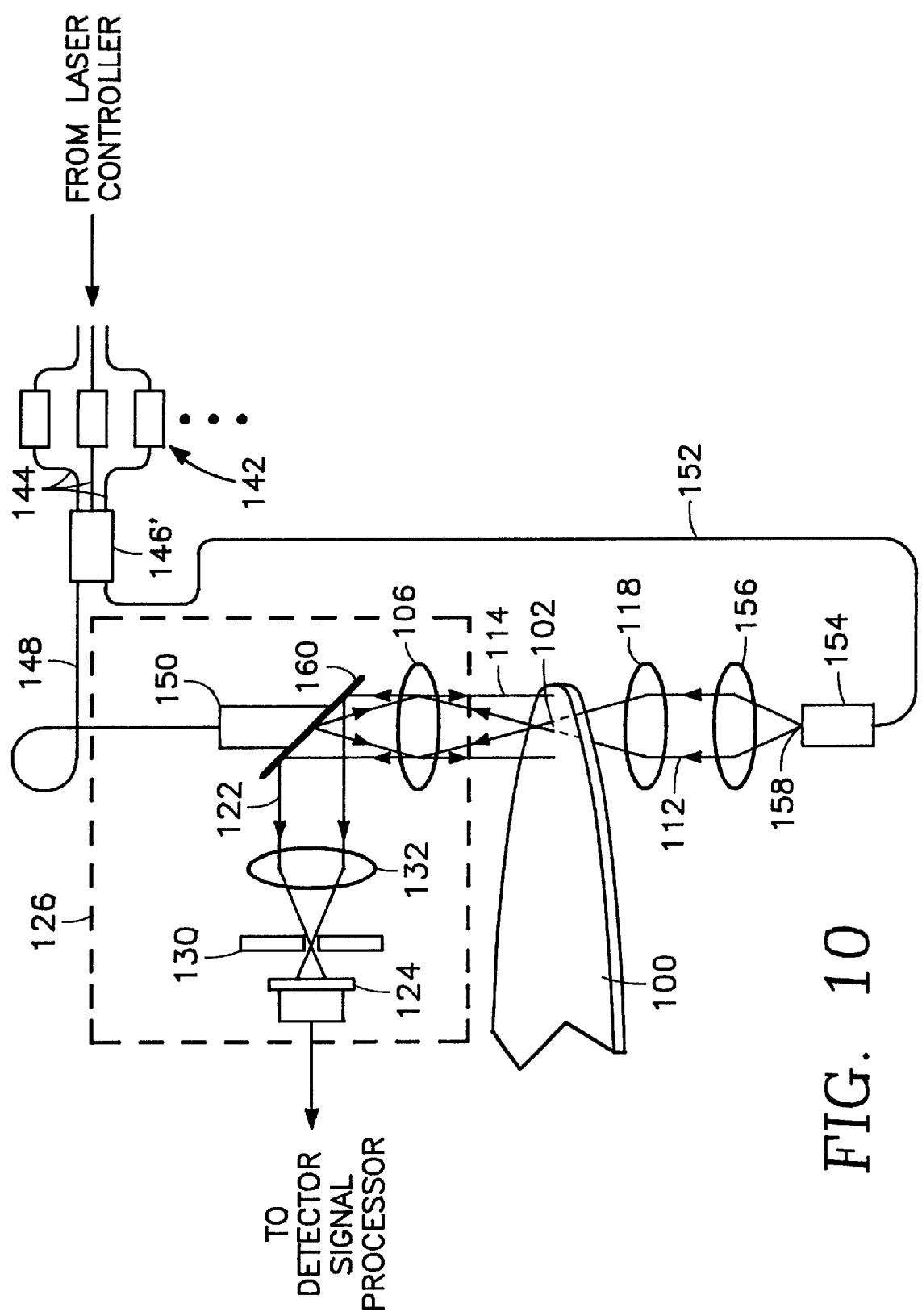
FIG. 10 is an illustration of the apparatus of FIG. 8C, wherein the beam splitter has been replaced with an angled mirror.

Another advantage of the plane-wave approach is that the relatively expensive beam splitter 110 of previous embodiments can be replaced with a simple mirror. FIG. 10 shows an embodiment of the present invention which employs such a mirror 160. In this embodiment, which is essentially a modification of the embodiment of FIG. 6B, the fiber holder 150 is attached to the back of the mirror 160. The first fiber 148 is inserted through the mirror, such that the end of the fiber 148 is aligned with the optical axis of lens(es) 106. Lens(es) 106 has been moved to a position below the mirror 160, as shown. The mirror 160 is placed at an angle such that light from the disk 100 is deflected toward the mask 130 and detector 124. Thus, the light from the first fiber 148 is collimated by lens(es) 106 to produce a plane-wave beam 114, and impinges on holographic-grating element 102. During writing operations, the plane-wave beam 114 is used in conjunction with the focused beam 112 from the second fiber 152 to create holographic gratings in the holographic material of the disk 100. During reading operations, the plane-wave beam 114 is used to produce a light beam from a holographic grating representing a reconstruction of the beam 112, i.e. beam 122. This reconstruction beam 122 is deflected by the mirror 160 towards the mask 130 and detector 124, as mentioned above. It is noted that the end of the first fiber 148 will not interfere with beam 122 when it is deflected by the mirror 160 because it is not at the image plane of the beam.

There is a tradeoff, however, connected with the use of the plane-wave approach. As alluded to above, the size of the plane-wave beam (i.e. its "spot") is much larger than a holographic-grating element. This is necessary to generate a beam with the desired plane-wave characteristics. The result of this large beam size is that a significant amount of the laser power is wasted. Instead of concentrating the power necessary to write and read holographic gratings in an element by focusing it, the power is spread out over the diameter of the beam. This requires that the overall power of the plane-wave beam exceed that which is necessary when a focused beam is employed. Accordingly, the plane-wave approach requires a more powerful laser beam. However, it is believed that the plane-wave approach can be implemented with a laser power of approximately 30 mW. Laser diodes are commercially available which can provide this level of power. The 30 mW of power is required to provide a sufficiently large detection signal from commercially available light detectors.

It was mentioned above that one of the advantages of the plane-wave beam approach was that it facilitated replication of the disk. The ability to replicate disks gives the present invention a big advantage in applications that require high-volume publishing of the same disk. This replication of a disk hinges on the fact that the data (i.e. a reconstruction beam or the lack thereof from a holographic-grating element) is read by illuminating the disk with a plane-wave beam. In the above-described embodiment, the size of the plane-wave beam was such that it covered a few elements at a time. However, if a plane-wave beam having a beam width as large as the disk itself were used to illuminate the disk, the result being that reconstruction beams would be produced from all the holographic grating in the disk at the same time. That is all those holographic gratings written with the same wavelength(s) of light as the plane-wave beam.

FIGS. 11A–B illustrate how a replicant disk 162 can be produced using a master disk 164 encoded by the plane-wave approach described above. FIG. 11A is a simplified illustration of reconstruction beams being produced by the master disk 164 when it is illuminated by a plane-wave beam 114. These reconstruction beams are used to create holographic gratings in the replicant disk 162. As shown in FIG. 11B, the replicant (or blank) disk 162, which is transparent to the wavelengths of light associated with the plane-wave 114, is placed over the top of the master disk 164. It is meant by the term transparent that sufficient light energy passes through the blank disk to the master disk so as to produce reconstructions of the focused beam used to create the holographic gratings in the master disk. Thus, when the replicant. and master disks 164, 162 are illuminated with the plane-wave beam 114, reconstruction beams 166 are produced from any holographic grating written into the master disk at the wavelength of the plane-wave beam 114. The counterpropagating plane-wave beam 114 and reconstruction beams 166 then write holographic gratings into the replicant disk 162, which correspond to those in the master disk 164. Granted the replicated holographic gratings are not the same as in the master disk 164. However, they will still produce reconstruction beams having the same relative positions. Therefore, when the replicated gratings produce reconstruction beams, they reproduce the same data as was encoded on the master disk 164.

In the above-described method for replication, the plane-wave beam 114 could contain light having all the wavelengths used to write holographic grating on the master disk 164. In that case, all the holographic gratings of the master disk 164 would be replicated in the replicant disk 162, at once. Alternately, successive plane-wave beams 114, each being at one of the wavelengths used to encode the master disk 164, could be used to create the replicant disk 162. In the latter case, each successive illumination by a plane-wave beam 114 at a different wavelength would write the holographic gratings of the master disk 164 associated with that wavelength of light, into the replicant disk 162. When all the wavelengths employed in the system are exhausted, the replication is complete. It would even be is possible to employ a plane-wave beam 114 having some but not all the wavelengths of light used to encode the master disk 164. Such a process would be beneficial where a laser source having all the wavelengths is not available, or where only part of the data from the master disk 164 is to be transferred to the replicant disk 162.

An alternate replication method could also be used in which a mask replaces the master disk. As shown in FIG. 12, the mask 170 has reflective indentations 172. A holographic disk 174 in accordance with the present invention is placed on top of the mask 170, top side down. The disk 174 and mask 170 are then illuminated with a plane-wave beam 114, as in the earlier described replication method. The plane-wave beam 114 passes through the disk 174 and impinges on the mask 170. The mask 170 absorbs or transmits the light from the plane-wave beam 114, except at the sites of the reflective indentations 172. The reflective indentations 172 are configured so that light from the plane-wave beam 114 is reflected back towards the disk 174. This reflected light 176, in combination with the counterpropagating plane-wave beam 114, produces cone-shaped holographic gratings in the disk 174, similar to those described previously in reference to FIG. 7.

It is noted that the use of reflective indentations is not the only way to generate the desired grating-producing beams. An alternate embodiment would employ reflective ridges. Another embodiment would use surface coatings or doping of the mask material itself to vary the reflectivity and transmissibility to produce the desired reflective portions. As long as the reflected beam generated by the mask creates the desired holographic gratings in the replicant disk, any one of these methods would be acceptable.

Unless the data is identical at each wavelength of light employed in the system, a series of masks 170 will be required. Each mask 170 would encode the data for a particular wavelength of light. For instance, the disk 174 would be placed on top of a first mask. The disk 174 and mask would then be illuminated with a plane-wave beam 114 having a first wavelength to encode the data corresponding to the reflective indentations 172 of the first mask. The disk 174 would next be placed on top of a second mask and illuminated with a plane-wave beam having a second wavelength. This process continues until all the wavelengths employed in the system have been exhausted. It is not important that the disk 174 be place in some predetermined rotational orientation on each mask, if the system used to read the disk is of the type which scans the entire disk at one wavelength and then the next. The reasons for this were explained previously. However, if the system employed is of the type where each holographic-grating element is scanned with all the wavelengths before moving to the next, a predetermined rotational orientation would have to be maintained to ensure alignment of the holographic gratings of all wavelengths within a particular holographic-grating element.

Although the above-described embodiments of the present invention employing wavelength multiplexing of data have many advantages, it does still require the use of a tunable laser diode, or multiple single-wavelength laser diodes, to produce the different wavelengths of light required to create more than one holographic grating in a holographic-grating element. The embodiments of the present invention to be described next eliminate this need for a tunable or multiple laser diodes. The following embodiments of the invention require only one wavelength of light to be used, and will still allow multiple holographic gratings to be written into and read from a single holographic-grating element.

Essentially, the general structure these new embodiments is the same as those discussed previously. However, instead of writing holographic gratings at different wavelengths in the same holographic-grating element, multiple holographic gratings are written in the same element at a single wavelength by changing the point of focus of one of the counterpropagating beams. This multi-focus approach could be implemented in the focused beam embodiments of the invention. However, this would require coordinating the focus of both the counterpropagating beams. Therefore, it is preferred that the multiple-focus approach be implemented in the plane-wave beam embodiments of the invention. In the plane-wave embodiments implementing the multi-focus approach, only the focus of the focused beam need be changed. The plane-wave beam remains unchanged.

Figure 13A:
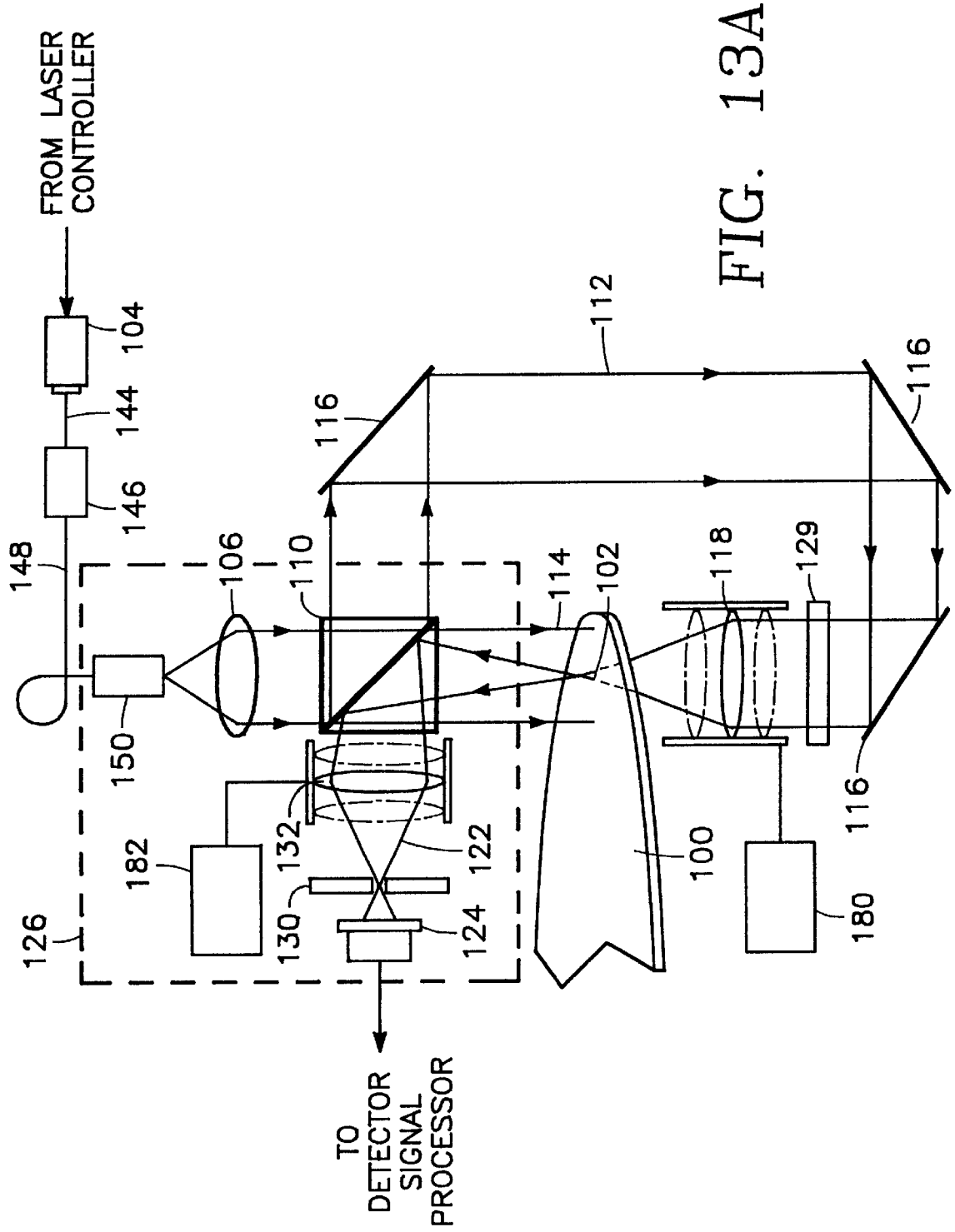
FIG. 13A is an illustration of an apparatus for storing and reading data according to the present invention employing confocal-multiplexed holographic-grating techniques to store and/or read data on an optical disk, and having a series of mirrors for routing a light beam to the opposite side of the disk.
Figure 13B:
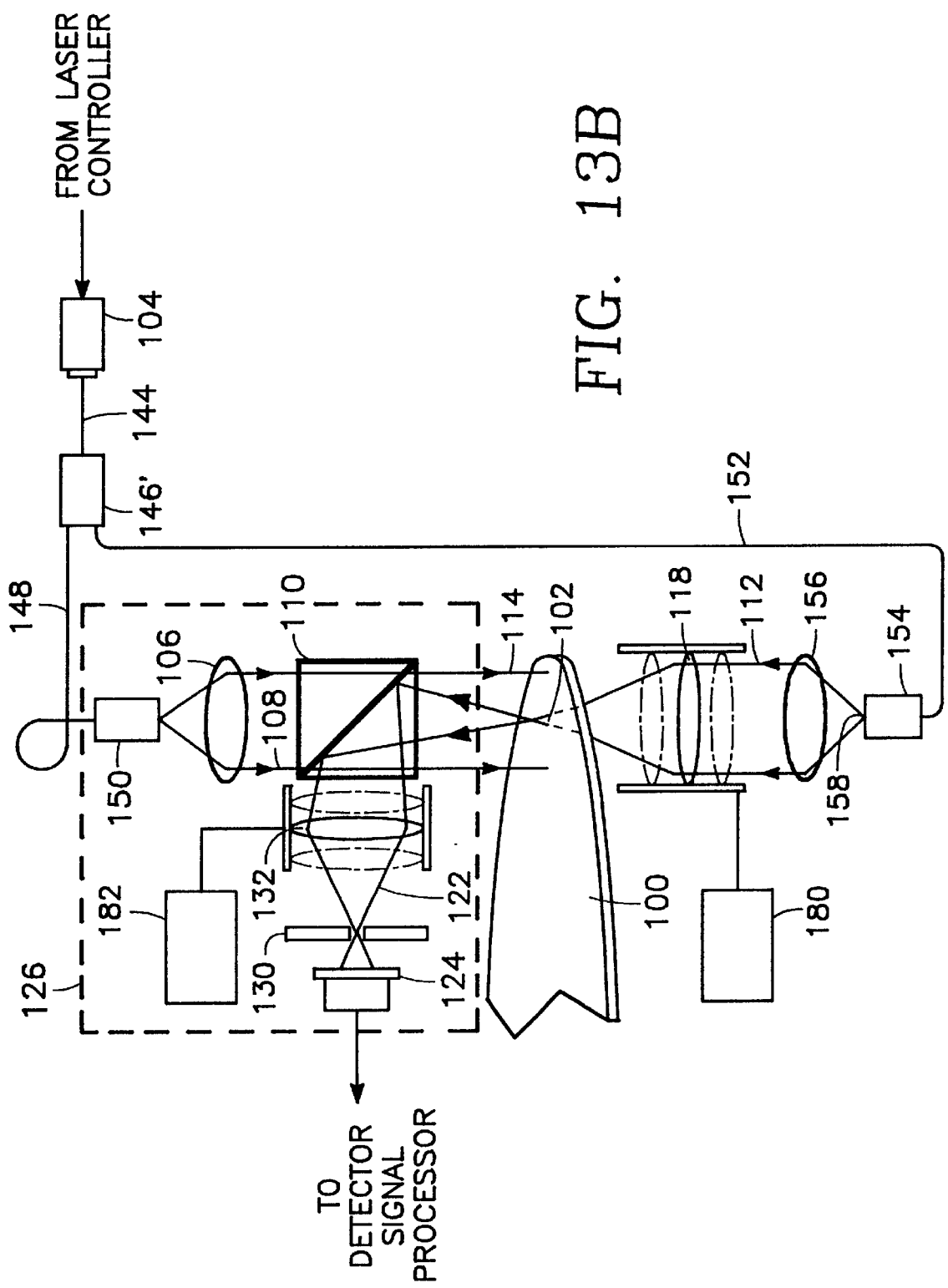
FIG. 13B is an illustration of the apparatus of FIG. 13A, wherein the set of mirrors used to route the light from the laser diodes to the opposite side of the disk is replaced with a fiber optic line and collimating lens(es).

FIGS. 13A–C illustrate embodiments according to the present invention incorporating the aforementioned multi-focus approach. Essentially, these figures are modifications of the embodiments of FIGS. 8B–C and 10, respectively. In each, lens(es) 118 is now capable of being moved along its optical axis such that the point at which the focused beam 112 comes to a focus, changes with position of the lens(es) 118. The lens(es) 118 is moved by a repositioning device 180. Similarly, lens(es) 132 is capable of being moved along its optical axis. This movement allows the lens(es) 132 to be repositioned in relation to the mask 130. Lens(es) 132 is moved by repositioning device 182. The repositioning devices 180, 182 can be any of the well known device used for this purpose. For instance, the lens repositioning devices employed in auto-focus cameras or camcorders would be appropriate. The repositioning devices 180, 182 are controlled by a controller (not shown), such as a microprocessor. In the case of lens(es) 118, the controller causes the repositioning device 180 to move the Lens(es) 118 to one of a series of predetermined positions corresponding to desired point of focus for the focused beam 112. In the case of lens(es) 132, the controller causes the repositioning device 182 to move the lens(es) 132 to one of a series of predetermined positions in relation to the mask 130. The number of predetermined positions in each series is equal to the number of possible holographic gratings N that can be written into a holographic-grating element.

The writing or recording of data is accomplish in the same way as all previously described embodiments of the invention, with the exception that instead of changing the wavelength of light each time a new data bit is written into a holographic-grating element 102, the position of the lens (es) 118 is changed. Thus, each time a new data bit is to be written into a holographic-grating element, the lens(es) 118 is moved to a new one of the aforementioned series of positions. In operation, the lens(es) 118 is first positioned at one of the holographic grating elements 102 and a data bit is written in the disk 100. If the method whereby multiple data bits are written in each element 102 before going to the next element is employed, the lens(es) 118 is repositioned and data is written into the same element 102, but at a different point of focus. This process continues until the desired number of data bits are written in the element 102. Then, the lens(es) 118 is repositioned at the next holographic-grating element, and the process is repeated. However, when the method is employed whereby data bits are recorded in all the holographic-grating elements 102 on the disk 100 at a particular point of focus, before changing the point of focus and recording data in the entire disk 100 once again, the process is different. In this latter case, all the grating elements 102 of the disk 100 are recorded with lens(es) 118 in its initial position. Then, the lens(es) 118 is repositioned to a new point of focus and data is recorded over the entire disk 100 once again, at this new lens position. The process continues until all the predetermined lens positions have been exhausted. FIG. 14 shows a time-collapsed illustration where three different data bits, in this case three holographic gratings, are written into the holographic material of a disk 100. One holographic grating was written with lens(es) 118 in position $P_W1$. Thereafter, another holographic grating was written with the lens(es) 118 in position $P_W2$, and finally the last grating was written with the lens(es) 118 in position $P_W3$. Similar to previous embodiments of the invention, the holographic gratings were written into the holographic material by the interaction of the plane-wave 114, and the focused beam 112.

Figure 15:
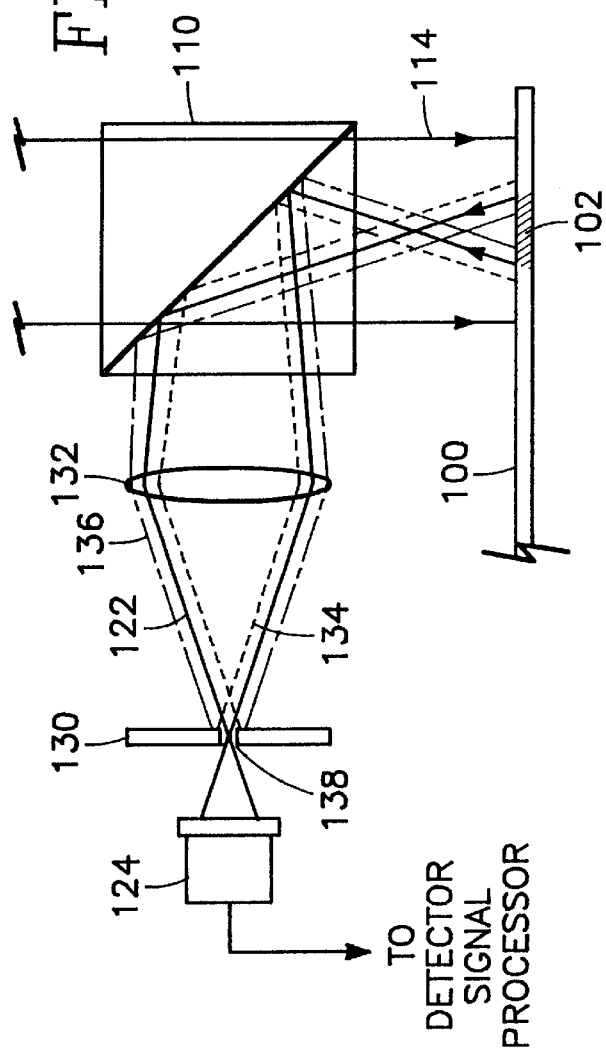
FIG. 15 is a close-up view of the portions of FIGS. 13A–D involved in the reading of an encoded disk and showing that light beams reconstructed from a holographic grating having a point of focus which comes to focus at the opening of the mask is allowed through to the light detector, whereas light beams reconstructed from holographic gratings having different points of focus are blocked.

The readout of data is also accomplished in much the same way as the plane-wave beam embodiments of the present invention employing wavelength-multiplexing. However, instead of cycling through a series of different wavelengths, the position of lens(es) 132 is changed. FIG. 15 shows the reading out of one of the holographic gratings written into the disk 100, as illustrated in FIG. 14. When a holographic-grating element 102 is illuminated by the plane-wave 114, reconstruction beams 122, 134, 136 from all the holographic gratings written into the element are generated. These light beams 122, 134, 136 constitute reconstructions of the focused beam 112 used to produce the holographic gratings. As each of the holographic gratings was created with the focused beam 112 focused at a different point, the reconstruction beams are also focused at these same divergent points. The reconstruction beams 122, 134, 136 are deflected toward the mask 130 and detector 124 by the beam splitter 110 (or the mirror 160 if used). The lens(es) 132 has been placed at position $P_R2$, in FIG. 15. This $P_R2$ position corresponds to a position which causes the reconstruction beam 122 from the holographic grating created with lens(es) 118 at position $P_W2$ of FIG. 14, to come to a focus at the opening 138 in the mask 130. Preferably, the opening 138 in the mask is approximately the size of the "spot" of the reconstructed beam (i.e. the cross-sectional size of the reconstruction beam at the point of focus) so that the reconstruction beam 122 passes through the opening 138 undisturbed. In this way all the energy of the reconstruction beam 122 reaches the detector 124. However, as can be seen in FIG. 15, most of the energy of the other reconstruction beams 134, 136 is blocked by the mask. Very little enters the opening 138 and reaches the detector. Therefore, only the data bit (i.e. a holographic grating or lack thereof recorded when the lens(es) 118 was at position $P_W2$ of FIG. 14 is detected. To read the other data bits recorded in the holographic-grating element 102, the position of lens(es) 132 is changed. The new position would correspond to a position where either reconstruction beam 134, or reconstruction beam 136, would come to a focus at the opening 138 in the mask 130. Preferably, the beam splitter 110 and lens(es) 132 are chosen so that the separation between the points of focus of the various reconstruction beams 122, 134, 136 correspond to the separation between the various positions of lens(es) 118 used to create the holographic grating producing the beams. if so, the distance between the various positions of lens(es) 118 would be the same as the distance between the corresponding positions of lens(es) 132.

It is also noted that adjacent holographic gratings will produce reconstruction beams when the disk is illuminated by the plane-wave beam 114. However, these reconstruction beams will be blocked by the mask 130 in the same way described in connection with the previous embodiments of the present invention. Thus, the mask 130 performs double duty in the confocal-multiplexed embodiments.

The above-described system where three data bits are written in each holographic-grating element, i.e. N=3, was just an example. More or less than three data bits could be written into each holographic-grating element. However, the process would be the same. Each data bit would be written by placing lens(es) 118 in a different position, and each data bit would be read by placing lens(es) 132 in a corresponding different position.

The separation between the points of focus of the focused beam, and so the reconstruction beams is chosen to produce an acceptable signal-to-noise ratio (SNR), within the constraints of the physical size of the system being employed. The SNR refers the amount of energy from adjacently focused reconstruction beams in comparison to the amount of energy that could reach the detector from a reconstruction beam focused at the opening of the mask. Suppose the focused positions of the reconstruction beams are separated by a distance L and the spot size of the reconstruction beams at the point of focus is δ. If L is much larger than δ, then the SNR is given by:

$$SNR = \frac{L^2}{2(f/\#)^2 \delta^2} \qquad (4)$$

where $f/\#$ is the $f$ number of lens(es) 132. As can be inferred from Equation (4), the SNR increases for larger distances L. Thus, it is desirable to make the separation between focused positions as large as possible. However, the thickness of the holographic material and the desired number of data bits to be written into the same holographic-grating element must be considered, as well. For example, an embodiment of the invention where L=20 μm, δ=0.5 μm, and $f/\#$=0.5, would have a SNR of 3,200. To allow about 10 data bits per holographic-grating element, a 200 μm thick layer of holographic material would be required in this exemplary embodiment.

Figure 16:
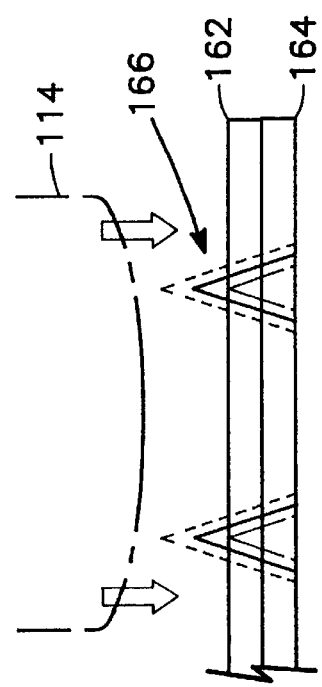
FIG. 16 illustrates the method of replicating data stored on an optical disk produced in accordance with the confocal-multiplexed approach of the present invention into a blank optical disk.

A plane-wave beam is used in the multi-focus approach of the embodiments of the invention shown in FIGS. 13A–C, to help create holographic gratings in the holographic material of the disk. Because of this, the replication methods discussed above in association with FIGS. 11 and 12 could be employed to replicate a disk encoded by the multi-focus approach, with a few modifications. In reference to the method where a master disk is used to create a replicant disk, a plane-wave beam 114 having the same wavelength as the counterpropagating beams used to encode the multi-focus type master disk 164 is used to illuminate the replicant and master disks 162, 164, as shown in FIG. 16. This causes reconstruction beams 166 to be produced from any holographic gratings written into the master disk 164. The counterpropagating plane-wave beam 114 and reconstruction beams 166 then write holographic gratings into the replicant disk 162. Since the reconstruction beams 166 are reconstructions of the focused beam used to create them, they have the same points of focus. Thus, the holographic gratings written into the replicant disk will produce reconstruction beams having the same point of focus separations as the reconstruction beams 166 produced by the master disk 164. Accordingly, the data encoded into the master disk 164 is copied into the replicant disk 162.

Figure 17:
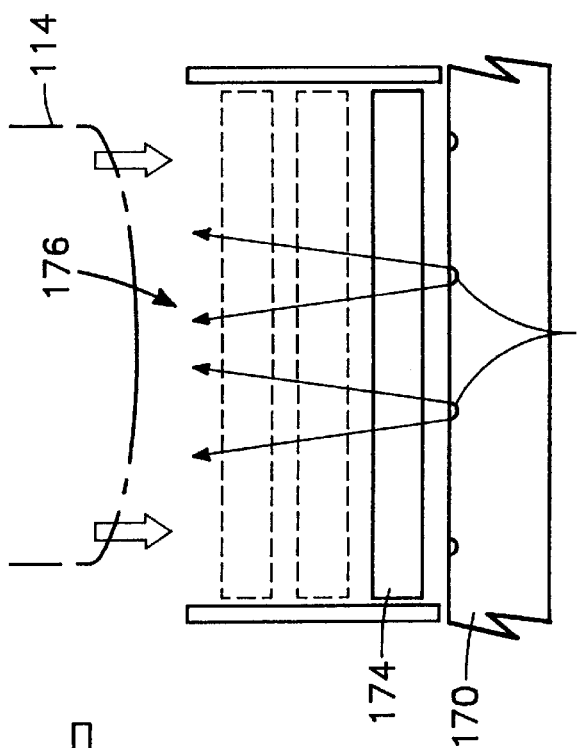
FIG. 17 illustrates the method of replicating data encoded on masks into a blank optical disk using the confocal-multiplexed approach.

In reference to the method where a mask 170 is used to create a replicant disk 174, a plane-wave beam 114 is used to illuminate the replicant and mask 174, 170, as shown in FIG. 17. The replicant disk 174 has been placed top side down over or on the mask 170. Light from the plane-wave beam 114 is reflected back towards the replicant disk 174 from the reflective indentations 172. This reflected light 176, in combination with the counterpropagating plane-wave beam 114, produces cone-shaped holographic gratings in the replicant disk 174. The replicant disk 174 is then disposed over a second mask, and the illumination process repeated. However, instead of the replicant mask being placed in the same position relative to a perpendicular axis of the mask, as it was over the initial mask 170, it is placed in a new position. This new position corresponds to a distance equal to the desired separation of focus between the data encoded by the first mask and that encoded by the second. This repositioning and illumination process with successive masks continues until all the N number of masks has been exhausted.

All the embodiments of the present invention discussed so far rely on counterpropagating beams to create the holographic gratings in disk. During the reading process associated with these embodiments either a focused or plane-wave beam is used to illuminate the disk, and a reconstruction beam is produced which is directed back toward the direction of the illuminating beam. However, this need not be the case. A transmissive scheme could also be employed. In the transmissive scheme, the holographic gratings are created in the disk by the interaction of a plane-wave beam and a focused beam both of which are directed toward the same side of the disk. The encoded disk is then read by illuminating the same side of the disk with the plane-wave beam only. This produces a reconstruction beam which is directed outward from the opposite side of the disk.

Figure 18A:
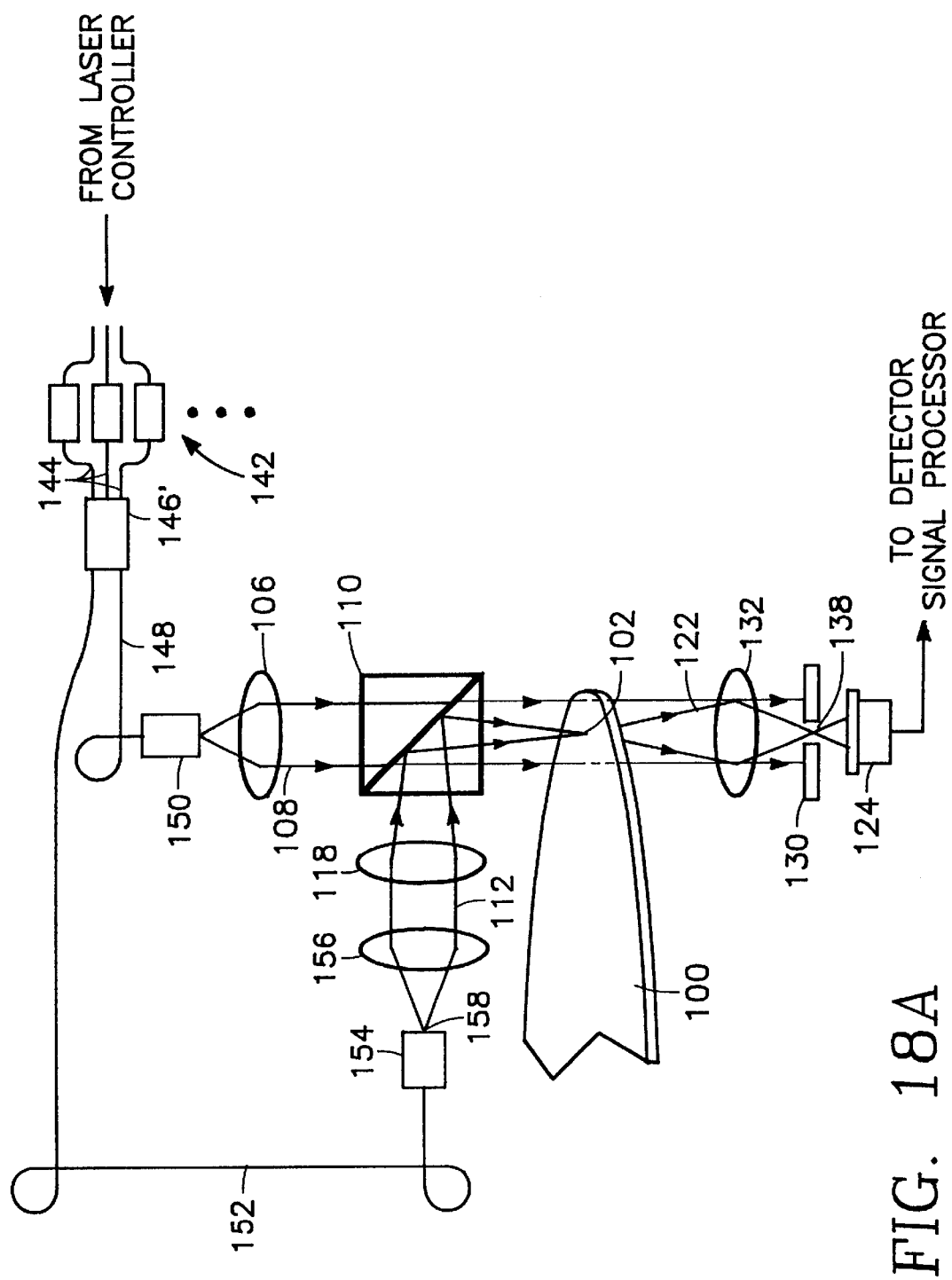
FIG. 18A is an illustration of an apparatus for storing and reading data according to the present invention employing wavelength-multiplexed holographic-grating techniques to store and/or read data on an optical disk, wherein the focused beam and plane-wave beam used to create holographic gratings in the disk are co-propagating.
Figure 18B:
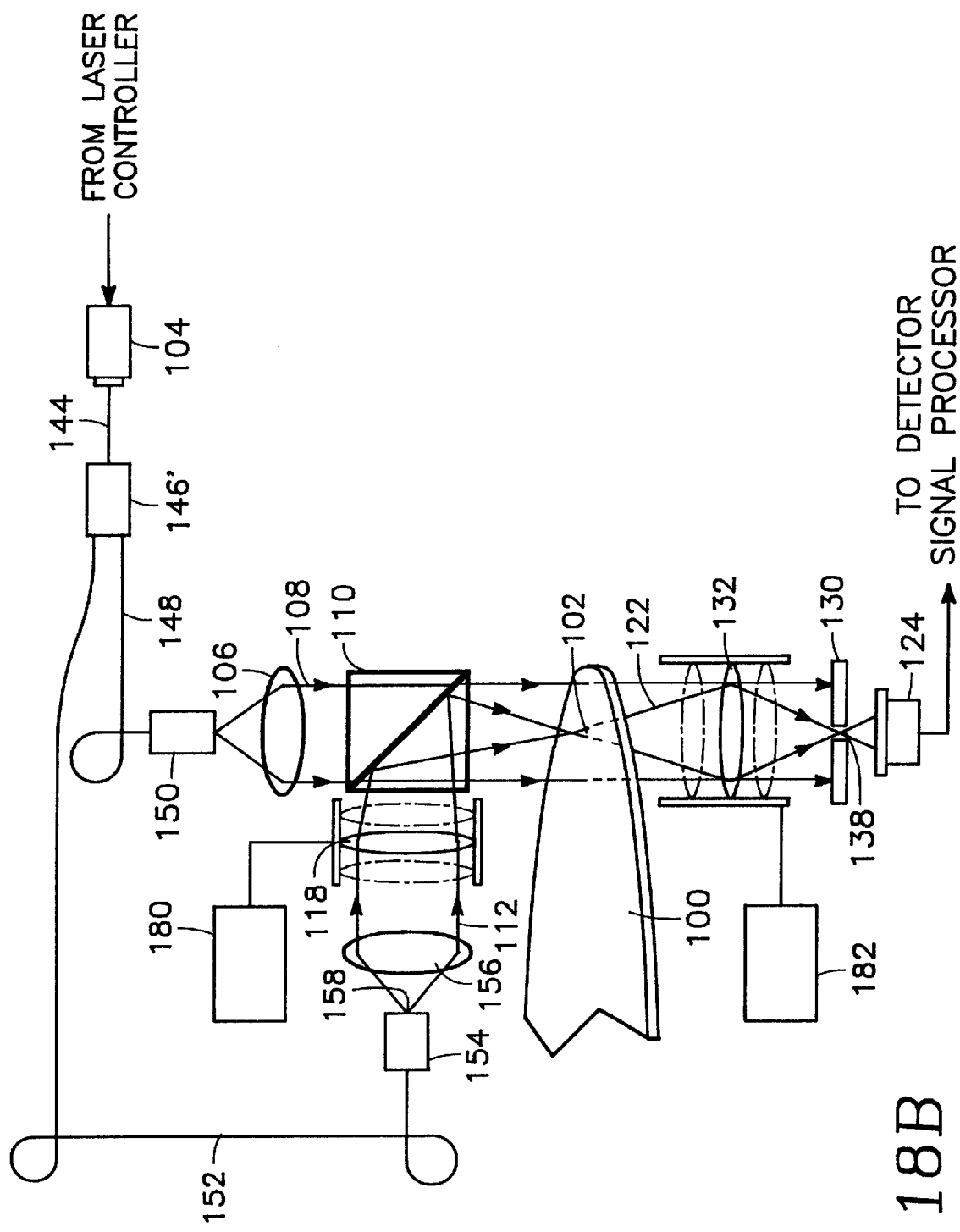
FIG. 18B is an illustration of an apparatus for storing and reading data according to the present invention employing confocal-multiplexed holographic-grating techniques to store and/or read data on an optical disk, wherein the focused beam and plane-wave beam used to create holographic gratings in the disk are co-propagating.

FIGS. 18A–B show exemplary implementations of this transmissive scheme. These exemplary implementation are essentially modifications of the embodiments of the invention shown in FIGS. 8C and 13C, associated with the wavelength-multiplexed and confocal-multiplexed versions of the invention, respectively. In reference to FIG. 18A, which embodies the wavelength-multiplexed version of the invention, the laser diodes 142 are connected by the optic fibers 144 to the inputs of a fiber coupler/splitter 146'. The coupler/splitter 146' divides the input from a laser diodes 142 between two separate output fibers 148, 152. The first fiber 148 is connected to a fiber holder 150 which is aligned with the optical axis of lens(es) 106. The second fiber 152 is connected to the fiber holder 154 and transfers the light from the coupler/splitter 146' to the holder 154. The holder 154 aligns the end of the fiber 152 with the optical axis of lens(es) 156. The light transferred by the fiber 152 is collimated by lens(es) 156. Thereafter it is focused by lens(es) 118. In comparison to the embodiment of FIG. 8C, it can be seen that the fiber holder 154, collimating lens(es) 156, and focusing lens(es) 118 have been reoriented such that the beam leaving focusing lens(es) 118 is now directed toward the side of the beam splitter 110. The beam splitter 110 redirects the focused beam coming from lens(es) 118 towards the top of the disk 100. Thus, during writing operations, the plane-wave beam exiting collimating lens(es) 106 and the focused beam leaving the focusing lens(es) 118 are coincident on the top of the disk 100. It can also be seen that the lens(es) 132, mask 130, and detector 124 have been reoriented from their position in FIG. 8C. In the embodiment of FIG. 18A, these components 132, 130, 124 have been shifted to a position below the disk 100. During read operations, a plane-wave beam is generated and directed at the top of the disk 100. This produces a beam representing a reconstruction of the aforementioned focused beam from any holographic grating existing in the grating element 102. The reconstruction beam is directed out of the bottom of the disk where it is focused by lens(es) 132 and directed toward the mask 130 and detector 124. The operation of the mask 130 in regards to blocking reconstruction beams from adjacent holographic gratings is the same as described in the previous embodiments of the invention.

In reference to FIG. 18B, which embodies the confocal-multiplexed version of the invention, it can be seen that this version of the invention is constructed essentially the same as that described in connection with FIG. 18A, except that it has only one laser source 104 and incorporates repositioning devices 180, 182 of the embodiment of FIG. 13C. Specifically, lens(es) 118 is capable of being moved along its optical axis such that the point at which the focused beam 112 comes to a focus changes with position of the lens(es) 118. The lens(es) 118 is moved by a repositioning device 180. Similarly, lens(es)132 is capable of being moved along its optical axis. This movement allows the lens(es) 132 to be repositioned in relation to the mask 130. Lens(es) 132 is moved by repositioning device 182. The repositioning devices 180, 182 are controlled by a controller (not shown), such as a microprocessor. In the case of lens(es) 118, the controller causes the repositioning device 180 to move the lens(es) 118 to one of a series of predetermined positions corresponding to desired point of focus for the focused beam 112. In the case of lens(es) 132, the controller causes the repositioning device 182 to move the lens(es) 132 to one of a series of predetermined positions in relation to the mask 130. The number of predetermined positions in each series is equal to the number of possible holographic gratings N that can be written into a holographic-grating element. The fiber holder 154, collimating lens(es) 156, and focusing lens(es) 118, as well as the lens(es) 132, mask 130, and detector 124 have been reoriented in the same way as the embodiment described in conjunction with FIG. 18A. Therefore, here too during writing operations, the plane-wave beam exiting collimating lens(es) 106 and the focused beam leaving the focusing lens(es) 118 are coincident on the top of the disk 100. And, during read operations, the plane-wave beam is generated and directed at the top of the disk 100 to produce a reconstruction beam from any holographic grating existing in the grating element 102. As before, this reconstruction beam is directed out of the bottom of the disk where it is focused by lens(es) 132 and directed toward the mask 130 and detector 124.

The transmissive scheme embodiments described above where implemented in the versions of the invention illustrated by FIGS. 8C and 11C for exemplary purposes. As those skilled in the art will recognized, the transmissive scheme can also be implemented in other plane-wave embodiments of the invention, such as those depicted in FIGS. 8A–B and 13A–B.

Figure 19B:
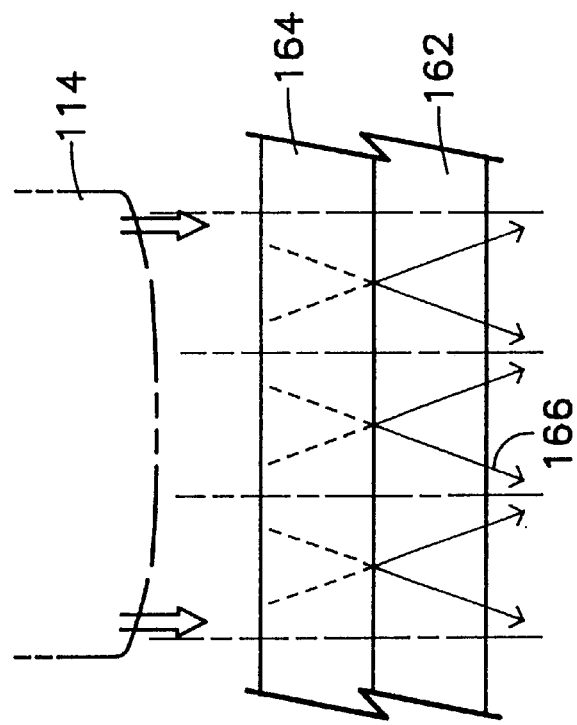
FIG. 19B illustrates the method of replicating data encoded on masks into a blank optical disk wherein light beam producing features of the mask produce light beam which are co-propagating with the plane-wave beam.
Figure 19A:
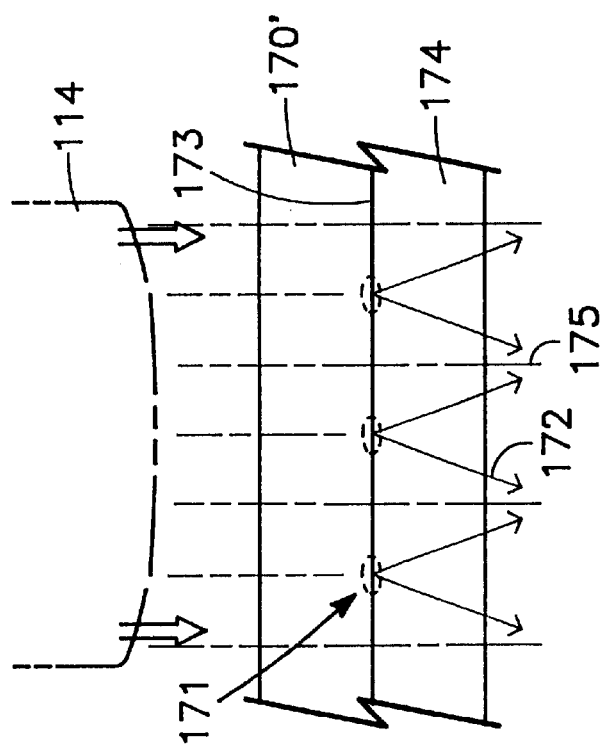
FIG. 19A illustrates the method of replicating data stored on an optical disk produced in accordance with the present invention into a blank optical disk wherein the plane-wave beams and reconstruction beams are co-propagating.

Replication of a holographic disk created by the transmissive embodiments of the present invention is accomplished in very much the same way as described in conjunction with the other embodiments of the invention. In the case where a master disk is used to encode a replicant disk the replicating process is the same with one exception. Instead of the replicant disk 162 being placed over the top of the master disk 164, as shown in FIG. 11, the replicant disk 162 is placed below the master disk 164, as shown in FIG. 19A. This creates the required co-propagating relationship between the plane-wave beam 114 and the reconstruction 166.

In the case of the alternate method employing a mask, the configuration of the mask is modified to accomplish the replication. Specifically, the mask can be encoded with data such that the locations where a holographic grating is to be created in the replicant disk are made as transmissive as possible for the mask material used, while the remaining areas are made only partially transmissive. This can be accomplish by using surface coatings or doping of the mask material in accordance with well known methods. As shown in FIG. 19B, the mask 170' is placed over the top of the replicant disk 174. The highly transmissive areas 171 and partially transmissive areas 173 of the mask 170' have been created by one of the aforementioned methods. The mask 170' and disk 174 are illuminated from above by a plane-wave beam 114. Light 172 passing through the highly transmissive areas 171 is scattered upon leaving the mask 170' and transmitted into the replicant disk 174. Simultaneously, light 175 also passes through the partially transmissive areas 173 of the mask 170', only at a lower intensity, and is transmitted into the replicant disk 174. The light 172 from the highly transmissive areas 171 interacts with the light 175 from the partially transmissive areas 173 to produce the necessary co-propagating beams which create holographic gratings in the replicant disk 174 at locations corresponding to the highly transmissive areas 171 of the mask 170'. Thus, the data represented on the mask 170' by the highly transmissive areas 171 is encoded into the replicant disk 174.

An alternate method of replicating data with a mask to produce an optical disk in accordance with the transmissive embodiments of the present invention, is to vary the index of refraction of the mask material. In this method, the mask material remains at a uniform transmissibility, preferably as high as possible for the material used. However, those areas corresponding to locations where a grating is to be created in the replicant disk, are doped to have a different index of refraction via well known methods. When the light from the plane-wave beam encounters the boundary caused by the shift in index of refraction in the mask, the light is scattered. This scattering of the light produces a beam which, in conjunction with the light transmitted through the rest of the mask, constitutes the co-propagating beams needed to create the holographic gratings in the replicant disk. This process is essentially depicted in FIG. 19B, except that the highly transmissive area 171 would be replaced with the areas having a different index of refraction as explained above.

Up to this point, the embodiments of the present invention described have encoded the holographic disk with binary data where the presence of a holographic grating represented one binary state and the absence thereof represented the other binary state. However, the disk can also be encoded in a different way. This alternate encoding scheme is possible because the diffraction efficiency of the holographic gratings can be controlled. The diffraction efficiency of gratings created in holographic materials, such as those described previously, varies depending on how long the counterpropagating or co-propagating light beams are applied. The less time the two beams are applied to the disk, the lower the diffraction efficiency of the resulting holographic grating, up to a certain point where a maximum efficiency is reached. The intensity of a reconstruction beam produced from a holographic grating will vary depending on the diffraction efficiency of the grating. A higher diffraction efficiency produces a more intense reconstruction beam.

Given the above-described relationship between holographic grating diffraction efficiency and the intensity of a reconstruction beam produced by the grating, it can be seen that an opportunity exists to purposefully fix the intensity level of the reconstruction beam by manipulating the time the two beams creating the grating are applied. Therefore, each grating can be customized to produce a reconstruction beam of a specific intensity level. Therefore, rather than relying on detecting either the presence of absence of a holographic grating, the intensity level of the reconstruction beam produced by a grating could be used instead. This alternate data encoding scheme would allow not only the encoding of binary data, but also the encoding of data having more than two discrete logic levels (i.e. n-ary data), or analog-valued data. For instance, when binary data is to be recorded, the signal from the detector could be thresholded such that it must exceed a certain level to qualify as one or other of the two binary states. Thus, reconstruction beam intensities below a certain level, or the absence of a beam, would represent one binary state, and beam intensities above the aforementioned level would represent the other binary state. In the case of n-ary data, the electrical signal levels from the detector could processed and equated to one of a series of predetermined states. For example, reconstruction beam intensities resulting in a detector signal level exceeding a particular predetermined threshold associated with a first state, but lower than that required to qualify for the next higher state could be recognized as a data corresponding to the first state. Of course, the assignment of data states-to-detector signal levels could be any desired and not necessarily one described in the foregoing example. Finally, in the case of analog-valued data, the strength of the electrical signal could be used directly to establish an analog level.

Holographic grating diffraction efficiencies are also dependent on the intensity of the beams used to create the gratings, in some holographic materials. Therefore, instead of manipulating the time the beams are applied, the intensity of the counterpropagating or co-propagating beams could be varied to create the desires grating efficiency. In some applications, the time required to create a grating with the desired diffraction efficiency may become prohibitive. In these cases, using a intensity sensitive material could speed up the process. Additionally, both the time and intensity could be varied. This manipulation of both time and intensity would facilitate optimizing the process of creating a holographic grating with the desired efficiency in view of the laser power available and the characteristics of the particular holographic material employed.

The devices and methods used to manipulate beam application times and/or intensity levels, as well as the processing of the detector output signal are well known in the art, and do no form a novel part of the present invention. Therefore, no detailed description of these devices and methods will be given herein to avoid redundancy.

It is noted that the above-described methods for replication of disks are applicable to the n-ary and analog data encoding schemes, as well as the binary encoding scheme. When a replicant disk is to be encoded with holographic gratings having varying diffraction efficiencies, the master disk or mask is simply designed to produce light beams having an intensity which will create the desired grating efficiency variations. For example, in the case of replication using a master disk, the master disk is encoded with holographic gratings having the required relative diffraction efficiencies between gratings. Thus, when the plane-wave illuminates the master and replicant disks, the reconstruction beams produced from the holographic gratings of the master disk will vary in intensity in the same proportion as the diffraction efficiencies of these same gratings. As the intensity of the reconstruction beam can determine the diffraction efficiency of the holographic grating created in the replicant disk, depending on the holographic material used, the aforementioned variation in the intensity of the reconstruction beams could be used to create corresponding variations in the replicant disk grating efficiencies. Therefore, the gratings created in the replicant disk will have the same relative diffraction efficiencies as does the master disk. It is not necessary that the master disk have gratings with the same efficiencies as those desired in the replicant disk. The absolute efficiencies of the gratings created in the replicant disk can be adjusted by manipulating the application time of the plane-wave. For instance, the plane-wave beam might be applied just long enough so that the grating having the highest efficiency (whatever it may be) in the master disk produces a corresponding grating in the replicant disk having the maximum efficiency possible for the type of holographic material used in the replicant disk. All the master disk gratings having lower efficiencies would produce correspondingly lower efficiency gratings in the replicant disk. After the replication process is complete a comparison of the two disks would show that the relative efficiencies of the gratings in the master disk was the same as the replicant disk, even though their absolute efficiencies may not be the same. Because of this relationship, the master disk could be made of a holographic material in which gratings having very high efficiencies can be created. The resulting reconstruction beams would therefore have high intensities. This could allow shorter plane-wave beam application times and so speed up the replication process. The holographic material chosen for the replicant disk might also be chosen to be particularly reactive to the intensity variations of the reconstruction beams from the master disk. As can be seen, not only can the materials used to construct the master and replicant disks be different, but they can be chosen to optimize the replication process.

In the case of replication using a mask, the masks described previously can be modified to produce beams having varying intensities. For instance, the material making up the mask could be doped to change its transmissibility or reflectivity. Thus, the beam-producing features in the mask can be tailored to produce a light beam of a specific intensity. Therefore, a replicant disk incorporating an intensity-sensitive holographic material would be encoded with holographic gratings having diffraction efficiencies proportional to the intensity of the mask beams used to create them. In this way the n-ary and analog-valued data can be transferred to the replicant mask.

While the invention has been described in detail by reference to the preferred embodiment described above, it is understood that variations and modifications thereof may be made without departing from the true spirit and scope of the invention. For example, other optical configurations could be employed in the above-described embodiments of the invention while still producing the same results. Therefore, it is not intended to limit the invention to only those optical configuration described. Also, the preferred embodiments of the present invention could be implemented in medium of any format. For instance, the capabilities of the present invention were compared to a conventional CD-ROM system employing a 5 inch disk. However, the present invention could just as easily in a system employing different optical drives and disk sizes. One possibility would be to adapt the present invention to optical systems using the larger 12 inch disk format. In addition, the holographic disks recorded with data in accordance with the present invention could be stacked for readout, similar to the system described in the Background section of this specification. The above described wavelength-multiplexing and confocal-multiplexing approaches could also be combined. This would allow even more data to be stored in one optical disk because at each point of focus location multiple holographic gratings at different wavelength could be created. Thus, the amount of data that could be stored would be the number of wavelengths employed times the number of points of focus locations times the number of holographic grating elements on the disk.

Wherefore, what is claimed is:

1. An optical memory, comprising:
   (a) an optical disk comprising a material in which a holographic grating can be created at plural locations within the disk, wherein the holographic grating represents a stored data element;
   (b) an electro-optical head capable of creating the holographic grating at any one of the plural locations within the disk via a plane-wave light beam in conjunction with a counterpropagating focused light beam.

2. The optical memory of claim 1, wherein the electro-optical head further comprises means for detecting one of (i) a presence, or (ii) an absence of the holographic grating at any one of the plural locations within the disk.

3. The optical memory of claim 2, wherein the detecting means produces a signal indicating a first binary state whenever the presence of the holographic grating is detected and a second binary state whenever the absence of the holographic grating is detected.

4. The optical memory of claim 2, wherein each holographic grating has a variable diffraction efficiency and wherein:
   (a) the electro-optical head further comprises means for varying the diffraction efficiency of each holographic grating during the creation thereof; and,
   (b) the detecting means is capable of producing a signal proportional to the diffraction efficiency of a holographic grating whenever detected, said signal being indicative of a value of the stored data element represented by the detected holographic grating.

5. The optical memory of claim 2, wherein the material comprising the optical disk is further capable of having multiple holographic gratings created at a one of the plural locations.

6. The optical memory of claim 5, wherein the electro-optical head comprises means capable of creating multiple holographic gratings at each one of the plural locations within the disk, each holographic grating within each one of the plural locations being created with at a different wavelength.

7. The optical memory of claim 5, wherein the electro-optical head comprises means capable of creating holographic gratings at plural sets of the plural locations within the disk, the holographic gratings within a particular set of the plural locations being created at a same wavelength which is different from the wavelength used to create holographic gratings within other of the plural sets of plural locations.

8. The optical memory of claim 5, wherein the electro-optical head comprises:
   (a) means for generating a beam of substantially coherent light, the wavelength of said beam of light being capable of being varied;

(b) collimating means for collimating the beam of light generated by the generating means;

(c) means for producing a first and second collimated beam of light from the collimated beam of light exiting the collimating means;

(d) means for directing the first collimated beam towards the disk;

(e) means for routing the second collimated beam to focusing means for creating a focused beam, the focused beam being directed at a one of the plural locations within the disk whenever a holographic grating is to be created therein during a recording step; and, (f) means for blocking the second collimated beam from reaching the one of the plural locations during a reading step; and wherein, (g) the detecting means detects reconstruction light beams emanating from a holographic grating created within a one of the plural locations within the disk whenever a beam of light is generated by the generation means and directed at the one of the plural locations during the reading step.

9. The optical memory of claim 8, wherein the focused beam is directed at the one of the plural locations in one of (i) a direction opposite from the first collimated beam, or (ii) in a same direction as the first collimated beam.

10. The optical memory of claim 8, wherein the detecting means comprises:

(a) a light detector;

(b) second directing means for directing light from the disk during the reading step towards the light detector; and, (c) masking means for blocking light reflected from holographic gratings created in adjacent ones of the plural location and for allowing light beams reconstructed from a holographic grating created in the one of the plural location to reach the light detector.

11. The optical memory of claim 8, wherein the focusing means is a first focusing means for creating a first focused beam, the apparatus further comprising:

second focusing means for focusing the first collimated beam prior to reaching the disk to create a second focused beam directed at the one of the plural locations within the disk.

12. The optical memory of claim 11, wherein the detecting means comprises:

(a) a light detector;

(b) second directing means for directing light from the disk during the reading step towards the light detector; and, (c) masking means for blocking light beams reconstructed from holographic gratings created in adjacent ones of the plural location and for allowing a light beam reconstructed from a holographic grating created in the one of the plural location to reach the light detector.

13. The optical memory of claim 8, further comprising:

means for fixing holographic gratings created within the disk such that light impinging on the disk does not create new holographic gratings and does not affect holographic gratings already existing in the disk.

14. The optical memory of claim 8, wherein the generation means comprises:

a tunable laser diode capable of producing light at a plurality of different wavelengths.

15. The optical memory of claim 8, wherein the generation means comprises:

a plurality of single-wavelength laser diodes each capable of producing light at a different wavelength than the others.

16. The optical memory of claim 8, wherein:

the focusing means causes the focused beam to come to a focus at a point outside the material in which a holographic grating can be created.

17. The optical memory of claim 11, wherein:

(a) the second focusing means causes the second focused beam to come to a focus at a point outside the material in which a holographic grating can be created; and, (b) the first focusing means causes the first focused beam to come to focus at the same point as the second focused beam.

18. The optical memory of claim 5, wherein the electro-optical head comprises:

(a) means for generating a beam of substantially coherent light, the wavelength of said beam of light being capable of being varied;

(b) first collimating means for collimating the beam of light generated by the generating means to produce a first collimated beam;

(c) focusing means for focusing the first collimated beam to create a first focused beam directed at a one of the plural locations within the disk;

(d) collimating and focusing means for collimating the first focused beam subsequent to exiting the disk to produce a second collimated beam;

(e) reflecting means for reflecting the second collimated beam back toward the collimating and focusing means such that the collimating and focusing means focuses the second collimated beam to create a second focused beam directed at said one of the plural locations within the disk in a direction opposite from the first collimated beam, whenever a holographic grating is to be created within the disk during a recording step; and, (f) means for blocking the second collimated beam from reaching said one of the plural locations during a reading step; and wherein, (g) the detecting means detects reconstruction light beams emanating from a holographic grating created within a one of the plural locations within the disk whenever a beam of light is generated by the generation means and directed at the one of the plural locations during the reading step.

19. The optical memory of claim 18, wherein the detecting means comprises:

(a) a light detector;

(b) second directing means for directing light from the disk during the reading step towards the light detector; and, (c) masking means for blocking light beams reconstructed from holographic gratings created in adjacent ones of the plural location and for allowing a light beam reconstructed from a holographic grating created in the one of the plural location to reach the light detector.

20. The optical memory of claim 18, further comprising:

means for fixing holographic gratings created within the disk such that light impinging on the disk does not create new holographic gratings and does not affect holographic gratings already existing in the disk.

21. The optical memory of claim 18, wherein the generation means comprises:

a tunable laser diode capable of producing light at a plurality of different wavelengths.

22. The optical memory of claim 18, wherein the generation means comprises:
   a plurality of single-wavelength laser diodes each capable of producing light at a different wavelength than the others.

23. The optical memory of claim 18, wherein:
   (a) the focusing means causes the focused beam to come to a focus at a point outside the material in which a holographic grating can be created; and,
   (b) the collimating and focusing means causes the second focused beam to come to focus at the same point as the first focused beam.

24. The optical memory of claim 5, wherein the electro-optical head comprises:
   (a) means for generating a beam of substantially coherent light, the wavelength of said beam of light being capable of being varied;
   (b) means for producing a first and second beam of light from the beam of light generated by the generating means;
   (c) means for routing the first beam of light to first collimating means for creating a first collimated beam;
   (d) means for directing the first collimated beam towards the disk;
   (e) means for routing the second beam of light to second collimating means for creating a second collimated beam only during a reading step; and,
   (f) focusing means for creating a focused beam, the focused beam being directed at a one of the plural locations within the disk, whenever a holographic grating is to be created within the disk during a recording step; and wherein,
   (g) the detecting means detects reconstruction light beams emanating from a holographic grating created within a one of the plural locations within the disk whenever a beam of light is generated by the generation means and directed at the one of the plural locations during the reading step.

25. The optical memory of claim 24, wherein the focused beam is directed at the one of the plural locations in one of (i) a direction opposite from the first collimated beam, or (ii) in a same direction as the first collimated beam.

26. The optical memory of claim 24, wherein the detecting means comprises:
   (a) a light detector;
   (b) second directing means for directing light from the disk during the reading step towards the light detector; and,
   (c) masking means for blocking light beams reconstructed from holographic gratings created in adjacent ones of the plural location and for allowing a light beam reconstructed from a holographic grating created in the one of the plural location to reach the light detector.

27. The optical memory of claim 24, wherein the focusing means is a first focusing means for creating a first focused beam, the apparatus further comprising:
   second focusing means for focusing the first collimated beam prior to reaching the disk to create a second focused beam directed at the one of the plural locations within the disk.

28. The optical memory of claim 27, wherein the detecting means comprises:
   (a) a light detector;
   (b) second directing means for directing light from the disk during the reading step towards the light detector; and,
   (c) masking means for blocking light beams reconstructed from holographic gratings created in adjacent ones of the plural location and for allowing a light beam reconstructed from a holographic grating created in the one of the plural location to reach the light detector.

29. The optical memory of claim 24, further comprising:
   means for fixing holographic gratings created within the disk such that light impinging on the disk does not create new holographic gratings and does not affect holographic gratings already existing in the disk.

30. The optical memory of claim 24, wherein the generation means comprises:
   a tunable laser diode capable of producing light at a plurality of different wavelengths.

31. The optical memory of claim 24, wherein the generation means comprises:
   a plurality of single-wavelength laser diodes each capable of producing light at a different wavelength than the others.

32. The optical memory of claim 24, wherein:
   the focusing means causes the focused beam to come to a focus at a point outside the material in which a holographic grating can be created.

33. The optical memory of claim 27, wherein:
   (a) the second focusing means causes the second focused beam to come to a focus at a point outside the material in which a holographic grating can be created; and,
   (b) the first focusing means causes the first focused beam to come to focus at the same point as the second focused beam.

34. The optical memory of claim 5, wherein the electro-optical head comprises means capable of creating multiple holographic gratings at each one of the plural locations within the disk, each holographic grating within each one of the plural locations being created at a different point of focus of the counterpropagating focused light beam.

35. The optical memory of claim 5, wherein the electro-optical head comprises means capable of creating holographic gratings at plural sets of the plural locations within the disk, the holographic gratings within a particular set of the plural locations being created at a same point of focus of the counterpropagating focused light beam which is different from a point of focus used to create holographic gratings within other of the plural sets of plural locations.

36. The optical memory of claim 5, wherein the electro-optical head comprises:
   (a) means for generating a beam of substantially coherent light;
   (b) collimating means for collimating the beam of light generated by the generating means;
   (c) means for producing a first and second collimated beam of light from the collimated beam of light exiting the collimating means;
   (d) means for directing the first collimated beam towards the disk;
   (e) means for routing the second collimated beam to focusing means for creating a focused beam, the focused beam being directed at a one of the plural locations within the disk whenever a holographic grating is to be created therein during a recording step;
   (f) means associated with the focusing means for varying the point of focus of the focused beam; and,
   (g) means for blocking the second collimated beam from reaching the one of the plural locations during a reading step; and wherein, (h) the detecting means detects reconstruction light beams emanating from a holographic grating created within a one of the plural locations within the disk whenever a beam of light is generated by the generation means and directed at the one of the plural locations during the reading steps.

37. The optical memory of claim 36, wherein the focused beam is directed at the one of the plural locations in a direction opposite from the first collimated beam.

38. The optical memory of claim 36, wherein the detecting means comprises:

(a) a light detector;

(b) second directing means for directing light from the disk during the reading step towards the light detector;

(c) second focusing means for focusing the directed light to create a focused directed beam, said focused directed beam comprising reconstructions of focused beams used to create holographic gratings within the disk in an area illuminated by the first collimated beam including the point of focus of each of the focused beams;

(d) masking means for substantially blocking light beams reconstructed from holographic gratings created within the disk in the area illuminated by the first collimated beam which have a point of focus not coinciding with a portion of the masking means which allows reconstructed light beams to pass through to the light detector; and, (e) means for changing the location of the second focusing means such that a light beam reconstructed from a holographic grating having a desired point of focus and created at the one of the plural locations has the point of focus coinciding with the portion of the masking means which allows reconstructed light beams to pass through to the light detector.

39. The optical memory of claim 36, further comprising:

means for fixing holographic gratings created within the disk such that light impinging on the disk does not create new holographic gratings and does not affect holographic gratings already existing in the disk.

40. The optical memory of claim 5, wherein the electro-optical head comprises:

(a) means for generating a beam of substantially coherent light;

(b) means for producing a first and second beam of light from the beam of light generated by the generating means;

(c) means for routing the first beam of light to first collimating means for creating a first collimated beam;

(d) means for directing the first collimated beam towards the disk;

(e) means for routing the second beam of light to second collimating means for creating a second collimated beam;

(f) focusing means for creating a focused beam, the focused beam being directed at a one of the plural locations within the disk whenever a holographic grating is to be created therein during a recording step;

(g) means associated with the focusing means for varying the point of focus of the focused beam; and, (h) means for blocking the second collimated beam from reaching the one of the plural locations during a reading step; and wherein, (i) the detecting means detects reconstruction light beams emanating from a holographic grating created within a one of the plural locations within the disk whenever a beam of light is generated by the generation means and directed at the one of the plural locations during the reading step.

41. The optical memory of claim 40, wherein the focused beam is directed at the one of the plural locations in one of (i) a direction opposite from the first collimated beam, or (ii) in a same direction as the first collimated beam.

42. The optical memory of claim 40, wherein the detecting means comprises:

(a) a light detector;

(b) second directing means for directing light from the disk during the reading step towards the light detector;

(c) second focusing means for focusing the directed light to create a focused directed beam, said focused directed beam comprising reconstructions of focused beams used to create holographic gratings within the disk in an area illuminated by the first collimated beam including the point of focus of each of the focused beams;

(d) masking means for substantially blocking light beams reconstructed from holographic gratings created within the disk in the area illuminated by the first collimated beam which have a point of focus not coinciding with a portion of the masking means which allows a reconstructed light beam to pass through to the light detector; and, (e) means for changing the location of the second focusing means such that a light beam reconstructed from a holographic grating having a desired point of focus and created at the one of the plural locations has the point of focus coinciding with the portion of the masking means which allows a reconstructed light beam to pass through to the light detector.

43. The optical memory of claim 40, further comprising:

means for fixing holographic gratings created within the disk such that light impinging on the disk does not create new holographic gratings and does not affect holographic gratings already existing in the disk.

44. The optical memory of claim 36, wherein the focused beam is directed at the one of the plural locations in a same direction as the first collimated beam.

45. A method for storing data on an optical disk, the disk being comprised of a material in which a holographic grating can be created at plural locations within the disk wherein the holographic grating represents a stored data element, the method comprising the step of:

recording data elements by creating a holographic grating at selected ones of the plural locations within the disk using a plane-wave light beam in conjunction with a counterpropagating focused light beam.

46. The method for storing data of claim 45, further comprising the step of:

reading data elements by detecting one of (i) a presence, or (ii) an absence of a holographic grating at the plural locations within the disk.

47. The method for storing data of claim 46, wherein:

(a) the material comprising the optical disk is further capable of having multiple holographic gratings created within each of the plural locations;

(b) the recording step comprises creating multiple data elements at each one of the plural locations by one of (i) creating a holographic grating, or (ii) refraining from creating a holographic grating, each of the holographic gratings created via a beam of light generated by an electro-optical head, said beam of light having a different wavelength for each holographic grating created in a same one of the plural locations; and, (c) the reading step comprises reading multiple data elements at each one of the plural locations by detecting one of (i) a presence of a holographic grating, or (ii) an absence of the holographic grating, via a beam of light generated by the electro-optical head, said beam of light being sequentially varied in wavelength to correspond to a wavelength of light and sequence of wavelengths employed to record each one of the multiple data elements recorded.

48. The method for storing data of claim 47, wherein the reading step comprises the step of:

producing a signal indicating a first binary state whenever the presence of the holographic grating is detected and a second binary state whenever the absence of the holographic grating is detected.

49. The method for storing data of claim 47, wherein each holographic grating has a variable diffraction efficiency and wherein:

(a) the recording step comprises the steps of varying the diffraction efficiency of each holographic grating during the creation thereof; and, (b) the reading step comprises the steps of producing a signal proportional to the diffraction efficiency of a holographic grating whenever detected, said signal being indicative of a value of the stored data element represented by the detected holographic grating.

50. The method for storing data of claim 46, wherein:

(a) the material comprising the optical disk is further capable of having multiple holographic gratings created within each of the plural locations;

(b) the recording step comprises recording data elements at plural sets of the plural locations within the disk by one of (i) creating a holographic grating, or (ii) refraining from creating said holographic grating, each of said holographic gratings created within a particular set of the plural locations being recorded via a beam of light generated by an electro-optical head having a same wavelength which is different from a wavelength used to create holographic gratings within other of the plural sets of plural locations; and, (c) the reading step comprises reading data elements at each location within a particular set of the plural locations by detecting one of (i) a presence of a holographic grating, or (ii) an absence of the holographic grating, via a beam of light generated by the electro-optical head having a wavelength corresponding to the wavelength employed to record the data elements.

51. The method for storing data of claim 50, wherein the reading step comprises the step of:

producing a signal indicating a first binary state whenever the presence of the holographic grating is detected and a second binary state whenever the absence of the holographic grating is detected.

52. The method for storing data of claim 50, wherein each holographic grating has a variable diffraction efficiency and wherein:

(a) the recording step comprises the step of varying the diffraction efficiency of each holographic grating during the creation thereof; and, (b) the reading step comprises the step of producing a signal proportional to the diffraction efficiency of a holographic grating whenever detected, said signal being indicative of a value of the stored data element represented by the detected holographic grating.

53. The method for storing data of claim 47, wherein the step of recording multiple data elements at each one of the plural locations via the beam of light generated by the electro-optical head, comprises:

(a) generating a beam of substantially coherent light at a selected wavelength whenever it is desired to create a holographic grating at a one of the plural locations within the disk, the selected wavelength of said beam of light being capable of being varied;

(b) collimating the beam of light whenever present;

(c) producing a first and second collimated beam from the collimated beam of light;

(d) directing the first collimated beam towards the disk;

(e) routing and focusing the second collimated beam to create a focused beam, the focused beam being directed at the one of the plural locations within the disk;

(f) varying the selected wavelength of the beam of substantially coherent light;

(g) generating a beam of substantially coherent light at a newly selected wavelength whenever it is desired to create another holographic grating at the one of the plural locations within the disk; and, (h) repeating steps (b) through (g) until a predetermined number of newly selected wavelengths have been employed.

54. The method for storing data of claim 53, wherein the focused beam is directed at the one of the plural locations in one of (i) a direction opposite from the first collimated beam, or (ii) in a same direction as the first collimated beam.

55. The method for storing data of claim 53, wherein the focused beam is a first focused beam, the method further comprising:

focusing the first collimated beam prior to reaching the disk to create a second focused beam directed at the one of the plural locations within the disk.

56. The method for storing data of claim 53, further comprising:

fixing holographic gratings created within the disk such that light impinging on the disk does not create new holographic gratings and does not affect holographic gratings already existing in the disk.

57. The method for storing data of claim 53, wherein the step of focusing the second collimated beam to create a focused beam comprises:

causing the second collimated beam to come to a focus at a point outside the material in which a holographic grating can be created.

58. The method for storing data of claim 55, wherein:

(a) the step of focusing the first collimated beam prior to reaching the disk to create a second focused beam comprises causing the second focused beam to come to a focus at a point outside the material in which a holographic grating can be created; and, (b) the step of focusing the second collimated beam to create a first focused beam comprises causing the first focused beam to come to focus at the same point as the second focused beam.

59. The method for storing data of claim 53, wherein the step of varying the selected wavelength of the beam of substantially coherent light comprises:

causing a tunable laser diode, capable of producing light at a plurality of different wavelengths, to change the wavelength of light emitted.

60. The method for storing data of claim 53, wherein the step of varying the selected wavelength of the beam of substantially coherent light comprises:

selecting one of a plurality of single-wavelength laser diodes, each capable of producing light at a wavelength different from the others, to emit said beam of coherent light.

61. The method for storing data of claim 50, wherein the step of recording data elements at the plural sets of the plural location within the disk via the beam of light generated by the electro-optical head, comprises:

(a) recording data elements within a selected set of the plural locations, said recording comprising the steps of,
  (a1) placing the optical head adjacent to a one of the plural location in the selected set of plural locations,
  (a2) generating a beam of substantially coherent light at a selected wavelength whenever it is desired to create a holographic grating at the one of the plural locations within the disk, the selected wavelength of said beam of light being capable of being varied,
  (a3) collimating the beam of light whenever present,
  (a4) producing a first and second collimated beam form the collimated beam of light,
  (a5) directing the first collimated beam towards the disk,
  (a6) routing and focusing the second collimated beam to create a focused beam, the focused beam being directed at the one of the plural locations within the disk,
  (a7) moving the optical head to a position adjacent to a next one of the plural locations in the selected set of plural locations, and,
  (a8) repeating steps (a2) through (a7) for each one of the plural locations in the selected set of plural locations;
(b) varying the selected wavelength of the beam of substantially coherent light; and,
(c) repeating steps (a) and (b) until a predetermined number of newly selected wavelengths have been employed.

62. The method for storing data of claim 61, wherein the focused beam is directed at the one of the plural locations in one of (i) a direction opposite from the first collimated beam, or (ii) in a same direction as the first collimated beam.

63. The method for storing data of claim 61, wherein the focused beam is a first focused beam, the method further comprising:

focusing the first collimated beam prior to reaching the disk to create a second focused beam directed at the one of the plural locations within the disk.

64. The method for storing data of claim 61, further comprising:

fixing holographic gratings created within the disk such that light impinging on the disk does not create new holographic gratings and does not affect holographic gratings already existing in the disk.

65. The method for storing data of claim 61, wherein the step of focusing the second collimated beam to create a focused beam comprises:

causing the second collimated beam to come to a focus at a point outside the material in which a holographic grating can be created.

66. The method for storing data of claim 63, wherein:

(a) the step of focusing the first collimated beam prior to reaching the disk to create a second focused beam comprises causing the second focused beam to come to a focus at a point outside the material in which a holographic grating can be created; and,
(b) the step of focusing the second collimated beam to create a first focused beam comprises causing the first focused beam to come to focus at the same point as the second focused beam.

67. The method for storing data of claim 61, wherein the step of varying the selected wavelength of the beam of substantially coherent light comprises:

causing a tunable laser diode, capable of producing light at a plurality of different wavelengths, to change the wavelength of light emitted.

68. The method for storing data of claim 61, wherein the step of varying the selected wavelength of the beam of substantially coherent light comprises:

selecting one of a plurality of single-wavelength laser diodes, each capable of producing light at a wavelength different from the others, to emit said beam of coherent light.

69. The method for storing data of claim 47, wherein the step of recording data elements at each one of the plural locations via the beam of light generated by the electro-optical head, comprises:

(a) generating a beam of substantially coherent light at a selected wavelength whenever it is desired to create a holographic grating at a one of the plural locations within the disk, the selected wavelength of said beam of light being capable of being varied;
(b) collimating the beam of light generated by the generating means whenever present to produce a first collimated beam;
(c) focusing the first collimated beam to create a first focused beam directed at a one of the plural locations within the disk;
(d) collimating the first focused beam subsequent to exiting the disk to produce a second collimated beam;
(e) reflecting the second collimated beam back toward the disk;
(f) focusing the second collimated beam to create a second focused beam directed at said one of the plural locations within the disk and oppositely from the first focused beam;
(g) varying the selected wavelength of the beam of substantially coherent light;
(h) generating a beam of substantially coherent light at a newly selected wavelength whenever it is desired to create another holographic grating at the one of the plural locations within the disk; and,
(i) repeating steps (b) through (h) until a predetermined number of newly selected wavelengths have been employed.

70. The method for storing data of claim 69, further comprising:

fixing holographic gratings created within the disk such that light impinging on the disk does not create new holographic gratings and does not affect holographic gratings already existing in the disk.

71. The method for storing data of claim 69, wherein:

(a) the step of focusing the first collimated beam to create a first focused beam comprises causing the first focused beam to come to a focus at a point outside the material in which a holographic grating can be created; and,
(b) the step of focusing the second collimated beam to create a second focused beam comprises causing the second focused beam to come to focus at the same point as the first focused beam.

72. The method for storing data of claim 69, wherein the step of varying the selected wavelength of the beam of substantially coherent light comprises:
    causing a tunable laser diode, capable of producing light at a plurality of different wavelengths, to change the wavelength of light emitted.

73. The method for storing data of claim 69, wherein the step of varying the selected wavelength of the beam of substantially coherent light comprises:
    selecting one of a plurality of single-wavelength laser diodes, each capable of producing light at a wavelength different from the others, to emit said beam of coherent light.

74. The method for storing data of claim 50, wherein the step of recording data elements at the plural sets of the plural location within the disk via the beam of light generated by the electro-optical head, comprises:
    (a) recording data elements within a selected set of the plural locations, said recording comprising the steps of,
       (a1) placing the optical head adjacent to a one of the plural location in the set of plural locations,
       (a2) generating a beam of substantially coherent light at a selected wavelength whenever it is desired to create a holographic grating at the one of the plural locations within the disk, the selected wavelength of said beam of light being capable of being varied,
       (a3) collimating the beam of light generated by the generating means whenever present to produce a first collimated beam,
       (a4) focusing the first collimated beam to create a first focused beam directed at a one of the plural locations within the disk,
       (a5) collimating the first focused beam subsequent to exiting the disk to produce a second collimated beam,
       (a6) reflecting the second collimated beam back toward the disk,
       (a7) focusing the second collimated beam to create a second focused beam directed at said one of the plural locations within the disk and oppositely from the first focused beam,
       (a8) moving the optical head to a position adjacent to a next one of the plural locations in the selected set of plural locations, and,
       (a9) repeating steps (a2) through (a8) for each one of the plural locations in the selected set of plural locations;
    (b) varying the selected wavelength of the beam of substantially coherent light; and,
    (c) repeating steps (a) and (b) until a predetermined number of newly selected wavelengths have been employed.

75. The method for storing data of claim 74, further comprising:
    fixing holographic gratings created within the disk such that light impinging on the disk does not create new holographic gratings and does not affect holographic gratings already existing in the disk.

76. The method for storing data of claim 74, wherein:
    (a) the step of focusing the first collimated beam to create a first focused beam comprises causing the first focused beam to come to a focus at a point outside the material in which a holographic grating can be created; and,
    (b) the step of focusing the second collimated beam to create a second focused beam comprises causing the second focused beam to come to focus at the same point as the first focused beam.

77. The method for storing data of claim 74, wherein the step of varying the selected wavelength of the beam of substantially coherent light comprises:
    causing a tunable laser diode, capable of producing light at a plurality of different wavelengths, to change the wavelength of light emitted.

78. The method for storing data of claim 74, wherein the step of varying the selected wavelength of the beam of substantially coherent light comprises:
    selecting one of a plurality of single-wavelength laser diodes, each capable of producing light at a wavelength different from the others, to emit said beam of coherent light.

79. The method for storing data of claim 47, wherein the step of recording data elements at each one of the plural locations via the beam of light generated by the electro-optical head, comprises:
    (a) generating a beam of substantially coherent light at a selected wavelength whenever it is desired to create a holographic grating at a one of the plural locations within the disk, the selected wavelength of said beam of light being capable of being varied;
    (b) producing a first and second beam of light from the beam of substantially coherent light, whenever present;
    (c) routing the first beam of light to first collimating means for creating a first collimated beam;
    (d) directing the first collimated beam towards the disk;
    (e) routing the second beam of light to second collimating means for creating a second collimated beam;
    (f) focusing the second collimated beam to create a focused beam, the focused beam being directed at the one of the plural locations within the disk;
    (g) varying the selected wavelength of the beam of substantially coherent light;
    (h) generating a beam of substantially coherent light at a newly selected wavelength whenever it is desired to create another holographic grating at the one of the plural locations within the disk; and,
    (i) repeating steps (b) through (h) until a predetermined number of newly selected wavelengths have been employed.

80. The method for storing data of claim 79, wherein the focused beam is directed at the one of the plural locations in one of (i) a direction opposite from the first collimated beam, or (ii) in a same direction as the first collimated beam.

81. The method for storing data of claim 79, wherein the focused beam is a first focused beam, the method further comprising:
    focusing the first collimated beam prior to reaching the disk to create a second focused beam directed at a one of the plural locations within the disk.

82. The method for storing data of claim 79, further comprising:
    fixing holographic gratings created within the disk such that light impinging on the disk does not create new holographic gratings and does not affect holographic gratings already existing in the disk.

83. The method for storing data of claim 79, wherein the step of focusing the second collimated beam to create a focused beam comprises:
    causing the second collimated beam to come to a focus at a point outside the material in which a holographic grating can be created.

84. The method for storing data of claim 81, wherein:
(a) the step of focusing the first collimated beam prior to reaching the disk to create a second focused beam comprises causing the second focused beam to come to a focus at a point outside the material in which a holographic grating can be created; and,
(b) the step of focusing the second collimated beam to create a first focused beam comprises causing the first focused beam to come to focus at the same point as the second focused beam.

85. The method for storing data of claim 79, wherein the step of varying the selected wavelength of the beam of substantially coherent light comprises:
causing a tunable laser diode, capable of producing light at a plurality of different wavelengths, to change the wavelength of light emitted.

86. The method for storing data of claim 79, wherein the step of varying the selected wavelength of the beam of substantially coherent light comprises:
selecting one of a plurality of single-wavelength laser diodes, each capable of producing light at a wavelength different from the others, to emit said beam of coherent light.

87. The method for storing data of claim 50, wherein the step of recording data elements at the plural sets of the plural location within the disk via the beam of light generated by the electro-optical head, comprises:
(a) recording data elements within a selected set of the plural locations, said recording comprising the steps of,
(a1) placing the optical head adjacent to a one of the plural location in the selected set of plural locations,
(a2) generating a beam of substantially coherent light at a selected wavelength whenever it is desired to create a holographic grating at the one of the plural locations within the disk, the selected wavelength of said beam of light being capable of being varied,
(a3) producing a first and second beam of light from the beam of substantially coherent light, whenever present,
(a4) routing the first beam of light to first collimating means for creating a first collimated beam,
(a5) directing the first collimated beam towards the disk;
(a6) routing the second beam of light to second collimating means for creating a second collimated beam,
(a7) focusing the second collimated beam to create a focused beam, the focused beam being directed at the one of the plural locations within the disk,
(a8) moving the optical head to a position adjacent to a next one of the plural locations in the selected set of plural locations, and,
(a9) repeating steps (a2) through (a8) for each one of the plural locations in the selected set of plural locations;
(b) varying the selected wavelength of the beam of substantially coherent light; and,
(c) repeating steps (a) and (b) until a predetermined number of newly selected wavelengths have been employed.

88. The method for storing data of claim 87, wherein the focused beam is directed at the one of the plural locations in one of (i) a direction opposite from the first collimated beam, or (ii) in a same direction as the first collimated beam.

89. The method for storing data of claim 87, wherein the focused beam is a first focused beam, the method further comprising:
focusing the first collimated beam prior to reaching the disk to create a second focused beam directed at a one of the plural locations within the disk.

90. The method for storing data of claim 87, further comprising:
fixing holographic gratings created within the disk such that light impinging on the disk does not create new holographic gratings and does not affect holographic gratings already existing in the disk.

91. The method for storing data of claim 87, wherein the step of focusing the second collimated beam to create a focused beam comprises:
causing the second collimated beam to come to a focus at a point outside the material in which a holographic grating can be created.

92. The method for storing data of claim 89, wherein:
(a) the step of focusing the first collimated beam prior to reaching the disk to create a second focused beam comprises causing the second focused beam to come to a focus at a point outside the material in which a holographic grating can be created; and,
(b) the step of focusing the second collimated beam to create a first focused beam comprises causing the first focused beam to come to focus at the same point as the second focused beam.

93. The method for storing data of claim 87, wherein the step of varying the selected wavelength of the beam of substantially coherent light comprises:
causing a tunable laser diode, capable of producing light at a plurality of different wavelengths, to change the wavelength of light emitted.

94. The method for storing data of claim 87, wherein the step of varying the selected wavelength of the beam of substantially coherent light comprises:
selecting one of a plurality of single-wavelength laser diodes, each capable of producing light at a wavelength different from the others, to emit said beam of coherent light.

95. The method for storing data of claim 47, wherein the step of reading multiple data elements at each one of the plural locations via the beam of light generated by the electro-optical head, comprises:
(a) generating a beam of substantially coherent light at a selected wavelength, the selected wavelength of said beam of light being capable of being varied;
(b) collimating the beam of light;
(c) directing the collimated beam towards the disk;
(d) detecting a reconstruction light beam emanating from a holographic grating created within a one of the plural locations within the disk;
(e) varying the selected wavelength of the beam of substantially coherent light such that a newly selected wavelength corresponds to a next one of a wavelength of light in a sequence of wavelengths employed to record each one of the multiple data elements recorded;
(f) generating a beam of substantially coherent light at the newly selected wavelength; and,
(g) repeating steps (b) through (f) until all the wavelengths in the sequence of wavelengths employed to record the multiple data elements has been selected.

96. The method for storing data of claim 95, wherein the step of detecting the reconstruction light beam comprises:
(a) directing light from the disk towards a light detector; and,
(c) blocking light beams reconstructed from holographic gratings created in adjacent ones of the plural location and for allowing a light beam reconstructed from a holographic grating created in the one of the plural location to reach the light detector.

97. The method for storing data of claim 95, further comprising:

focusing the collimated beam prior to reaching the disk to create a focused beam directed at the one of the plural locations within the disk, the focused beam being focused at a same point as the beams used to create the holographic gratings in the disk during a recording step.

98. The method for storing data of claim 97, wherein the step of detecting reconstruction light beams comprises:

(a) directing light from the disk towards a light detector; and, (c) blocking light beams reconstructed from holographic gratings created in adjacent ones of the plural location and for allowing a light beam reconstructed from a holographic grating created in the one of the plural location to reach the light detector.

99. The method for storing data of claim 95, wherein the step of varying the selected wavelength of the beam of substantially coherent light comprises:

causing a tunable laser diode, capable of producing light at a plurality of different wavelengths, to change the wavelength of light emitted.

100. The method for storing data of claim 95, wherein the step of varying the selected wavelength of the beam of substantially coherent light comprises:

selecting one of a plurality of single-wavelength laser diodes, each capable of producing light at a wavelength different from the others, to emit said beam of coherent light.

101. The method for storing data of claim 50, wherein the step of reading a data element at each location in a set of the plural locations within the disk via the beam of light generated by the electro-optical head, comprises:

(a) placing the optical head adjacent to a one of the plural location in a selected set of plural locations, (b) generating a beam of substantially coherent light at a selected wavelength, the selected wavelength of said beam of light being capable of being varied;

(c) collimating the beam of light;

(d) directing the collimated beam towards the disk;

(e) detecting a reconstruction light beam emanating from a holographic grating created within a one of the plural locations within the disk;

(f) moving the optical head to a position adjacent to a next one of the plural locations in the selected set of plural locations;

(g) repeating steps (b) through (f) for each one of the plural locations in the selected set of plural locations;

(h) varying the selected wavelength of the beam of substantially coherent light such that a newly selected wavelength corresponds to a next one of a wavelength of light in a sequence of wavelengths employed to record each set of the plural locations within the disk;

(i) repeating steps (b) through (i) for each set of plural locations.

102. The method for storing data of claim 101, wherein the step of detecting the reconstruction light beam comprises:

(a) directing light from the disk towards a light detector; and, (c) blocking light beams reconstructed from holographic gratings created in adjacent ones of the plural location and for allowing a light beam reconstructed from a holographic grating created in the one of the plural location to reach the light detector.

103. The method for storing data of claim 101, further comprising:

focusing the collimated beam prior to reaching the disk to create a focused beam directed at the one of the plural locations within the disk, the focused beam being focused at a same point as the beams used to create the holographic gratings in the disk during a recording step.

104. The method for storing data of claim 103, wherein the step of detecting the reconstruction light beam comprises:

(a) directing light from the disk towards a light detector; and, (c) blocking light beams reconstructed from holographic gratings created in adjacent ones of the plural location and for allowing a light beam reconstructed from a holographic grating created in the one of the plural location to reach the light detector.

105. The method for storing data of claim 101, wherein the step of varying the selected wavelength of the beam of substantially coherent light comprises:

causing a tunable laser diode, capable of producing light at a plurality of different wavelengths, to change the wavelength of light emitted.

106. The method for storing data of claim 101, wherein the step of varying the selected wavelength of the beam of substantially coherent light comprises:

selecting one of a plurality of single-wavelength laser diodes, each capable of producing light at a wavelength different from the others, to emit said beam of coherent light.

107. The method for storing data of claim 46, wherein:

(a) the material comprising the optical disk is further capable of having multiple holographic gratings created within each of the plural locations;

(b) the recording step comprises creating multiple data elements at each one of the plural locations by one of (i) creating a holographic grating, or (ii) refraining from creating a holographic grating, each of the holographic gratings created via said plane-wave light beam in conjunction with said counterpropagating focused light beam, both of which are generated by an electro-optical head, said counterpropagating focused light beam having a different point of focus for each holographic grating created in a same one of the plural locations; and, (c) the reading step comprises reading multiple data elements at each one of the plural locations by detecting one of (i) a presence of a holographic grating, or (ii) an absence of the holographic grating, via a beam of light generated by the electro-optical head.

108. The method for storing data of claim 46, wherein:

(a) the material comprising the optical disk is further capable of having multiple holographic gratings created within each of the plural locations;

(b) the recording step comprises recording data elements at plural sets of the plural locations within the disk by one of (i) creating a holographic grating, or (ii) refraining from creating said holographic grating, each of said holographic gratings created within a particular set of the plural locations being recorded via said plane-wave light beam in conjunction with said counterpropagating focused light beam, both of which are generated by an electro-optical head, said counterpropagating focused light beam having a same point of focus which is different from a point of focus used to create holographic gratings within other of the plural sets of plural locations; and, (c) the reading step comprises reading data elements at each location within a particular set of the plural locations by detecting one of (i) a presence of a holographic grating, or (ii) an absence of the holographic grating, via a beam of light generated by the electro-optical head.

109. The method for storing data of claim 107, wherein the step of recording multiple data elements at each one of the plural locations via the beam of light generated by the electro-optical head, comprises:

(a) adjusting the position of a means for focusing such that a focused beam created by the focusing means has a selected point of focus, (b) generating a beam of substantially coherent light whenever it is desired to create a holographic grating at a one of the plural locations within the disk;

(c) collimating the beam of light whenever present;

(d) producing a first and second collimated beam from the collimated beam of light;

(e) directing the first collimated beam towards the disk;

(f) routing the second collimated beam to the focusing means and focusing the second collimated beam to create the focused beam, the focused beam being directed at the one of the plural locations within the disk;

(g) varying the selected point of focus of the focused beam; and, (h) repeating steps (b) through (g) until a predetermined number of newly selected points of focus have been employed.

110. The method for storing data of claim 109, wherein the focused beam is directed at the one of the plural locations in a direction opposite from the first collimated beam.

111. The method for storing data of claim 109, further comprising:

fixing holographic gratings created within the disk such that light impinging on the disk does not create new holographic gratings and does not affect holographic gratings already existing in the disk.

112. The method for storing data of claim 107, wherein the step of recording data elements at each one of the plural locations via the beam of light generated by the electro-optical head, comprises:

(a) adjusting the position of a means for focusing such that a focused beam created by the focusing means has a selected point of focus, (b) generating a beam of substantially coherent light whenever it is desired to create a holographic grating at a one of the plural locations within the disk;

(c) producing a first and second beam of light from the beam of substantially coherent light, whenever present;

(d) routing the first beam of light to first collimating means for creating a first collimated beam;

(e) directing the first collimated beam towards the disk;

(f) routing the second beam of light to second collimating means for creating a second collimated beam;

(g) focusing the second collimated beam to create the focused beam, the focused beam being directed at the one of the plural locations within the disk;

(h) varying the selected point of focus of the focused beam; and, (i) repeating steps (b) through (h) until a predetermined number of newly selected points of focus have been employed.

113. The method for storing data of claim 112, wherein the focused beam is directed at the one of the plural locations in one of (i) a direction opposite from the first collimated beam, or (ii) in a same direction as the first collimated beam.

114. The method for storing data of claim 112, further comprising:

fixing holographic gratings created within the disk such that light impinging on the disk does not create new holographic gratings and does not affect holographic gratings already existing in the disk.

115. The method for storing data of claim 108, wherein the step of recording data elements at the plural sets of the plural location within the disk via the beam of light generated by the electro-optical head, comprises:

(a) recording data elements within a selected set of the plural locations, said recording comprising the steps of, (a1) placing the optical head adjacent to a one of the plural locations in the selected set of plural locations, (a2) adjusting the position of a means for focusing such that a focused beam created by the focusing means has a selected point of focus, (a3) generating a beam of substantially coherent light whenever it is desired to create a holographic grating at the one of the plural locations within the disk, (a4) collimating the beam of light whenever present, (a5) producing a first and second collimated beam form the collimated beam of light, (a6) directing the first collimated beam towards the disk, (a7) routing the second collimated beam to the focusing means, (a8) focusing the second collimated beam to create the focused beam, said focused beam being directed at the one of the plural locations within the disk, (a9) moving the optical head to a position adjacent to a next one of the plural locations in the selected set of plural locations, and, (a10) repeating steps (a3) through (a9) for each one of the plural locations in the selected set of plural locations;

(b) varying the selected point of focus of the focused beam; and, (c) repeating steps (a) and (b) until a predetermined number of newly selected points of focus have been employed.

116. The method for storing data of claim 115, wherein the focused beam is directed at the one of the plural locations in a direction opposite from the first collimated beam.

117. The method for storing data of claim 115, further comprising:

fixing holographic gratings created within the disk such that light impinging on the disk does not create new holographic gratings and does not affect holographic gratings already existing in the disk.

118. The method for storing data of claim 108, wherein the step of recording data elements at the plural sets of the plural location within the disk via the beam of light generated by the electro-optical head, comprises:

(a) recording data elements within a selected set of the plural locations, said recording comprising the steps of,
  (a1) placing the optical head adjacent to a one of the plural locations in the selected set of plural locations,
  (a2) adjusting the position of a means for focusing such that a focused beam created by the focusing means has a selected point of focus,
  (a3) generating a beam of substantially coherent light whenever it is desired to create a holographic grating at the one of the plural locations within the disk,
  (a4) producing a first and second beam of light from the beam of substantially coherent light, whenever present,
  (a5) routing the first beam of light to first collimating means for creating a first collimated beam,
  (a6) directing the first collimated beam towards the disk,
  (a7) routing the second beam of light to second collimating means for creating a second collimated beam,
  (a8) focusing the second collimated beam to create the focused beam, said focused beam being directed at the one of the plural locations within the disk,
  (a9) moving the optical head to a position adjacent to a next one of the plural locations in the selected set of plural locations, and,
  (a10) repeating steps (a3) through (a9) for each one of the plural locations in the selected set of plural locations;
(b) varying the selected point of focus of the focused beam; and,
(c) repeating steps (a) and (b) until a predetermined number of newly selected points of focus have been employed.

119. The method for storing data of claim 118, wherein the focused beam is directed at the one of the plural locations in one of (i) a direction opposite from the first collimated beam, or (ii) in a same direction as the first collimated beam.

120. The method for storing data of claim 118, further comprising:
  fixing holographic gratings created within the disk such that light impinging on the disk does not create new holographic gratings and does not affect holographic gratings already existing in the disk.

121. The method for storing data of claim 107, wherein the step of reading multiple data elements at each one of the plural locations via the beam of light generated by the electro-optical head, comprises:
  (a) adjusting the position of a means for focusing light from the disk such that a light beam reconstructed from a holographic grating existing at a one of the plural locations has a point of focus coinciding with a portion of a means for masking which allows the a reconstructed light beam to pass through to a light detector;
  (b) generating a beam of substantially coherent light;
  (c) collimating the beam of light;
  (d) directing the collimated beam towards the disk;
  (e) detecting a reconstruction light beam emanating from a holographic grating created within the one of the plural locations within the disk;
  (f) varying the selected point of focus of the focusing means such that a newly selected point of focus corresponds to a next one of a point of focus in a sequence of points of focus employed to record each one of the multiple data elements recorded;
  (g) repeating steps (b) through (f) until all the points of focus in the sequence of points of focus employed to record the multiple data elements has been selected.

122. The method for storing data of claim 121, wherein the step of detecting the reconstruction light beam comprises:
  (a) directing light from the disk towards the light detector;
  (b) focusing the directed light to create a focused directed beam, said focused directed beam comprising reconstructions of focused beams used to create holographic gratings within the disk in an area illuminated by the collimated beam including the point of focus of each of the focused beams; and,
  (c) substantially blocking light beams reconstructed from holographic gratings created within the disk in the area illuminated by the first collimated beam which have a point of focus not coinciding with the portion of the masking means allowing light to pass through to the light detector.

123. The method for storing data of claim 108, wherein the step of reading a data element at each location in a set of the plural locations within the disk via the beam of light generated by the electro-optical head, comprises:
  (a) placing the optical head adjacent to one of the plural location in a selected set of plural locations,
  (b) adjusting the position of a means for focusing light from the disk such that a light beam reconstructed from a holographic grating existing at the one of the plural locations in the selected set of the plural locations has a point of focus coinciding with a portion of a means for masking which allows the a reconstructed light beam to pass through to a light detector;
  (c) generating a beam of substantially coherent light;
  (d) collimating the beam of light;
  (e) directing the collimated beam towards the disk;
  (f) detecting a reconstruction light beam emanating from a holographic grating created within the one of the plural locations within the disk in the selected set of the plural locations;
  (g) moving the optical head to a position adjacent to a next one of the plural locations in the selected set of plural locations;
  (h) repeating steps (c) through (g) for each one of the plural locations in the selected set of plural locations;
  (i) selecting a new set of plural locations corresponding to a next one of the sets in a sequence of sets employed to record the data; and,
  (j) repeating steps (a) through (i) for each set of plural locations.

124. The method for storing data of claim 123, wherein the step of detecting the reconstruction light beam comprises:
  (a) directing light from the disk towards the light detector;
  (b) focusing the directed light to create a focused directed beam, said focused directed beam comprising reconstructions of focused beams used to create holographic gratings within the disk in an area illuminated by the collimated beam including the point of focus of each of the focused beams; and,
  (c) substantially blocking light beams reconstructed from holographic gratings created within the disk in the area illuminated by the first collimated beam which have a point of focus not coinciding with the portion of the masking means allowing light to pass through to the light detector.

125. The method for storing data of claim 109, wherein the focused beam is directed at the one of the plural locations in a same direction as the first collimated beam.

126. The method for storing data of claim 115, wherein the focused beam is directed at the one of the plural locations in a same direction as the first collimated beam.

127. The method of claim 45, wherein each holographic grating has a variable diffraction efficiency and wherein the step of recording data elements comprises varying the diffraction efficiency of each holographic grating during the creation thereof.

128. The method of claim 46, wherein the step of reading data elements comprises recognizing a first binary state whenever the presence of the holographic grating is detected and a second binary state whenever the absence of the holographic grating is detected.

129. An apparatus for reading data from an optical disk, comprising:
  (a) an optical disk comprising a material in which a holographic grating may exist at plural locations within the disk, wherein the holographic grating represents a stored data element;
  (b) an elector-optical head capable of detecting one of (i) a presence, or (ii) an absence of the holographic grating at any one of the plural locations within the disk; and
    wherein each holographic grating has a variable diffraction efficiency and wherein the detecting means is capable of producing a signal proportional to the diffraction efficiency of a holographic grating whenever detected, said signal being indicative of a value of the stored data element represented by the detected holographic grating.

130. A method for reading data from an optical disk, the disk being comprised of a material in which a holographic grating may exist at plural locations within the disk wherein the holographic grating represents a stored data element, the method comprising the step of:
  reading data elements using an electro-optical head by detecting one of (i) a presence, or (ii) an absence of a holographic grating at the plural locations within the disk; and
  wherein each holographic grating has a variable diffraction efficiency and wherein:
    the reading step comprises the step of producing a signal proportional to the diffraction efficiency of a holographic grating whenever detected, said signal being indicative of a value of the stored data element represented by the detected holographic grating.

131. An apparatus for reading data from an optical disk, comprising:
  (a) an optical disk comprising a material in which a holographic grating may exist at plural locations within the disk, wherein the holographic grating represents a stored data element;
  (b) an electro-optical head capable of detecting one of (i) a presence, or (ii) an absence of the holographic grating at any one of the plural locations within the disk; and
    wherein the material comprising the optical disk is further capable of having multiple holographic gratings at each one of the plural locations within the disk, each holographic grating within each one of the plural locations being created with at a different point of focus.

132. An apparatus for reading data from an optical disk, comprising:
  (a) an optical disk comprising a material in which a holographic grating may exist at plural locations within the disk, wherein the holographic grating represents a stored data element;
  (b) an electro-optical head capable of detecting one of (i) a presence, or (ii) an absence of the holographic grating at any one of the plural locations within the disk; and
    wherein the material comprising the optical disk is further capable of having holographic gratings at plural sets of the plural locations within the disk, the holographic gratings within a particular set of the plural locations being created at a same point of focus which is different from a point of focus used to create holographic gratings within other of the plural sets of plural locations.

133. An apparatus for reading data from an optical disk, comprising:
  (a) an optical disk comprising a material in which a holographic grating may exist at plural locations within the disk, wherein the holographic grating represents a stored data element;
  (b) an electro-optical head capable of detecting one of (i) a presence, or (ii) an absence of the holographic grating at any one of the plural locations within the disk;
    wherein the electro-optical head comprises:
      (a) means for generating a beam of substantially coherent light;
      (b) means for routing the beam of light to collimating means for collimating the beam;
      (c) means for directing the first collimated beam towards the disk;
      (d) means for detecting reconstruction light beams emanating from a holographic grating created within a one of the plural locations within the disk whenever a beam of light is generated by the generation means and directed at the one of the plural locations; and
    wherein the detecting means comprises:
      (a) a light detector;
      (b) second directing means for directing light from the disk towards the light detector;
      (c) focusing means for focusing one directed light to create a focused directed beam, said focused directed beam comprising reconstructions of focused beams used to create holographic gratings within the disk in an area illuminated by the collimated beam including the point of focus of each of the focused beams;
      (d) masking means for substantially blocking light beams reconstructed from holographic gratings created within the disk in the area illuminated by the collimated beam which have a point of focus not coinciding with a portion of the masking means which allows reconstructed light beams to pass through to the light detector;
      (e) means for changing the location of the focusing means such that a light beam reconstructed from a holographic grating existing at the one of the plural locations has a point of focus coinciding with the portion of the masking means which allows reconstructed light beam to pass through to the light detector.

134. A method for reading data from an optical disk, the disk being comprised at a material in which a holographic grating may exist at plural locations within the disk wherein the holographic grating represents a stored data element, the method comprising the step of:
  reading data elements using an electro-optical head by detecting one of (i) a presence, or (ii) an absence of a holographic grating at the plural locations within the disk wherein:

(a) the material comprising the optical disk is further capable of having multiple holographic gratings existing within each of the plural locations;
(b) the reading step comprises reading multiple data elements at each one of the plural locations by detecting one of (i) a presence of a holographic grating, or (ii) an absence of the holographic grating, via a beam of light generated by the electro-optical head, said beam of light being sequentially varied by point of focus to correspond to a point of focus and a sequence of points of focus employed to record each one of the multiple data elements recorded; and wherein the step of reading multiple data elements at each one of the plural locations via the beam of light generated by the electro-optical head, comprises:
(a) adjusting the position of a means for focusing light from the disk such that a light beam reconstructed from a holographic grating existing at a one of the plural locations has a point of focus coinciding with a portion of a means for masking which allows a reconstructed light beam to pass through to a light detector;
(b) generating a beam of substantially coherent light;
(c) collimating the beam of light;
(d) directing the collimated beam towards the disk;
(e) detecting a reconstruction light beam emanating from a holographic grating created within the one of the plural locations within the disk;
(f) varying the selected point of focus of the focusing means such that a newly selected point of focus corresponds to a next one of a point of focus in a sequence of points of focus employed to record each one of the multiple data elements recorded;
(g) repeating steps (b) through (f) until all the points of focus in the sequence of points of focus employed to record the multiple data elements has been selected.

135. A method for reading data from an optical disk, the disk being comprised of a material in which a holographic grating may exist at plural locations within the disk wherein the holographic grating represents a stored data element, the method comprising the step of:

reading data elements using an electro-optical head by detecting one of (i) a presence, of (ii) an absence of a holographic grating at the plural locations within the disk wherein:
(a) the material comprising the optical disk is further capable of having multiple holographic gratings existing within each of the plural locations;
(b) the reading step comprises reading multiple data elements at each one of the plural locations by detecting one of (i) a presence of a holographic grating, or (ii) an absence of the holographic grating, via a beam of light generated by the electro-optical head, said beam of light being sequentially varied by point of focus to correspond to a point of focus and a sequence of points of focus employed to record each one of the multiple data elements recorded wherein the step of reading multiple data elements at each one of the plural locations via the beam of light generated by the electro-optical head, comprises:
(a) adjusting the position of a means for focusing light from the disk such that a light beam reconstructed from a holographic grating existing at one of the plural locations has a point of focus coinciding with a portion of a means for masking which allows a reconstructed light beam to pass through to a light detector;
(b) generating a beam of substantially coherent light;
(c) collimating the beam of light;
(d) directing the collimated beam towards the disk;
(e) detecting a reconstruction light beam emanating from a holographic grating created within the one of the plural locations within the disk;
(f) varying the selected point of focus of the focusing means such that a newly selected point of focus corresponds to a next one of a point of focus in a sequence of points of focus employed to record each one of the multiple data elements recorded:
(g) repeating steps (b) through (f) until all the point so focus in the sequence of points of focus employed to record the multiple data elements has been selected; and wherein the step of detecting the reconstruction light beam comprises:
(a) directing light from the disk towards the light detector;
(b) focusing the directed light to create a focused directed beam, said focused directed beam comprising reconstructions of focused beams used to create holographic gratings within the disk in an area illuminated by the collimated beam including the point of focus each of the focused beams; and,
(c) substantially blocking light beams reconstructed from holographic gratings created within the disk in the area illuminated by the collimated beam which have a point of focus not coinciding with the portion of the masking means allowing light to pass through to the light detector.

136. A method for reading data from an optical disk, the disk being comprised of a material in which a holographic grating may exist at plural locations within the disk wherein the holographic grating represents a stored data element, the method comprising the step of:

reading data elements using an electro-optical head by detecting one of (i) a presence, or (ii) an absence of a holographic grating at the plural locations within the disk wherein:
(a) the material comprising the optical disk is further capable of having multiple holographic gratings existing within each of the plural locations;
(b) the reading step comprises reading data elements of each location within a particular set of the plural locations by detecting one of (i) a presence of a holographic grating, or (ii) an absence of the holographic grating, via a beam of light generated by the electro-optical head having a point of focus corresponding to the point of focus employed to record the data elements; and wherein the step of reading a data element at each location in a set of the plural locations within the disk via the beam of light generated by the electro-optical head, comprises:
(a) placing the optical head adjacent to one of the plural location in a selected set of plural locations,
(b) adjusting the position of a means for focusing light from the disk such that a light beam reconstructed from a holographic grating existing at the one of the plural locations in the selected set of the plural locations has a point of focus coinciding with a portion of a means for masking which allows a reconstructed light beam to pass through to a light detector;

(c) generating a beam of substantially coherent light;
(d) collimating the beam of light;
(e) directing the collimated beam towards the disk;
(f) detecting a reconstruction light beam emanating from a holographic grating created within the one of the plural locations within the disk in the selected set of the plural locations;
(g) moving the optical head to a position adjacent to a next one of the plural locations in the selected set of plural locations;
(h) repeating steps (c) through (g) for each one of the plural locations in the selected set of plural locations;
(i) selecting a new set of plural locations corresponding to a next one of the sets in a sequence of sets employed to record the data; and
(j) repeating steps (a) through (i) for each set of plural locations.

137. The method for reading data of claim 136, wherein the step of detecting the reconstruction light beam comprises:
(a) directing light from the disk towards the light detector;
(b) focusing the directed light to create a focused directed beam, said focused directed beam comprising reconstructions of focused beams used to create holographic gratings within the disk in an area illuminated by the collimated beam including the point of focus of each of the focused beams; and,
(c) substantially blocking light beams reconstructed from holographic gratings created within the disk in the area illuminated by the first collimated beam which have a point of focus not coinciding with the portion of the masking means allowing light to pass through to the light detector.

* * * * *

UNITED STATES PATENT AND TRADEMARK OFFICE
CERTIFICATE OF CORRECTION

| | |
|---|---|
| PATENT NO. | : 6,272,095 B1 |
| DATED | : August 7, 2001 |
| INVENTOR(S) | : Tsuen-Hsi Liu, Demetri Psaltis, Fai H. Mok and Gan Zhou |

Page 1 of 1

It is certified that error appears in the above-identified patent and that said Letters Patent is hereby corrected as shown below:

<u>Column 1,</u>
Before the word BACKGROUND, please insert the following paragraph.
-- STATEMENT AS TO FEDERALLY-SPONSORED RESEARCH
     The invention described herein was made in the performance of work under a NASA 7-1407 contract, and is subject to the provisions of Public Law 96-517 (U.S.C. 202) in which the contractor has elected to retain title. --

Signed and Sealed this

Sixteenth Day of April, 2002

*Attest:*

JAMES E. ROGAN
*Attesting Officer*      *Director of the United States Patent and Trademark Office*